(12) United States Patent
Satori

(10) Patent No.: US 7,477,457 B2
(45) Date of Patent: Jan. 13, 2009

(54) ZOOM LENS SYSTEM AND ELECTRONIC IMAGE PICKUP APPARATUS USING THE SAME

(75) Inventor: Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/901,633

(22) Filed: Sep. 17, 2007

(65) Prior Publication Data

US 2008/0088945 A1    Apr. 17, 2008

(30) Foreign Application Priority Data

Sep. 19, 2006   (JP) .............................. 2006-252569
Oct. 25, 2006   (JP) .............................. 2006-290117

(51) Int. Cl.
*G02B 15/14* (2006.01)

(52) U.S. Cl. ...................... 359/690; 359/684; 359/685; 359/689; 359/716; 359/740; 359/785

(58) Field of Classification Search ......... 359/683–685, 359/689, 690, 716, 740, 785
See application file for complete search history.

(56) References Cited

U.S. PATENT DOCUMENTS

| | | | | |
|---|---|---|---|---|
| 5,831,768 | A * | 11/1998 | Ohtake | 359/557 |
| 6,606,200 | B1 * | 8/2003 | Nakayama et al. | 359/686 |
| 7,283,310 | B2 * | 10/2007 | Hozumi et al. | 359/687 |
| 7,315,424 | B2 * | 1/2008 | Saruwatari et al. | 359/687 |
| 2005/0122596 | A1 | 6/2005 | Ohashi | |
| 2005/0190457 | A1 | 9/2005 | Ohashi | |

FOREIGN PATENT DOCUMENTS

JP    2006-078979    3/2006

* cited by examiner

*Primary Examiner*—Evelyn A. Lester
(74) *Attorney, Agent, or Firm*—Kenyon & Kenyon LLP

(57) ABSTRACT

A zoom lens system comprises a first lens unit having a positive refractive power, a second lens unit having a negative refractive power and a third lens unit having a positive refractive power, and during zooming from a wide-angle end to a telephoto end, a space between a first lens unit and a second lens unit and a space between the second lens unit and a third lens unit are changed, the space between the first lens unit and the second lens unit is enlarged in the telephoto end as compared with the wide-angle end, and the space between the second lens unit and the third lens unit is narrowed in the telephoto end as compared with the wide-angle end.

38 Claims, 47 Drawing Sheets

ZOOM LENS SYSTEM AND ELECTRONIC IMAGE PICKUP APPARATUS USING THE SAME

CROSS REFERENCE TO RELATED APPLICATIONS

This application claims benefit under 35 U.S.C. §119 of Japanese patent applications of No. 2006-252,569 filed in Japan on Sep. 19, 2006 and No. 2006-290,117 filed in Japan on Oct. 25, 2006, the contents of which are incorporated herein by reference.

BACKGROUND OF THE INVENTION

1. Field of the Invention

The present invention relates to a zoom lens system and an electronic image pickup apparatus using the same.

2. Description of the Related Art

In recent years, instead of a silver halide film camera, a digital camera has been a mainstream which photographs a subject by use of an electronic image pickup device such as a CCD image sensor or a CMOS type image sensor. Furthermore, the camera has a large number of categories in a broad range from a highly functional type for business to a compact popular type.

A user of the popular type of digital camera would like to readily enjoy photographing in various scenes anywhere and anytime. Therefore, the user would like a small-sized camera, especially a digital camera of a thin type which is conveniently carried with a good storage property in clothing, a bag pocket or the like and which has a small size in a thickness direction.

On the other hand, a zoom ratio of the digital camera of the compact type has been generally about three, but there is a demand for a camera having a higher zoom ratio than before.

As a zoom lens system which easily retains a comparatively high zoom ratio, a type is known which has, in order from an object side, a first lens unit having a positive refractive power, a second lens unit having a negative refractive power and a third lens unit having a positive refractive power.

Moreover, since a size of the camera in a thickness direction is mainly determined by a size of a lens barrel, thinning of the lens barrel is effective in order to achieve the thinned camera.

In recent years, a so-called collapsible lens barrel of the camera has been generalized which is projected from a camera body when used and which is stored in the camera body when carried. Therefore, there is a demand for the zoom lens system in which the thinning of the lens barrel when collapsed is considered.

In Japanese Patent Application Laid-Open Nos. 2005-242116, 2005-326743, 2006-78979 and 2005-148420, a zoom lens system is disclosed in which a first lens unit includes two or three lenses and a second lens unit has a symmetric power arrangement including a negative lens, a positive lens and a negative lens in order from an object side, so that aberration correction and miniaturization of the second lens unit are achieved.

BRIEF SUMMARY OF THE INVENTION

In a first aspect, according to the present invention, there is provided a zoom lens system comprising, in order from an object side, a first lens unit having a positive refractive power, a second lens unit having a negative refractive power and a third lens unit having a positive refractive power, during zooming from a wide-angle end to a telephoto end, a space between the first lens unit and the second lens unit and a space between the second lens unit and the third lens unit being changed, the space between the first lens unit and the second lens unit being enlarged in the telephoto end as compared with the wide-angle end, the space between the second lens unit and the third lens unit being narrowed in the telephoto end as compared with the wide-angle end, the zoom lens system further comprising:

an aperture stop disposed at a constant relative position with respect to the third lens unit during the zooming, the first lens unit comprising a positive lens, the total number of the lenses of the first lens unit being two or less, the second lens unit comprising, in order from the object side, an object-side negative lens whose concave surface faces an image side, a positive lens and an image-side negative lens, the total number of the lenses of the second lens unit being three, the object-side negative lens and the positive lens of the second lens unit are arranged with an air space on an optical axis therebetween, the following condition being satisfied:

$$-1.70 < R_{2n1r}/f_2 < -0.70 \qquad (1A),$$

in which $R_{2n1r}$ is a paraxial radius of curvature of an image-side surface of the object-side negative lens of the second lens unit, and $f_2$ is a focal length of the second lens unit.

In a second aspect, according to the present invention, there is provided a zoom lens system comprising, in order from an object side, a first lens unit having a positive refractive power, a second lens unit having a negative refractive power and a third lens unit having a positive refractive power, during zooming from a wide-angle end to a telephoto end, a space between the first lens unit and the second lens unit and a space between the second lens unit and the third lens unit being changed, the space between the first lens unit and the second lens unit being enlarged in the telephoto end as compared with the wide-angle end, the space between the second lens unit and the third lens unit being narrowed in the telephoto end as compared with the wide-angle end, the first lens unit comprising a positive lens, the total number of the lenses of the first lens unit being two or less, the second lens unit comprising, in order from the object side, three lenses including an object-side negative lens having a double-concave shape, a positive lens and an image-side negative lens, the total number of the lenses of the second lens unit being three, an image-side surface of the positive lens being a convex surface which faces an image side, an absolute value of a paraxial radius of curvature of the image-side surface of the positive lens being smaller than that of the paraxial radius of curvature of an object-side surface of the positive lens, the object-side negative lens and the positive lens of the second lens unit are arranged with an air space on an optical axis therebetween, the following conditions being satisfied:

$$0 < f_2/R_{2n1f} < 0.4 \qquad (1B); \text{ and}$$

$$-1.6 < SF_{2air} < -0.5 \qquad (2B),$$

in which $R_{2n1f}$ is a paraxial radius of curvature of an object-side surface of the object-side negative lens of the second lens unit, $f_2$ is a focal length of the second lens unit, $SF_{2air}$ is defined as $SF_{2air}=(R_{2n1r}+R_{2p1f})/(R_{2n1r}-R_{2p1f})$, $R_{2n1r}$ is a paraxial radius of curvature of an image-side surface of the object-side negative lens of the second lens unit, and $R_{2p1f}$ is a paraxial radius of curvature of the object-side surface of the positive lens of the second lens unit.

Moreover, an electronic image pickup apparatus according to the present invention comprises the zoom lens system according to the present invention, and an electronic image pickup device which is disposed on an image side of the zoom lens system and which converts an optical image formed by the zoom lens system into an electric signal.

Other features and advantages of the present invention will become apparent from the following detailed description of the embodiments when taken in conjunction with the accompanying drawings and appended claims.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 1A is a sectional view of the system in a wide-angle end, FIG. 1B is a sectional view of the system in an intermediate position, and FIG. 1C is a sectional view of the system in a telephoto end;

FIG. 2A is a sectional view of the system in a wide-angle end, FIG. 2B is a sectional view of the system in an intermediate position, and FIG. 2C is a sectional view of the system in a telephoto end;

FIG. 3A is a sectional view of the system in a wide-angle end, FIG. 3B is a sectional view of the system in an intermediate position, and FIG. 3C is a sectional view of the system in a telephoto end;

FIG. 4A is a sectional view of the system in a wide-angle end, FIG. 4B is a sectional view of the system in an intermediate position, and FIG. 4C is a sectional view of the system in a telephoto end;

FIG. 5A is a sectional view of the system in a wide-angle end, FIG. 5B is a sectional view of the system in an intermediate position, and FIG. 5C is a sectional view of the system in a telephoto end;

FIG. 6A is a sectional view of the system in a wide-angle end, FIG. 6B is a sectional view of the system in an intermediate position, and FIG. 6C is a sectional view of the system in a telephoto end;

FIG. 7A is a sectional view of the system in a wide-angle end, FIG. 7B is a sectional view of the system in an intermediate position, and FIG. 7C is a sectional view of the system in a telephoto end;

FIG. 8A is a sectional view of the system in a wide-angle end, FIG. 8B is a sectional view of the system in an intermediate position, and FIG. 8C is a sectional view of the system in a telephoto end;

FIG. 9A is a sectional view of the system in a wide-angle end, FIG. 9B is a sectional view of the system in an intermediate position, and FIG. 9C is a sectional view of the system in a telephoto end;

FIG. 10A is a sectional view of the system in a wide-angle end, FIG. 10B is a sectional view of the system in an intermediate position, and FIG. 10C is a sectional view of the system in a telephoto end;

FIG. 11A is a sectional view of the system in a wide-angle end, FIG. 11B is a sectional view of the system in an intermediate position, and FIG. 11C is a sectional view of the system in a telephoto end;

FIG. 12A is a sectional view of the system in a wide-angle end, FIG. 12B is a sectional view of the system in an intermediate position, and FIG. 12C is a sectional view of the system in a telephoto end;

FIG. 13A is a sectional view of the system in a wide-angle end, FIG. 13B is a sectional view of the system in an intermediate position, and FIG. 13C is a sectional view of the system in a telephoto end;

FIG. 14A is a sectional view of the system in a wide-angle end, FIG. 14B is a sectional view of the system in an intermediate position, and FIG. 14C is a sectional view of the system in a telephoto end;

FIG. 15A is a sectional view of the system in a wide-angle end, FIG. 15B is a sectional view of the system in an intermediate position, and FIG. 15C is a sectional view of the system in a telephoto end;

FIG. 16A is a sectional view of the system in a wide-angle end, FIG. 16B is a sectional view of the system in an intermediate position, and FIG. 16C is a sectional view of the system in a telephoto end;

FIG. 17A is a sectional view of the system in a wide-angle end, FIG. 17B is a sectional view of the system in an intermediate position, and FIG. 17C is a sectional view of the system in a telephoto end;

FIG. 18A is a sectional view of the system in a wide-angle end, FIG. 18B is a sectional view of the system in an intermediate position, and FIG. 18C is a sectional view of the system in a telephoto end;

FIG. 19A is a sectional view of the system in a wide-angle end, FIG. 19B is a sectional view of the system in an intermediate position, and FIG. 19C is a sectional view of the system in a telephoto end;

FIG. 20A is a sectional view of the system in a wide-angle end, FIG. 20B is a sectional view of the system in an intermediate position, and FIG. 20C is a sectional view of the system in a telephoto end;

FIG. 21A is a sectional view of the system in a wide-angle end, FIG. 21B is a sectional view of the system in an intermediate position, and FIG. 21C is a sectional view of the system in a telephoto end;

FIG. 22A shows a state in the wide-angle end, FIG. 22B shows a state in the intermediate position, and FIG. 22C shows a state in the telephoto end;

FIG. 23A shows a state in the wide-angle end, FIG. 23B shows a state in the intermediate position, and FIG. 23C shows a state in the telephoto end;

FIG. 24A shows a state in the wide-angle end, FIG. 24B shows a state in the intermediate position, and FIG. 24C shows a state in the telephoto end;

FIG. 25A shows a state in the wide-angle end, FIG. 25B shows a state in the intermediate position, and FIG. 25C shows a state in the telephoto end;

FIG. 26A shows a state in the wide-angle end, FIG. 26B shows a state in the intermediate position, and FIG. 26C shows a state in the telephoto end;

FIG. 27A shows a state in the wide-angle end, FIG. 27B shows a state in the intermediate position, and FIG. 27C shows a state in the telephoto end;

FIG. 28A shows a state in the wide-angle end, FIG. 28B shows a state in the intermediate position, and FIG. 28C shows a state in the telephoto end;

FIG. 29A shows a state in the wide-angle end, FIG. 29B shows a state in the intermediate position, and FIG. 29C shows a state in the telephoto end;

FIG. 30A shows a state in the wide-angle end, FIG. 30B shows a state in the intermediate position, and FIG. 30C shows a state in the telephoto end;

FIG. 31A shows a state in the wide-angle end, FIG. 31B shows a state in the intermediate position, and FIG. 31C shows a state in the telephoto end;

FIG. 32A shows a state in the wide-angle end, FIG. 32B shows a state in the intermediate position, and FIG. 32C shows a state in the telephoto end;

FIG. 33A shows a state in the wide-angle end, FIG. 33B shows a state in the intermediate position, and FIG. 33C shows a state in the telephoto end;

FIG. 34A shows a state in the wide-angle end, FIG. 34B shows a state in the intermediate position, and FIG. 34C shows a state in the telephoto end;

FIG. 35A shows a state in the wide-angle end, FIG. 35B shows a state in the intermediate position, and FIG. 35C shows a state in the telephoto end;

FIG. 36A shows a state in the wide-angle end, FIG. 36B shows a state in the intermediate position, and FIG. 36C shows a state in the telephoto end;

FIG. 37A shows a state in the wide-angle end, FIG. 37B shows a state in the intermediate position, and FIG. 37C shows a state in the telephoto end;

FIG. 38A shows a state in the wide-angle end, FIG. 38B shows a state in the intermediate position, and FIG. 38C shows a state in the telephoto end;

FIG. 39A shows a state in the wide-angle end, FIG. 39B shows a state in the intermediate position, and FIG. 39C shows a state in the telephoto end;

FIG. 40A shows a state in the wide-angle end, FIG. 40B shows a state in the intermediate position, and FIG. 40C shows a state in the telephoto end;

FIG. 41A shows a state in the wide-angle end, FIG. 41B shows a state in the intermediate position, and FIG. 41C shows a state in the telephoto end;

FIG. 42A shows a state in the wide-angle end, FIG. 42B shows a state in the intermediate position, and FIG. 42C shows a state in the telephoto end;

DETAILED DESCRIPTION OF THE EMBODIMENTS

Figure 1A:
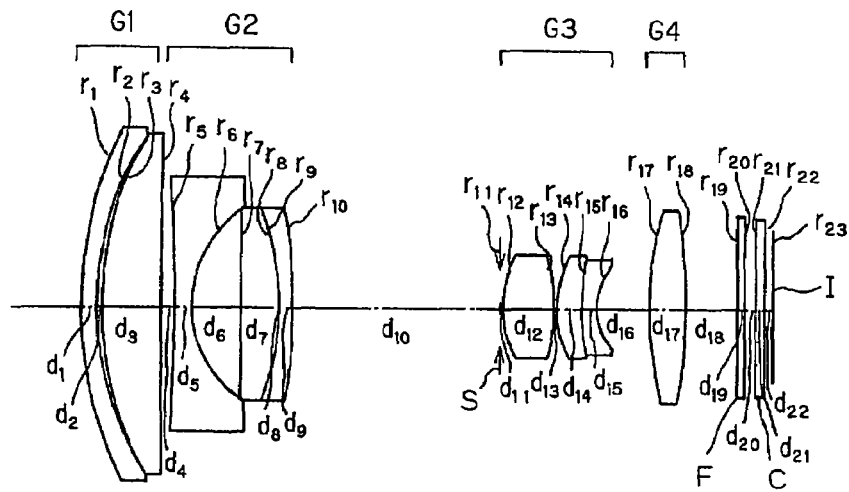
FIGS. 1A to 1C are sectional views of Example 1 of a zoom lens system including an optical axis according to the present invention when focused at infinity.

As described above, according to a first aspect of to the present invention, a zoom lens system comprises, in order from an object side, a first lens unit having a positive refractive power, a second lens unit having a negative refractive power and a third lens unit having a positive refractive power.

During zooming from a wide-angle end to a telephoto end, a space between the first lens unit and the second lens unit and a space between the second lens unit and the third lens unit are changed.

The space between the first lens unit and the second lens unit is enlarged in the telephoto end as compared with the wide-angle end.

The space between the second lens unit and the third lens unit is narrowed in the telephoto end as compared with the wide-angle end.

The zoom lens system further comprises an aperture stop disposed at a constant relative position with respect to the third lens unit during the zooming.

The first lens unit comprises a positive lens, and the total number of the lenses of the first lens unit is two or less.

The second lens unit comprises, in order from the object side, an object-side negative lens whose concave surface faces an image side, a positive lens and an image-side negative lens, and the total number of the lenses of the second lens unit is three.

The object-side negative lens and the positive lens of the second lens unit are arranged with an air space on an optical axis therebetween.

The following condition is satisfied:

$$-1.70 < R_{2n1r}/f_2 < -0.70 \quad (1A),$$

in which $R_{2n1r}$ is a paraxial radius of curvature of an image-side surface of the object-side negative lens of the second lens unit, and $f_2$ is a focal length of the second lens unit.

In the first aspect, the zoom lens system has, in order from the object side, the first lens unit having the positive refractive power, the second lens unit having the negative refractive power and the third lens unit having the positive refractive power. During the zooming from the wide-angle end to the telephoto end, the space between the first lens unit and the second lens unit and the space between the second lens unit and the third lens unit are changed, the space between the first lens unit and the second lens is enlarged in the telephoto end as compared with the wide-angle end, and the space between the second lens unit and the third lens unit is narrowed in the telephoto end as compared with the wide-angle end.

According to such a constitution, burdens of the zooming function can efficiently be shared by the second lens unit and the third lens unit, a zoom ratio is secured, and aberration fluctuations during the zooming can easily be reduced.

Moreover, the number of the lenses constituting the first lens unit is as small as two or less, and the number of the lenses constituting the second lens unit is as small as three. In consequence, a thickness of the zoom lens system at a time when a lens barrel is collapsed is easily reduced. A distance from the surface of the first lens unit closest to the object side to an entrance pupil in the wide-angle end is easily reduced, and a size of the zoom lens system in a diametric direction is easily reduced.

Furthermore, the second lens unit includes two negative lenses, and the negative power of the second lens unit is shared by the lenses. In consequence, aberrations are easily reduced. Further in the second lens unit, the negative lens, the positive lens and the negative lens are arranged in order from the object side. In consequence, symmetry of a lens constitution is improved, and aberration correction is efficiently performed in the second lens unit.

In addition, the zoom lens system has the aperture stop, and the third lens unit and the aperture stop have a constant positional relation during the zooming. In consequence, a ray height of an off-axial ray which passes through the third lens unit is prevented from being increased, a size of the third lens unit in the diametric direction and an axial thickness of the unit can easily be reduced, and this is advantageous for miniaturization of the system. Even when the refractive power of the third lens unit is secured, the aberration fluctuations during the zooming are easily reduced.

In a case where the aperture stop is disposed in this manner, when the second lens unit satisfies the following condition (1A), both of the miniaturization and balancing of the aberrations are easily achieved.

$$-1.70 < R_{2n1r}/f_2 < -0.70 \quad (1A),$$

in which $R_{2n1r}$ is a paraxial radius of curvature of an image-side surface of the object-side negative lens of the second lens unit, and $f_2$ is a focal length of the second lens unit.

The condition (1A) regulates the paraxial radius of curvature of the image-side surface of the object-side negative lens of the second lens unit. It is preferable that $R_{2n1r}/f_2$ does not exceed an upper limit of −0.70 of the condition (1A), a curvature of an image-side concave surface of the negative lens of the second lens unit closest to the object side is reduced (a radius of curvature is increased), and an angle of refraction of the off-axial ray on this surface is suppressed. In consequence, especially generation of an off-axial coma in the wide-angle end is advantageously reduced.

Moreover, in a case where the curvature of this concave surface is reduced, sag of this concave surface having the curvature which easily increases can be reduced, and the thickness of the second lens unit is also easily reduced. This is also advantageous for the miniaturization of the system at a time when the lens barrel is collapsed.

When $R_{2n1r}/f_2$ is not below a lower limit of −1.70, an appropriate curvature of the image-side concave surface of the object-side negative lens is secured and a function of refracting the off-axial ray is appropriately secured, it is prevented in the wide-angle end that the off-axial ray passes through the second lens unit while maintaining a large angle with respect to the optical axis. In consequence, the fluctuations of the aberration during the zooming are easily reduced.

Furthermore, it is preferable that three or less lenses are arranged on the image side from the third lens unit of the zoom lens system.

According to such a constitution, the system at the time when the lens barrel is collapsed is advantageously thinned, and the constitution of the zoom lens system is advantageously simplified.

When the zoom lens system is constituted as a three-unit zoom lens system, a mechanism to move the lenses can be simplified.

When the zoom lens system is constituted as a four-unit zoom lens system and that the fourth lens unit has a positive refractive power, the fourth lens unit can be provided with a function of disposing an exit pupil of the zoom lens system far from an image surface. When the fourth lens unit is moved to perform focusing, changes of an angle of view during the focusing are easily reduced. When the fourth lens unit includes one positive lens, the system at the time when the lens barrel is collapsed is preferably miniaturized.

Moreover, when the zoom lens system is constituted as a five-unit zoom lens system, the fourth lens unit has a negative refractive power and a fifth lens unit has a positive refractive power, the whole zoom lens system has a symmetric power arrangement of the lens units, and fluctuations of an astigmatism during the zooming are easily reduced.

It is preferable that the second lens unit satisfies the following conditions (2A) and (3A). In this case, the miniaturization and the aberration balance are more satisfactorily achieved.

$$0 < SF_{2n1} < 1.25 \tag{2A}$$

$$-0.32 < f_2/R_{2pf} < 0.5 \tag{3A}$$

in which $SF_{2n1}$ is defined as $SF_{2n1} = (R_{2n1f} + R_{2n1r})/(R_{2n1f} - R_{2n1r})$, $R_{2n1f}$ is a paraxial radius of curvature of an object-side surface of the object-side negative lens of the second lens unit, $R_{2n1r}$ is a paraxial radius of curvature of the image-side surface of the object-side negative lens of the second lens unit, and $R_{2pf}$ is a paraxial radius of curvature of an object-side surface of the positive lens of the second lens unit.

The condition (2A) is a condition on which the miniaturization is balanced with securing of performance while the power of the object-side negative lens of the second lens unit is secured.

In a case where $SF_{2n1}$ is not above an upper limit of 1.25 of the condition (2A), even when the curvature of the image-side surface is reduced, the negative power of the negative lens is easily secured. In consequence, a change amount of a space before or after the second lens unit is easily reduced, and the lens barrel is advantageously miniaturized. Moreover, a function of refracting the ray on the object-side surface is easily secured, the ray height in the first lens unit is reduced, and a compact zoom lens system in the diametric direction is advantageously obtained. The thickness of the second lens unit along the optical axis is easily reduced.

It is preferable that $SF_{2n1}$ is not below a lower limit of 0 in the condition (2A). In consequence, the object-side surface is inhibited from having a strong negative power, and a curvature of field and distortion in the wide-angle end are suppressed.

Moreover, when the condition (1A) is satisfied, generation of the aberration in the image-side surface of the negative lens closest to the object side is reduced. Further, it is preferable that the positive lens of the second lens unit satisfies the condition (3A) so as more appropriately to balance the aberration.

When $f_2/R_{2pf}$ is not below a lower limit of −0.32 in the condition (3A), the object-side surface can be inhibited from having a strong positive power, the negative power of the second lens unit is advantageously secured, and the coma is advantageously corrected.

When $f_2/R_{2pf}$ is not above an upper limit of 0.5 in the condition (3A) and an appropriate power of the positive lens is secured, a function of correcting the aberrations by the object-side and image-side negative lenses can be secured, and the coma and a spherical aberration are easily suppressed.

It is to be noted that the following condition is more preferable than the condition (1A):

$$-1.30 < R_{2n1r}/f_2 < -0.74 \tag{1A'}$$

It is further preferable to satisfy the following condition:

$$-0.85 < R_{2n1r}/f_2 < -0.78 \tag{1A''}$$

The following condition is more preferable than the condition (2A):

$$0.35 < SF_{2n1} < 1.15 \tag{2A'}$$

It is further preferable to satisfy the following condition:

$$0.70 < SF_{2n1} < 1.05 \tag{2A''}$$

It is to be noted that the following condition is more preferable than the condition (3A):

$$-0.21 < f_2/R_{2pf} < 0.3 \tag{3A'}$$

It is further preferable to satisfy the following condition:

$$-0.1 < f_2/R_{2pf} < 0.1 \tag{3A''}$$

Only lower limit values or upper limit values of the above conditions may be limited. This also applies to the following conditions.

It is preferable that the positive lens of the second lens unit satisfies the following conditions (4A), (5A). These are conditions concerning a refractive index and Abbe number of the positive lens of the second lens unit.

$$1.84 < n_{d2p} < 2.20 \tag{4A; and}$$

$$13.0 < \nu_{d2p} < 30.0 \tag{5A}$$

in which $n_{d2p}$ is a refractive index of the positive lens of the second lens unit for the d-line, and $v_{d2p}$ is the Abbe number of the positive lens of the second lens unit.

It is preferable that $n_{d2p}$ is not above an upper limit of 2.20 in the condition (4A), whereby mass productivity and availability of a material are improved and costs are reduced.

In a case where $n_{d2p}$ is not below a lower limit of 1.84 in the condition (4A), even when the power is secured, an absolute value of the curvature of a lens surface can be reduced, and the generations of the spherical aberration and the coma are easily suppressed.

The condition (5A) is a condition concerning correction of a chromatic aberration, especially an off-axial chromatic aberration of magnification. To satisfactorily correct the chromatic aberration generated by a large negative power in this lens unit, it is preferable to use a material having a comparatively large color dispersion in an appropriate range for the positive lens.

It is preferable that $v_{d2p}$ is not above an upper limit of 30.0 in the condition (5A) so as to secure the dispersion and correct the chromatic aberration generated by the negative lens.

It is preferable that $v_{d2p}$ is not below a lower limit of 13.0 in the condition (5A) so as to suppress the color dispersion on a short-wavelength side, suppress a short-wavelength-side chromatic aberration and inhibit secondary spectrum generated by this positive lens.

The following conditions are further preferable:

$$1.87 < n_{d2p} < 2.15 \quad (4A)'; \text{ and}$$

$$15.0 < v_{d2p} < 26.0 \quad (5A)'.$$

The following conditions are still further preferable:

$$1.90 < n_{d2p} < 2.12 \quad (4A)''; \text{ and}$$

$$17.0 < v_{d2p} < 21.0 \quad (5A)''.$$

To further reduce the generation of the aberration in the second lens unit, it is preferable that a shape of the positive lens of the second lens unit is set so as to satisfy the following condition:

$$0.45 < SF_{2p} < 1.80 \quad (6A),$$

in which $SF_{2p}$ is defined as $SF_{2p} = (R_{2pf} + R_{2pr})/(R_{2pf} - R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

When $SF_{2p}$ is not above an upper limit of 1.80 and is not below a lower limit of 0.45 in the condition (6A), the generations of the spherical aberration and the coma are easily suppressed with good balance.

The following condition is further preferable:

$$0.55 < SF_{2p} < 1.6 \quad (6A)'.$$

It is further preferable to satisfy the following condition:

$$0.6 < SF_{2p} < 1.3 \quad (6A)''.$$

It is preferable that a material of the negative lens of the second lens unit closest to the object side satisfies the following conditions:

$$1.78 < n_{d2n1} < 2.20 \quad (7A); \text{ and}$$

$$35 < v_{d2n1} < 50 \quad (8A),$$

in which $n_{d2n1}$ is a refractive index of the object-side negative lens of the second lens unit for the d-line, and $v_{d2n1}$ is the Abbe number of the object-side negative lens of the second lens unit.

It is preferable that $n_{d2n1}$ is not above an upper limit of 2.20 in the condition (7A), so that the mass productivity and availability of the material is improved and the costs are reduced. It is preferable that $n_{d2n1}$ is not below a lower limit of 1.78 in the condition (7A), so that the absolute value of the curvature of the lens surface is reduced while securing the refractive power, and the coma and the curvature of field in the wide-angle end are easily suppressed.

It is preferable that $v_{d2n1}$ is not above an upper limit of 50 in the condition (8A) so as to secure the availability of the material having a high refractive index. It is preferable that $v_{d2n1}$ is not below a lower limit of 35 in the condition (8A), so that the color dispersion is appropriately suppressed and the chromatic aberration is easily suppressed.

It is further preferable to satisfy the following conditions:

$$1.79 < n_{d2n1} < 1.95 \quad (7A)'; \text{ and}$$

$$37 < v_{d2n1} < 47 \quad (8A)'.$$

It is still further preferable to satisfy the following conditions:

$$1.80 < n_{d2n1} < 1.90 \quad (7A)''; \text{ and}$$

$$40 < v_{d2n1} < 43 \quad (8A)''.$$

An optimum material of the negative lens of the second lens unit closest to the image side may be set. Specifically, the following conditions may be satisfied:

$$1.78 < n_{d2n2} < 2.00 \quad (9A); \text{ and}$$

$$35 < v_{d2n2} < 50 \quad (10A),$$

in which $n_{d2n2}$ is a refractive index of the image-side negative lens of the second lens unit for the d-line, and $v_{d2n2}$ is the Abbe number of the image-side negative lens of the second lens unit.

It is preferable that $n_{d2n2}$ is not above an upper limit of 2.00 in the condition (9A), so that the mass productivity and the availability of the material are improved, and the costs are reduced. In a case where $n_{d2n2}$ is not below a lower limit of 1.78 in the condition (9A), even when the refractive power is secured, the absolute value of the curvature of the lens surface can be reduced, and the generations of the spherical aberration and the coma are easily suppressed.

It is preferable that $v_{d2n2}$ is not above an upper limit of 50 in the condition (10A) so as to improve the availability of the material having the high refractive index. When $v_{d2n2}$ is not below a lower limit of 35 in the condition (10A), the color dispersion is advantageously suppressed to correct the chromatic aberration.

The following conditions are further preferable:

$$1.79 < n_{d2n2} < 1.95 \quad (9A)'; \text{ and}$$

$$38 < v_{d2n2} < 48 \quad (10A)'.$$

It is further preferable to satisfy the following conditions:

$$1.80 < n_{d2n2} < 1.90 \quad (9A)''; \text{ and}$$

$$40 < v_{d2n2} < 47 \quad (10A)''.$$

A shape of this negative lens may satisfy the following condition:

$$-3.0 < SF_{2n2} < -0.6 \quad (11A),$$

in which $SF_{2n2}$ is defined as $SF_{2n2} = (R_{2n2f} + R_{2n2r})/(R_{2n2f} - R_{2n2r})$, $R_{2n2f}$ is a paraxial radius of curvature of an object-side surface of the image-side negative lens of the second lens unit, and $R_{2n2r}$ is a paraxial radius of curvature of an image-side surface of the image-side negative lens of the second lens unit.

It is preferable that $SF_{2n2}$ is not above an upper limit of −0.6 in the condition (11A) so as to inhibit under-correction of the curvature of field. It is preferable that the value is not below a lower limit of −3.0, so that the absolute values of curvatures of both of the lens surfaces are appropriately reduced, and the generations of the spherical aberration and the coma are easily suppressed.

The following condition is further preferable:

$$-2.6 < SF_{2n2} < -0.9 \quad (11A)'$$

It is further preferable to satisfy the following condition:

$$-2.1 < SF_{2n2} < -1.1 \quad (11A)''$$

Moreover, in order to satisfactorily correct the aberration, the positive lens of the second lens unit may satisfy the following condition:

$$-3.0 < f_{2p}/f_2 < -1.0 \quad (12A)$$

in which $f_{2p}$ is a focal length of the positive lens of the second lens unit.

When $f_{2p}/f_2$ is not above an upper limit of −1.0 in the condition (12A) and the power of the positive lens is appropriately suppressed, the under-correction of the curvature of field is easily inhibited. When the value is not below a lower limit of −3.0 so as to appropriately secure the power of the positive lens, the spherical aberration and the coma generated by the negative lens of the second lens unit are advantageously corrected. In any case, when the value is above the upper limit or below the lower limit, it is difficult to secure a satisfactory optical performance.

The following condition is further preferable:

$$-2.8 < f_{2p}/f_2 < -1.4 \quad (12A)'$$

It is further preferable to satisfy the following condition:

$$-2.6 < f_{2p}/f_2 < -1.8 \quad (12A)''$$

Moreover, to further suppress the generation of the aberration and obtain the satisfactory optical performance, an aspherical surface may be disposed on at least one lens surface of the negative lens of the second lens unit closest to the object side. Moreover, the aspherical surfaces may be disposed on the opposite surfaces. The coma and the curvature of field are effectively corrected.

Figure 43:
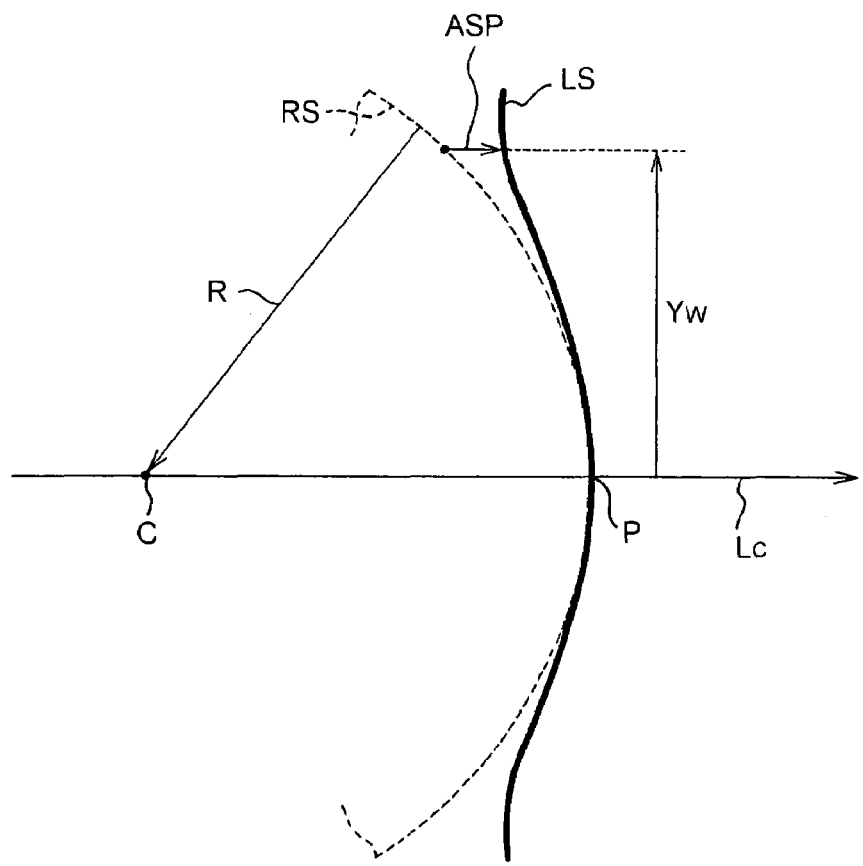
FIG. 43 is a diagram showing definition of an aspherical displacement.

At this time, the following conditions may be satisfied:

$$0.002 < (ASP_{2n1f} + |ASP_{2n1r}|)/f_w < 0.10 \quad (13A); \text{ and}$$

$$-0.06 < (ASP_{2n1r} - ASP_{2n1f})/f_w < 0.06 \quad (13B),$$

in which $ASP_{2n1f}$ is an aspherical displacement of an object-side lens surface of the object-side negative lens of the second lens unit, $ASP_{2n1r}$ is an aspherical displacement of the image-side lens surface of the object-side negative lens of the second lens unit, and $f_w$ is a focal length of the zoom lens system in the wide-angle end. Here, as shown in FIG. 43, assuming that a spherical surface having the same surface vertex as a vertex P of a lens surface LS and a radius of curvature equal to a paraxial radius R of curvature of the lens surface is a reference spherical surface RS, the aspherical displacement ASP is a distance from the reference spherical surface to the lens surface, which is measured in parallel with an optical axis $L_C$ at a position of a maximum incidence height $Y_W$ of a ray entering the lens surface in the wide-angle end. A distance measured toward the image side (a rightward direction in the drawing) is represented by a positive sign. The aspherical displacement in a case where the lens surface is a spherical surface or a flat surface is zero.

When $(ASP_{2n1f} + |ASP_{2n1r}|)/f_w$ is not below a lower limit of 0.002 in the condition (13A), an aberration correcting effect of the aspherical surface is easily secured, and excessive barrel type distortion is easily suppressed. When the value is not above an upper limit of 0.10, a degree of a shape change of the aspherical surface can be reduced, and an adverse influence of eccentricity on the aberration and overcorrection of the coma are easily suppressed.

When $(ASP_{2n1r} - ASP_{2n1f})/f_w$ is not above an upper limit of 0.06 in the condition (13B), the overcorrection of the curvature of field is easily suppressed. When the value is not below a lower limit of −0.06, the under-correction of the curvature of field is easily suppressed. In either case, the satisfactory optical performance is effectively obtained.

The following condition is further preferable:

$$-0.059 < (ASP_{2n1r} - ASP_{2n1f})/f_w < 0.04 \quad (13B)'$$

It is further preferable to satisfy the following condition:

$$-0.055 < (ASP_{2n1r} - ASP_{2n1f})/f_w < 0.015 \quad (13B)''$$

Moreover, the object-side surface of the object-side negative lens of the second lens unit may be an aspherical surface, a refractive power of a portion of which increases as a distance from the optical axis to the portion increases. Here, "the refractive power increases" means that the negative refractive power is reduced or that the positive refractive power increases.

With such a shape, the off-axial aberration in the wide-angle end is advantageously corrected.

Furthermore, it is preferable that the object-side negative lens of the second lens unit is a double-concave negative lens, the object-side surface of the double-concave negative-lens is an aspherical surface having a negative refractive power, the negative refractive power of a portion of which decreases as a distance from the optical axis to the portion increases, and the image-side surface of the double-concave negative lens is an aspherical surface having a negative refractive power, the negative refractive power of a portion of which increases as a distance from the optical axis to the portion increases.

In a case where the negative lens is constituted so as to have such a shape, while the negative power at the center and a peripheral portion of the lens is secured, an off-axial coma in the wide-angle end is advantageously corrected, and an angle of view is advantageously secured. Moreover, the whole second lens unit is advantageously thinned.

When the image-side surface of the negative lens of the second lens unit closest to the image side is an aspherical surface, the spherical aberration and the coma are effectively corrected. At this time, the following condition may be satisfied:

$$-0.09 < (ASP_{2n2r} - ASP_{2n2f})/f_w < -0.003 \quad (14A),$$

in which $ASP_{2n2f}$ is an aspherical displacement of an object-side lens surface of the image-side negative lens of the second lens unit, $ASP_{2n2r}$ is an aspherical displacement of an image-side lens surface of the image-side negative lens of the second lens unit, and $f_w$ is a focal length of the zoom lens system in the wide-angle end. The aspherical displacement in a case where the lens surface is a spherical surface or a flat surface is zero.

When $(ASP_{2n2r} - ASP_{2n2f})/f_w$ is not above an upper limit of −0.003 in the condition (14A), the overcorrection of the curvature of field is easily suppressed. When the value is not below a lower limit of −0.09, the spherical aberration and the coma are advantageously corrected. In either case, the satisfactory optical performance is effectively obtained.

The following condition is further preferable:

$$-0.07 < (ASP_{2n2r} - ASP_{2n2r})/f_w < -0.005 \quad (14A)'$$

It is further preferable to satisfy the following condition:

$$-0.05 < (ASP_{2n2r} - ASP_{2n2f})/f_w < -0.015 \quad (14A)''$$

Furthermore, it is preferable that the image-side negative lens of the second lens unit is a negative meniscus lens whose convex surface faces the image side, and the image-side surface of the negative meniscus lens is an aspherical surface having a positive refractive power, the positive refractive power of a portion of which increases as a distance from the optical axis to the portion increases.

Such a constitution is advantageous in satisfactorily correcting the spherical aberration of the second lens unit and various off-axial aberrations.

The positive lens of the second lens unit and the negative lens of the second lens unit closest to the image side may be single lenses independently of each other without being cemented, or may be cemented. When the lenses are not cemented, a degree of freedom of the aberration correction by use of an air contact surface increases. On the other hand, the cemented lenses are advantageous for the correction of the chromatic aberration. Deterioration of a yield caused by optical performance deterioration due to relative eccentricity can be reduced, and cost reduction results.

Moreover, it is preferable in respect of the chromatic aberration that the first lens unit includes a positive lens and a negative lens.

Especially, in the first lens unit, the negative lens and the positive lens may be arranged in order from the object side. In this case, considering from the first lens unit and the second lens unit in total, a satisfactorily symmetric constitution is obtained in which the negative lens, the positive lens, the negative lens, the positive lens and the negative lens are arranged in order from the object side. Especially in the wide-angle end, the aberration generated in a composite lens system composed of the first lens unit and the second lens unit can efficiently be cancelled. Moreover, since a rear principal point of the first lens unit is disposed close to the image side, a zoom ratio can effectively be secured.

When the negative lens and the positive lens of the first lens unit are not cemented one another and include lens components independently of one another, especially the coma in the telephoto end can satisfactorily be corrected using an air lens formed between the two lenses.

At this time, a space between these lenses may satisfy the following condition:

$$0.0 \le L_{1np}/L_1 < 0.2 \quad (15A)$$

in which $L_{1np}$ is an axial space between the negative lens and the positive lens of the first lens unit, and $L_1$ is a total axial thickness of the first lens unit.

If $L_{1np}/L_1$ exceeds an upper limit of 0.2 in the condition (15A), the height of the off-axial ray which passes through the lens closest to the object side increases to increase an effective diameter of the lens. In consequence, it is difficult to constitute the system to be compact in the diametric direction. The value is not below a lower limit of 0.0.

The following condition is further preferable:

$$0.0 \le L_{1np}/L_1 < 0.16 \quad (15A)'$$

It is further preferable to satisfy the following condition:

$$0.0 \le L_{1np}/L_1 < 0.12 \quad (15A)''$$

It is preferable that the negative lens and the positive lens of the first lens unit may be cemented. The chromatic aberration of magnification in the wide-angle end and the axial chromatic aberration in the telephoto end can satisfactorily be corrected. The deterioration of the yield caused by the performance deterioration due to the relative eccentricity can be reduced, and the cost reduction results.

When the first lens unit is constituted of one positive lens, the miniaturization and the cost reduction are advantageously achieved.

The third lens unit may include three or less lenses so as to thin the lens barrel.

Especially, it is preferable that the third lens unit is constituted of three lenses of a positive lens, a positive lens and a negative lens in order from the object side. This constitution is advantageous for correction of the spherical aberration, the coma and the chromatic aberration since the positive power is shared by two lenses and the negative lens is used. Since a principal point is disposed close to the object side, the zoom ratio is advantageously increased.

Moreover, it is preferable to cement the second positive lens from the object side to the negative lens on the optical axis in the third lens unit. When the positive lens is cemented to the negative lens, the axial chromatic aberration can more effectively be corrected. When the positive lens and the negative lens constitute a cemented lens, it is possible to prevent deterioration of the optical performance due to the relative eccentricity between the lenses caused in an assembly step. In consequence, the yield improves, and the costs are reduced.

When one or more aspherical surfaces are arranged in the third lens unit, the spherical aberration and the coma are effectively corrected. Especially, when the positive lens of the third lens unit closest to the object side is a lens having opposite aspherical surfaces, various aberrations are advantageously corrected. When the aspherical surfaces are arranged on a plurality of lenses, the optical performance easily largely deteriorates owing to the relative eccentricity between the lenses. However, when the opposite surfaces of one lens are aspherical surfaces, the deterioration of the optical performance due to the relative eccentricity between the lenses is reduced, and the spherical aberration and the coma can more satisfactorily be corrected.

The power of the second lens unit may satisfy the following condition:

$$0.20 < |f_2/f_t| < 0.325 \quad (16A),$$

in which $f_t$ is a focal length of the zoom lens system in the telephoto end.

When $|f_2/f_t|$ is not above an upper limit of 0.325 in the condition (16A) and the power is secured to reduce a movement amount for the zooming, the compact lens barrel is advantageously obtained. When the value is not below a lower limit of 0.20 so as to reduce the refractive power, the aberration correction is facilitated.

The following condition is further preferable:

$$0.25 < |f_2/f_t| < 0.320 \quad (16A)'$$

It is further preferable to satisfy the following condition:

$$0.29 < |f_2/f_t| < 0.315 \quad (16A)''$$

From a viewpoint of balance between the compact constitution and the optical performance, it is preferable that the power of the first lens unit is set so as to satisfy the following condition:

$$0.7 < f_1/f_t < 1.8 \quad (17A),$$

in which $f_1$ is a focal length of the first lens unit, and $f_t$ is a focal length of the zoom lens system in the telephoto end.

In a case where $f_1/f_t$ is set so that the value does not exceed an upper limit of 1.8 in the condition (17A) to secure the power of the first lens unit, the total length of the zoom lens system is easily reduced, and the system is easily miniaturized. When the value is not below a lower limit of 0.7 and the power is appropriately reduced, the spherical aberration and the coma in the telephoto end are easily suppressed.

The following condition is further preferable:

$$1.0 < f_1/f_t < 1.7 \tag{17A}'$$

It is further preferable to satisfy the following condition:

$$1.3 < f_1/f_t < 1.6 \tag{17A}''$$

It is preferable that the power of the third lens unit satisfies the following condition:

$$0.25 < f_3/f_t < 0.50 \tag{18A}$$

in which $f_3$ is a focal length of the third lens unit, and $f_t$ is a focal length of the zoom lens system in the telephoto end.

In a case where $f_3/f_t$ is set so that the value is not above an upper limit of 0.50 in the condition (18A) and the power is secured, the constitution is advantageous in reducing the total length of the zoom lens system and securing the zoom ratio. When the value is not below a lower limit of 0.25 and the refractive power is reduced, the constitution is advantageous for the aberration correction.

The following condition is further preferable:

$$0.30 < f_3/f_t < 0.40 \tag{18A}'$$

It is further preferable to satisfy the following condition:

$$0.34 < f_3/f_t < 0.38 \tag{18A}''$$

In a case where the zoom lens system includes a fourth lens unit having a positive refractive power and is constituted as a four-unit zoom lens system as a whole, the power of the fourth lens unit may satisfy the following condition:

$$0.40 < f_4/f_t < 1.0 \tag{19A}$$

in which $f_4$ is a focal length of the fourth lens unit, and $f_t$ is a focal length of the zoom lens system in the telephoto end.

It is preferable to set $f_4/f_t$ so that the value is not above an upper limit of 1.0 in the condition (19A). In consequence, the power of the fourth lens unit is secured to secure a function of refracting the off-axial ray. An angle of a ray which enters an electronic image pickup device such as a CCD image sensor or a CMOS type image sensor to be disposed on an image surface can be reduced, and generation of shading of brightness at a corner of the image surface is easily suppressed. When the value is not below a lower limit of 0.40 and the power of the fourth lens unit is appropriately reduced, the curvature of field is inhibited from being under-corrected. When the fourth lens unit is moved to perform the focusing, fluctuations of the curvature of field are easily reduced.

It is further preferable to satisfy the following condition:

$$0.50 < f_4/f_t < 0.80 \tag{19A}'$$

It is still further preferable to satisfy the following condition:

$$0.62 < f_4/f_t < 0.66 \tag{19A}''$$

The fourth lens unit may be formed of a plastic material. The fourth lens unit may have a function to arrange an exit pupil of the zoom lens system at an appropriate position so as to allow the ray to efficiently enter an electronic image pickup device such as the CCD image sensor or the CMOS type image sensor. To perform such a function, when the power of the fourth lens unit is set within a range of the above condition (19A), a large power is not required. Therefore, the unit can be constituted using a material such as the plastic material having a small refractive index. When the plastic lens is used in the fourth lens unit, the cost can be reduced, and it is possible to provide a more inexpensive zoom lens system.

It is to be noted that, to increase the zoom ratio while the performance of the system is maintained, it is preferable to impart the zooming function to each lens unit and to correct the aberration with good balance in the whole zooming region.

In a case where the zoom lens system is constituted as the four-unit zoom lens system, it is more preferable that during the zooming from the wide-angle end to the telephoto end, the first, second, third and fourth lens units move so that the space between the first lens unit and the second lens unit enlarges, the space between the second lens unit and the third lens unit narrows and the space between the third lens unit and the fourth lens unit enlarges.

When all the lens units are moved in this manner, the zooming can easily be performed while taking the aberration balance, and the constitution is advantageous for the increase of the zoom ratio. When the aperture stop is moved, the chromatic aberration of magnification and the distortion can effectively be corrected, and an effect can be produced in respect of the performance. Moreover, it is possible to appropriately control the positions of the entrance pupil and the exit pupil.

Therefore, the angle of the ray which enters the CCD image sensor, the CMOS type image sensor or the like can be kept in an appropriate range, and the generation of the shading of the brightness at the corner of the image surface can be prevented. The system is suitable for an image pickup apparatus in which the electronic image pickup device is used.

Moreover, during the zooming from the wide-angle end to the telephoto end, the first lens unit moves so as to be arranged closer to the object side in the telephoto end than in the wide-angle end, the second lens unit moves, the third lens unit moves toward the only object side, and the fourth lens unit moves. This constitution is advantageous in securing the zoom ratio while reducing the total length of the zoom lens system in the wide-angle end.

In this case, the first lens unit may be moved toward the only object side, or moved along a track being convex toward the image side.

The second lens unit may be moved toward the only image side, or moved along a track being convex toward the image side.

The third lens unit may be moved toward the only object side.

The fourth lens unit may be moved toward the only object or image side. Alternatively, the fourth lens unit may be moved along a track being convex toward the object or being convex toward the image side.

The aperture stop and a shutter unit may be arranged between the second lens unit and the third lens unit, and the shutter unit may be moved integrally with the third lens unit during the zooming. The entrance pupil can be positioned close to the object side, and the exit pupil can be positioned away from the image surface. The height of the off-axial ray is low between the second lens unit and the third lens unit. Therefore, the shutter unit does not have to be enlarged, and a dead space at a time when the aperture stop and the shutter unit are moved may be reduced.

Moreover, the zoom lens system may satisfy the following condition:

$$3.8 < f_t/f_w < 15.0 \quad (21A),$$

in which $f_w$ is a focal length of the zoom lens system in the wide-angle end, and $f_t$ is a focal length of the zoom lens system in the telephoto end.

It is preferable that $f_t/f_w$ is not above an upper limit of 15.0 in the condition (21A), so that the optical performance is easily secured. When the value is not below a lower limit of 3.8, the zoom ratio can be secured.

It is further preferable to satisfy the following condition:

$$4.2 < f_t/f_w < 10.0 \quad (21A)'.$$

It is still further preferable to satisfy the following condition:

$$4.5 < f_t/f_w < 6 \quad (21A)''.$$

Next, a second aspect of the zoom lens system according to the present invention will be described. The zoom lens system comprises, in order from an object side, a first lens unit having a positive refractive power, a second lens unit having a negative refractive power and a third lens unit having a positive refractive power.

During zooming from a wide-angle end to a telephoto end, a space between the first lens unit and the second lens unit and a space between the second lens unit and the third lens unit are changed.

The space between the first lens unit and the second lens unit is enlarged in the telephoto end as compared with the wide-angle end.

The space between the second lens unit and the third lens unit is narrowed in the telephoto end as compared with the wide-angle end.

The first lens unit comprises a positive lens, and the total number of the lenses of the first lens unit is two or less.

The second lens unit comprises, in order from the object side, an object-side negative lens having a double-concave shape, a positive lens and an image-side negative lens, and the total number of the lenses of the second lens unit is three.

An image-side surface of the positive lens is a convex surface which faces an image side, and an absolute value of a paraxial radius of curvature of the image-side surface of the positive lens is smaller than that of the paraxial radius of curvature of an object-side surface of the positive lens.

The object-side negative lens and the positive lens of the second lens unit are arranged with a air space on an optical axis therebetween.

The following conditions are satisfied:

$$0 < f_2/R_{2n1f} < 0.4 \quad (1B); \text{ and}$$

$$-1.6 < SF_{2air} < -0.5 \quad (2B),$$

in which $R_{2n1f}$ is a paraxial radius of curvature of an object-side surface of the object-side negative lens of the second lens unit, $f_2$ is a focal length of the second lens unit, $SF_{2air}$ is defined as $SF_{2air} = (R_{2n1r} + R_{2p1f})/(R_{2n1r} - R_{2p1f})$, $R_{2n1r}$ is a paraxial radius of curvature of an image-side surface of the object-side negative lens of the second lens unit, and $R_{2p1f}$ is a paraxial radius of curvature of the object-side surface of the positive lens of the second lens unit.

In the second aspect, the zoom lens system comprises, in order from the object side, the first lens unit having the positive refractive power, the second lens unit having the negative refractive power and the third lens unit having the positive refractive power. During the zooming from the wide-angle end to the telephoto end, the space between the first lens unit and the second lens unit and the space between the second lens unit and the third lens unit are changed. The space between the first lens unit and the second lens unit is enlarged in the telephoto end as compared with the wide-angle end, and the space between the second lens unit and the third lens unit is narrowed in the telephoto end as compared with the wide-angle end.

According to such a constitution, burdens of the zooming can efficiently be shared by the second and third lens units, and aberration fluctuations during the zooming are easily reduced while securing a zoom ratio.

Moreover, the number of the lenses constituting the first lens unit is as small as two or less, and the number of the lenses constituting the second lens unit is as small as three. In consequence, a thickness of the zoom lens system at a time when a lens barrel is collapsed is easily reduced. A distance from the surface of the first lens unit closest to the object side to an entrance pupil in the wide-angle end is easily reduced, and a size of the zoom lens system in a diametric direction is easily reduced.

Furthermore, the second lens unit includes two negative lenses, and the negative power of the second lens unit is shared by the lenses. In consequence, aberrations are easily reduced. Further in the second lens unit, the negative lens, the positive lens and the negative lens are arranged in order from the object side. In consequence, symmetry of a lens constitution is improved, and aberration correction is efficiently performed in the second lens unit.

In addition, in the above zoom lens system, both of the object-side surface and the image-side surface of the object-side negative lens of the second lens unit are concave surfaces.

According to such a shape, the negative power of the second lens unit is easily secured while generation of a spherical aberration in the telephoto end is suppressed, and a thickness of the second lens unit along the optical axis is easily reduced.

Moreover, the image-side surface of the positive lens of the first lens unit is the convex surface which faces the image side, and the absolute value of the paraxial radius of curvature of the image-side surface of the positive lens is smaller than that of the paraxial radius of curvature of the object-side surface of the positive lens. The object-side negative lens and the positive lens of the second lens unit are arranged so that an air space on the optical axis is interposed between these lenses. According to such a constitution, while the positive refractive power of the positive lens of the second lens unit is secured, a principal point of the second lens unit is disposed close to the object side to advantageously secure a zoom ratio. An aberration balance between the object-side double-concave negative lens and the image-side negative lens is easily taken.

In the second aspect, the zoom lens system further satisfies the following conditions:

$$0 < f_2/R_{2n1f} < 0.4 \quad (1B); \text{ and}$$

$$-1.6 < SF_{2air} < -0.5 \quad (2B),$$

in which $R_{2n1f}$ is the paraxial radius of curvature of the object-side surface of the object-side negative lens of the second lens unit, $f_2$ is the focal length of the second lens unit, $SF_{2air}$ is defined as $SF_{2air} = (R_{2n1r} + R_{2p1f})/(R_{2n1r} - R_{2p1f})$, $R_{2n1r}$ is the paraxial radius of curvature of the image-side surface of the object-side negative lens of the second lens unit, and $R_{2p1f}$ is the paraxial radius of curvature of the object-side surface of the positive lens of the second lens unit.

In a case where the object-side surface of the negative lens of the second lens unit closest to the object side has a concave shape which faces the object side, the principal point of the second lens unit is positioned close to the first lens unit. This constitution serves to reduce the total length and/or to increase magnification of the second lens unit to enlarge the zoom ratio. At this time, the condition (1B) may be satisfied.

In a case where $f_2/R_{2n1f}$ is set so that the value is not below a lower limit of 0.0 of the condition (1B), an effect of disposing the principal point position of the second lens unit close to the first lens unit is easily obtained, and this constitution is advantageous for reduction of the total length and the increase of the zoom ratio.

When $f_2/R_{2n1f}$ is not above an upper limit of 0.4 in the condition (1B) so as to appropriately reduce the curvature of this surface, especially overcorrection of a curvature of field in the wide-angle end is easily suppressed.

When the condition (1B) is satisfied, the negative power of the second lens unit easily intensifies. The condition (2B) may be satisfied so that the negative power of the second lens unit is kept in an appropriate range and a satisfactory aberration situation is easily maintained.

It is preferable that $SF_{2air}$ is not above an upper limit of −0.5 in the condition (2B), so that the negative power of the second lens unit is appropriately suppressed and generations of various aberrations are suppressed. Especially, the overcorrection of the curvature of field is easily suppressed.

When $SF_{2air}$ is not below a lower limit of −1.6 of the condition (2B) and the curvature of the object-side surface of the positive lens is suppressed, a difference of an angle of refraction between an upper ray and a lower ray of an off-axial light flux can be reduced in consequence, it is preferable that an amount of a coma to be generated in the telephoto end is appropriately suppressed, and an excessively large aberration amount generated by the positive lens for an amount of the aberration generated by the negative lens is suppressed.

Regarding condition (1B), it is more preferable to satisfy the following condition:

$$0.005 < R_{2n1f}/f_2 < 0.3 \tag{1B}'$$

It is still further preferable to satisfy the following condition:

$$0.01 < R_{2n1f}/f_2 < 0.2 \tag{1B}''$$

Regarding condition (2B), it is more preferable to satisfy the following condition:

$$-1.4 < SF_{2air} < -0.7 \tag{2B}'$$

It is still further preferable to satisfy the following condition:

$$-1.2 < SF_{2air} < -0.9 \tag{2B}''$$

Furthermore, it is preferable that the number of the lenses on the image side from the third lens unit of the zoom lens system is three or less.

This constitution is advantageous for the thinning of the zoom lens system at the time when the lens barrel is collapsed and simplification of the constitution of the zoom lens system.

When the zoom lens system is constituted as a three-unit zoom lens system, a mechanism to move the lenses can be simplified.

When the zoom lens system is constituted a four-unit zoom lens and the fourth lens unit has a positive refractive power, the fourth lens unit can be provided with a function of disposing an exit pupil away from the fourth lens unit. In a constitution in which the fourth lens unit is moved to perform focusing, a change of an angle of view during the focusing is easily suppressed. A constitution in which the fourth lens unit is composed of one positive lens is preferable for the miniaturization of the system at the time when the lens barrel is collapsed or the like.

Moreover, when the zoom lens system is constituted as a five-unit zoom lens system, the fourth lens unit has a negative refractive power and a fifth lens unit has a positive refractive power, the whole zoom lens system has a symmetric power arrangement of the lens units, fluctuations of an astigmatism during the zooming are easily reduced.

Furthermore, when opposite surfaces of the space between the first lens unit and the second lens unit satisfy the following condition, more satisfactory miniaturization and aberration balance are easily achieved.

$$0.00 < (1/R_{2n1f} - 1/R_{1r}) \cdot f_2 < 0.40 \tag{3B},$$

in which $R_{2n1f}$ is a paraxial radius of curvature of the object-side surface of the object-side negative lens of the second lens unit, and $R_{1r}$ is a paraxial radius of curvature of the image-side surface of the lens of the first lens unit closest to the image side.

This condition regulates a difference of a curvature between lens surfaces before and after the space disposed between the first lens unit and the second lens unit so that the aberration balance from the wide-angle end to the telephoto end is easily taken.

In a case where $(1/R_{2n1f} - 1/R_{1r}) \cdot f_2$ is set so that the value is not below a lower limit of 0.00 in the condition (3B), the lens surface of the first lens unit is easily disposed close to the surface of the second lens unit in an region off the optical axis in the wide-angle end. This constitution is advantageous in securing the difference of the curvature between the lens surfaces and correcting the curvature of field in the wide-angle end.

When $(1/R_{2n1f} - 1/R_{1r}) \cdot f_2$ is not above an upper limit of 0.40 in the condition (3B), the power of the first lens unit is advantageously secured, and the spherical aberration in the telephoto end is advantageously corrected.

The following condition is further preferable:

$$0.03 < (1/R_{2n1f} - 1/R_{1r}) \cdot f_2 < 0.30 \tag{3B}'$$

It is further preferable to satisfy the following condition:

$$0.07 < (1/R_{2n1f} - 1/R_{1r}) \cdot f_2 < 0.20 \tag{3B}''$$

Only lower or upper limit values of the above conditions may be limited. This also applies to the following conditions.

It is preferable that the positive lens of the second lens unit satisfies the following conditions (4A), (5A). These are conditions concerning a refractive index and Abbe number of the positive lens of the second lens unit.

$$1.84 < n_{d2p} < 2.20 \tag{4A; and}$$

$$13.0 < \nu_{d2p} < 30.0 \tag{5A},$$

in which $n_{d2p}$ is a refractive index of the positive lens of the second-lens unit for the d-line, and $\nu_{d2p}$ is the Abbe number of the positive lens of the second lens unit.

Meanings of these conditions have been described above.

The following conditions are further preferable:

$$1.87 < n_{d2p} < 2.15 \tag{4A}'; and$$

$$15.0 < \nu_{d2p} < 26.0 \tag{5A}'.$$

The following conditions are still further preferable:

$$1.90 < n_{d2p} < 2.12 \tag{4A}''; and$$

$$17.0 < \nu_{d2p} < 21.0 \tag{5A}''.$$

To further reduce the generation of the aberration in the second lens unit, it is preferable that a shape of the positive lens of the second lens unit is set so as to satisfy the following condition:

$$0.45 < SF_{2p} < 1.80 \quad (6A)$$

in which $SF_{2p}$ is defined as $SF_{2p} = (R_{2pf} + R_{2pr})/(R_{2pf} - R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

Meanings of these conditions have been described above. The following condition is further preferable:

$$0.55 < SF_{2p} < 1.6 \quad (6A)'$$

It is further preferable to satisfy the following condition:

$$0.6 < SF_{2p} < 1.3 \quad (6A)''$$

It is preferable that a material of the negative lens of the second lens unit closest to the object side satisfies the following conditions:

$$1.78 < n_{d2n1} < 2.20 \quad (7A); \text{ and}$$

$$35 < v_{d2n1} < 50 \quad (8A),$$

in which $n_{d2n1}$ is a refractive index of the object-side negative lens of the second lens unit for the d-line, and $v_{d2n1}$ is the Abbe number of the object-side negative lens of the second lens unit.

Meanings of these conditions have been described above. It is further preferable to satisfy the following conditions:

$$1.79 < n_{d2n1} < 1.95 \quad (7A)'; \text{ and}$$

$$37 < v_{d2n1} < 47 \quad (8A)'$$

It is still further preferable to satisfy the following conditions:

$$1.80 < n_{d2n1} < 1.90 \quad (7A)''; \text{ and}$$

$$40 < v_{d2n1} < 43 \quad (8A)''$$

An optimum material of the negative lens of the second lens unit closest to the image side may be set. Specifically, the following conditions may be satisfied:

$$1.78 < n_{d2n2} < 2.00 \quad (9A); \text{ and}$$

$$35 < v_{d2n2} < 50 \quad (10A),$$

in which $n_{d2n2}$ is a refractive index of the image-side negative lens of the second lens unit for the d-line, and $v_{d2n2}$ is the Abbe number of the image-side negative lens of the second lens unit.

Meanings of these conditions have been described above. The following conditions are further preferable:

$$1.79 < n_{d2n2} < 1.95 \quad (9A)'; \text{ and}$$

$$38 < v_{d2n2} < 48 \quad (10A)'$$

It is further preferable to satisfy the following conditions:

$$1.80 < n_{d2n2} < 1.90 \quad (9A)''; \text{ and}$$

$$40 < v_{d2n2} < 47 \quad (10A)''$$

A shape of this negative lens may satisfy the following condition:

$$-3.0 < SF_{2n2} < -0.6 \quad (11A),$$

in which $SF_{2n2}$ is defined as $SF_{2n2} = (R_{2n2f} + R_{2n2r})/(R_{2n2f} - R_{2n2r})$, $R_{2n2f}$ is a paraxial radius of curvature of an object-side surface of an image-side negative lens of the second lens unit, and $R_{2n2r}$ is a paraxial radius of curvature of an image-side surface of the image-side negative lens of the second lens unit.

Meanings of the condition has been described above. The following condition is further preferable:

$$-2.6 < SF_{2n2} < -0.9 \quad (11A)'$$

It is further preferable to satisfy the following condition:

$$-2.1 < SF_{2n2} < -1.1 \quad (11A)''$$

Moreover, in order to satisfactorily correct the aberration, the positive lens of the second lens unit may satisfy the following condition:

$$-3.0 < f_{2p}/f_2 < -1.0 \quad (12A),$$

in which $f_{2p}$ is a focal length of the positive lens of the second lens unit.

Meanings of these conditions have been described above. The following condition is further preferable:

$$-2.8 < f_{2p}/f_2 < -1.4 \quad (12A)'$$

It is further preferable to satisfy the following condition:

$$-2.6 < f_{2p}/f_2 < -1.8 \quad (12A)''$$

Moreover, to further suppress the generation of the aberration and obtain the satisfactory optical performance, an aspherical surface may be disposed on at least one lens surface of the negative lens of the second lens unit closest to the object side. Moreover, the aspherical surfaces may be disposed on the opposite surfaces. A coma and the curvature of field are effectively corrected.

At this time, the following conditions may be satisfied:

$$0.002 < (ASP_{2n1f} + |ASP_{2n1r}|)/f_w < 0.10 \quad (13A); \text{ and}$$

$$-0.06 < (ASP_{2n1r} - ASP_{2n1f})/f_w < 0.06 \quad (13B),$$

in which $ASP_{2n1f}$ is an aspherical displacement of the object-side lens surface of the object-side negative lens of the second lens unit, $ASP_{2n1r}$ is an aspherical displacement of the image-side lens surface of the object-side negative lens of the second lens unit, and $f_w$ is a focal length of the zoom lens system in the wide-angle end. Here, as shown in FIG. 43, assuming that a spherical surface having the same surface vertex as a vertex P of a lens surface LS and a radius of curvature equal to a paraxial radius R of curvature of the lens surface is a reference spherical surface RS, the aspherical displacement ASP is a distance from the reference spherical surface to the lens surface, which is measured in parallel with an optical axis $L_C$ at a position of a maximum incidence height $Y_W$ of a ray entering the lens surface in the wide-angle end. A distance measured toward the image side (a rightward direction in the drawing) is represented by a positive sign. The aspherical displacement in a case where the lens surface is a spherical surface or a flat surface is zero.

Meanings of these conditions have been described above. The following condition is further preferable:

$$-0.055 < (ASP_{2n1r} - ASP_{2n1f})/f_w < 0.04 \quad (13B)'$$

It is further preferable to satisfy the following condition:

$$-0.059 < (ASP_{2n1r} - ASP_{2n1f})/f_w < 0.015 \quad (13B)''$$

Moreover, the object-side surface of the object-side negative lens of the second lens unit may be an aspherical surface, a refractive power of a portion of which increases as a distance from the optical axis to the portion increases. Here, "the refractive power increases" means that the negative refractive power is reduced or that the positive refractive power increases.

In a case where the negative lens is constituted so as to have such a shape, an off-axial aberration in the wide-angle end is advantageously corrected.

Furthermore, it is preferable that the object-side negative lens of the second lens unit is a double-concave negative lens, the object-side surface of the double-concave negative lens is an aspherical surface having a negative refractive power, the negative refractive power of a portion of which decreases as a distance from the optical axis to the portion increases, and the image-side surface of the double-concave negative lens is an aspherical surface having a negative refractive power, the negative refractive power of a portion of which increases as a distance from the optical axis to the portion increases.

In a case where the negative lens is constituted so as to have such a shape, while the negative power at the center and a peripheral portion of the lens is secured, an off-axial coma in the wide-angle end is advantageously corrected, and an angle of view is advantageously secured. Moreover, the whole second lens unit is advantageously thinned.

When the image-side surface of the negative lens of the second lens unit closest to the image side is an aspherical surface, the spherical aberration and the coma are effectively corrected. At this time, the following condition may be satisfied:

$$-0.09 < (ASP_{2n2r} - ASP_{2n2f})/f_w < -0.003 \quad (14A),$$

in which $ASP_{2n2f}$ is an aspherical displacement of the object-side lens surface of the image-side negative lens of the second lens unit, $ASP_{2n2r}$ is an aspherical displacement of the image-side lens surface of the image-side negative lens of the second lens unit, and $f_w$ is a focal length of the whole zoom lens system in the wide-angle end. The aspherical displacement in a case where the lens surface is a spherical surface or a flat surface is zero.

Meanings of the condition has been described above.
The following condition is further preferable:

$$-0.07 < (ASP_{2n2r} - ASP_{2n2f})/f_w < -0.005 \quad (14A)'.$$

It is further preferable to satisfy the following condition:

$$-0.05 < (ASP_{2n2r} - ASP_{2n2f})/f_w < -0.015 \quad (14A)''.$$

Furthermore, it is preferable that the image-side negative lens of the second lens unit is a negative meniscus lens whose convex surface faces the image side, and the image-side surface of the negative meniscus lens is an aspherical surface having a positive refractive power, the positive refractive power of a portion of which increases as a distance from the optical axis to the portion increases.

Such a constitution is advantageous in satisfactorily correcting the spherical aberration of the second lens unit and various off-axial aberrations.

The positive lens of the second lens unit and the negative lens of the second lens unit closest to the image side may be single lenses independently of each other without being cemented, or may be cemented. When the lenses are not cemented, a degree of freedom of the aberration correction by use of an air contact surface increases. On the other hand, the cemented lenses are advantageous for the correction of the chromatic aberration. Deterioration of a yield caused by optical performance deterioration due to relative eccentricity can be reduced, and cost reduction results.

Moreover, it is preferable in respect of the chromatic aberration that the first lens unit includes a positive lens and a negative lens.

Especially, in the first lens unit, the negative lens and the positive lens may be arranged in order from the object side. In this case, considering from the first lens unit and the second lens unit in total, a satisfactorily symmetric constitution is obtained in which the negative lens, the positive lens, the negative lens, the positive lens and the negative lens are arranged in order from the object side. Especially in the wide-angle end, the aberration generated in a composite lens system composed of the first lens unit and the second lens unit can efficiently be cancelled. Moreover, since a rear principal point of the first lens unit is disposed close to the image side, a zoom ratio can effectively be secured.

When the negative lens and the positive lens of the first lens unit are not cemented and include lens components independently of one another, especially the coma in the telephoto end can satisfactorily be corrected using an air lens formed between the two lenses.

At this time, a space between both of the lenses may satisfy the following condition:

$$0.0 \leq L_{1np}/L_1 < 0.2 \quad (15A),$$

in which $L_{1np}$ is an axial space between the negative lens and the positive lens of the first lens unit, and $L_1$ is a total axial thickness of the first lens unit.

Meanings of this condition have been described above.
The following condition is further preferable:

$$0.0 \leq L_{1np}/L_1 < 0.16 \quad (15A)'.$$

It is further preferable to satisfy the following condition:

$$0.0 \leq L_{1np}/L_1 < 0.12 \quad (15A)''.$$

Moreover, the negative lens and the positive lens of the first lens unit may be cemented. The chromatic aberration of magnification in the wide-angle end and the axial chromatic aberration in the telephoto end can satisfactorily be corrected. The deterioration of the yield caused by the performance deterioration due to the relative eccentricity can be reduced, and the cost reduction results.

When the first lens unit includes one positive lens, the miniaturization and the cost reduction are advantageously achieved.

The third lens unit may include three or less lenses so as to thin the lens barrel.

Especially, it is preferable that the third lens unit is constituted of three lenses of a positive lens, a positive lens and a negative lens in order from the object side. This constitution is advantageous for correction of the spherical aberration, the coma and the chromatic aberration since the positive power is shared by two lenses and the negative lens is used. Since a principal point is disposed close to the object side, the zoom ratio is advantageously increased.

Moreover, it is preferable to cement the second positive lens from the object side to the negative lens on the optical axis in the third lens unit. When the positive lens is cemented to the negative lens, the axial chromatic aberration can more effectively be corrected. When the positive lens and the negative lens constitute a cemented lens, it is possible to prevent deterioration of the optical performance due to the relative eccentricity between the lenses caused in an assembly step. In consequence, the yield improves, and the costs are reduced.

When one or more aspherical surfaces are arranged in the third lens unit, the spherical aberration and the coma are effectively corrected. Especially, when the positive lens of the third lens unit closest to the object side is a lens having opposite aspherical surfaces, various aberrations are advantageously corrected. When the aspherical surfaces are arranged on a plurality of lenses, the optical performance easily largely deteriorates owing to the relative eccentricity between the lenses. However, when the opposite surfaces of one lens are aspherical surfaces, the deterioration of the optical performance due to the relative eccentricity between the lenses is reduced, and the spherical aberration and the coma can more satisfactorily be corrected.

The power of the second lens unit may satisfy the following condition:

$$0.20 < |f_2/f_t| < 0.325 \quad (16A),$$

in which $f_t$ is a focal length of the zoom lens system in the telephoto end.

Meanings of this condition have been described above.
The following condition is further preferable:

$$0.25 < |f_2/f_t| < 0.320 \quad (16A)'.$$

It is further preferable to satisfy the following condition:

$$0.29 < |f_2/f_t| < 0.315 \quad (16A)''.$$

From a viewpoint of balance between the compact constitution and the optical performance, it is preferable that the power of the first lens unit is set so as to satisfy the following condition:

$$0.7 < f_1/f_t < 1.8 \quad (17A),$$

in which $f_1$ is a focal length of the first lens unit, and $f_t$ is a focal length of the zoom lens system in the telephoto end.

Meanings of this condition have been described above.
The following condition is further preferable:

$$1.0 < f_1/f_t < 1.7 \quad (17A)'.$$

It is further preferable to satisfy the following condition:

$$1.3 < f_1/f_t < 1.6 \quad (17A)''.$$

It is preferable that the power of the third lens unit satisfies the following condition:

$$0.25 < f_3/f_t < 0.50 \quad (18A),$$

in which $f_3$ is a focal length of the third lens unit, and $f_t$ is a focal length of the zoom lens system in the telephoto end.

Meanings of this condition have been described above.
The following condition is further preferable:

$$0.30 < f_3/f_t < 0.40 \quad (18A)'.$$

It is further preferable to satisfy the following condition:

$$0.34 < f_3/f_t < 0.38 \quad (18A)''.$$

In a case where the zoom lens system includes a fourth lens unit having a positive refractive power and is constituted as a four-unit zoom lens system as a whole, the power of the fourth lens unit may satisfy the following condition:

$$0.40 < f_4/f_t < 1.0 \quad (19A),$$

in which $f_4$ is a focal length of the fourth lens unit, and $f_t$ is a focal length of the zoom lens system in the telephoto end.

Meanings of this condition have been described above.
It is further preferable to satisfy the following condition:

$$0.50 < f_4/f_t < 0.80 \quad (19A)'.$$

It is still further preferable to satisfy the following condition:

$$0.62 < f_4/f_t < 0.66 \quad (19A)''.$$

The fourth lens unit may be formed of a plastic material. The fourth lens unit may have a function to arrange an exit pupil of the zoom lens system at an appropriate position so as to allow the ray to efficiently enter an electronic image pickup device such as the CCD image sensor or the CMOS type image sensor. To perform such a function, when the power of the fourth lens unit is set within a range of the above condition (19A), a large power is not required. Therefore, the unit can be constituted using a material such as the plastic material having a small refractive index. When the plastic lens is used in the fourth lens unit, the cost can be reduced, and it is possible to provide a more inexpensive zoom lens system.

It is to be noted that, to increase the zoom ratio while the performance of the system is maintained, it is preferable to impart the zooming function to each lens unit and to correct the aberration with good balance in the whole zooming region.

In a case where the zoom lens system is constituted as the four-unit zoom lens system, it is more preferable that during the zooming from the wide-angle end to the telephoto end, the first, second, third and fourth lens units move so that the space between the first lens unit and the second lens unit enlarges, the space between the second lens unit and the third lens unit narrows and the space between the third lens unit and the fourth lens unit enlarges.

When all the lens units are moved in this manner, the zooming can easily be performed while taking the aberration balance, and the constitution is advantageous for the increase of the zoom ratio. When the aperture stop is moved, the chromatic aberration of magnification and the distortion can effectively be corrected, and an effect can be produced in respect of the performance. Moreover, it is possible to appropriately control the positions of the entrance pupil and the exit pupil.

Therefore, the angle of the ray which enters the CCD image sensor, the CMOS type image sensor or the like can be kept in an appropriate range, and generation of shading of brightness at a corner of an image surface can be prevented. The system is suitable for an image pickup apparatus in which the electronic image pickup device is used.

Moreover, during the zooming from the wide-angle end to the telephoto end, the first lens unit moves so as to be arranged closer to the object side in the telephoto end than in the wide-angle end, the second lens unit moves, the third lens unit moves toward the only object side, and the fourth lens unit moves. This constitution is advantageous in securing the zoom ratio while reducing the total length of the zoom lens system in the wide-angle end.

In this case, the first lens unit may be moved toward the only object side, or moved along a track being convex toward the image side.

The second lens unit may be moved toward the only image side, or moved along a track being convex toward the image side.

The third lens unit may be moved toward the only object side.

The fourth lens unit may be moved toward the only object or image side. Alternatively, the fourth lens unit may be moved along a track being convex toward the object or being convex toward the image side.

An aperture stop and a shutter unit may be arranged between the second lens unit and the third lens unit, and the shutter unit may be moved integrally with the third lens unit during the zooming. The entrance pupil can be positioned close to the object side, and the exit pupil can be positioned away from the image surface. The height of the off-axial ray is low between the second lens unit and the third lens unit.

Therefore, the shutter unit does not have to be enlarged, and a dead space at a time when the aperture stop and the shutter unit are moved may be reduced.

Moreover, the zoom lens system may satisfy the following condition:

$$3.8 < f_t/f_w < 15.0 \tag{21A}$$

in which $f_w$ is a focal length of the zoom lens system in the wide-angle end, and $f_t$ is a focal length of the zoom lens system in the telephoto end.

Meanings of this condition have been described above.

It is further preferable to satisfy the following condition:

$$4.2 < f_t/f_w < 10.0 \tag{21A}'$$

It is still further preferable to satisfy the following condition:

$$4.5 < f_t/f_w < 6 \tag{21A}''$$

Moreover, an electronic image pickup apparatus according to the present invention comprises the zoom lens system according to the present invention, and an electronic image pickup device which is disposed on an image side of the zoom lens system and which converts an optical image formed by the zoom lens system into an electric signal.

Furthermore, such an electronic image pickup apparatus may satisfy the following condition:

$$0.70 < I_m/f_w < 1.00 \tag{20A}$$

in which $I_m$ is a maximum image height, and $f_w$ is a focal length of the zoom lens system in a wide-angle end.

When $I_m/f_w$ is not above an upper limit of 1.00 in the condition (20A), an angle of view is not excessively increased. Therefore, the constitution is advantageous in reducing generation of a barrel type distortion. When the value is not below a lower limit of 0.70, merits of miniaturization and wide angle of the zoom lens system according to the present invention can be utilized.

The following condition is further preferable:

$$0.72 < I_m/f_w < 0.90 \tag{20A}'$$

It is further preferable to satisfy the following condition:

$$0.74 < I_m/f_w < 0.77 \tag{20A}''$$

Next, numerical examples will be described.

FIGS. 1A to 21C are sectional views of Examples 1 to 21 including an optical axis when focused at infinity. In these drawings, FIGS. 1A, 2A, 3A, . . . are sectional views in a wide-angle end, FIGS. 1B, 2B, 3B, . . . are sectional views in an intermediate position, and FIGS. 1C, 2C, 3C, . . . are sectional views in a telephoto end, respectively. In FIGS. 1A to 21C, a first lens unit is denoted with G1, a second lens unit is denoted with G2, an aperture stop is denoted with S, a third lens unit is denoted with G3, a fourth lens unit is denoted with G4, a fifth lens unit is denoted with G5, an optical low pass filter is denoted with F, cover glass of an electronic image pickup device is denoted with C, and an image surface is denoted with I. It is to be noted that, to remove an infrared ray, for example, the surface of the optical low pass filter F may directly be provided with an infrared ray cut coating. Alternatively, an infrared cut absorption filter may separately be arranged.

Figure 1B:
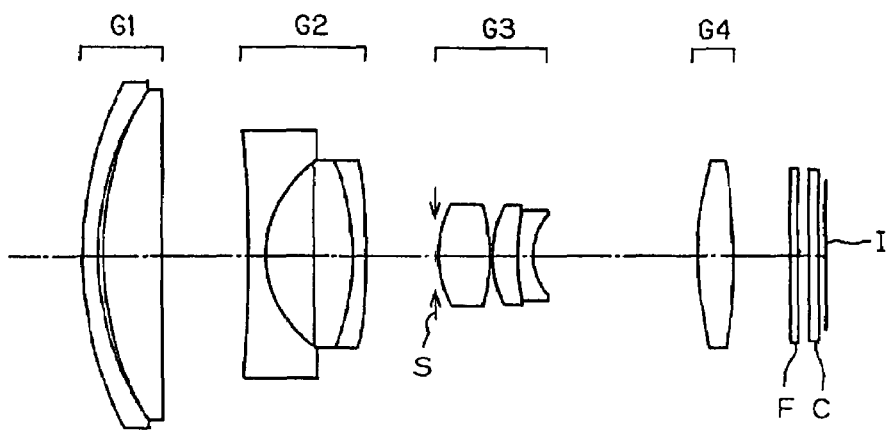
Figure 1C:
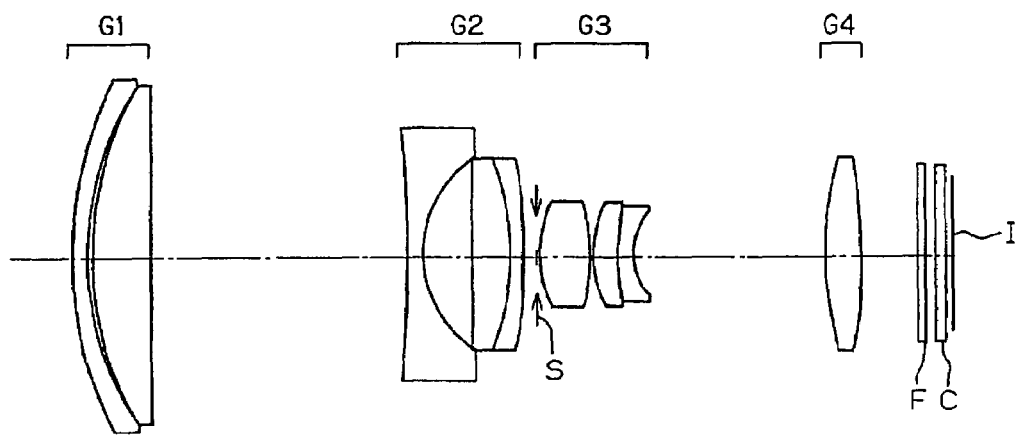

As shown in FIGS. 1A to 1C, Example 1 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit G4 and the third lens unit G3, and is positioned slightly closer to the object side in the telephoto end than in the wide-angle end.

The first lens unit G1 includes a negative meniscus lens whose convex surface faces the object side and a positive meniscus lens whose convex surface faces the object side in order from the object side. The second lens unit G2 includes, in order from the object side, a double-concave negative lens, a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, an image-side surface of the negative meniscus lens of the second lens unit G2, opposite surfaces of the double-convex positive lens of the third lens unit G3 and an object-side surface of the double-convex positive lens of the fourth lens unit G4.

Figure 2A:
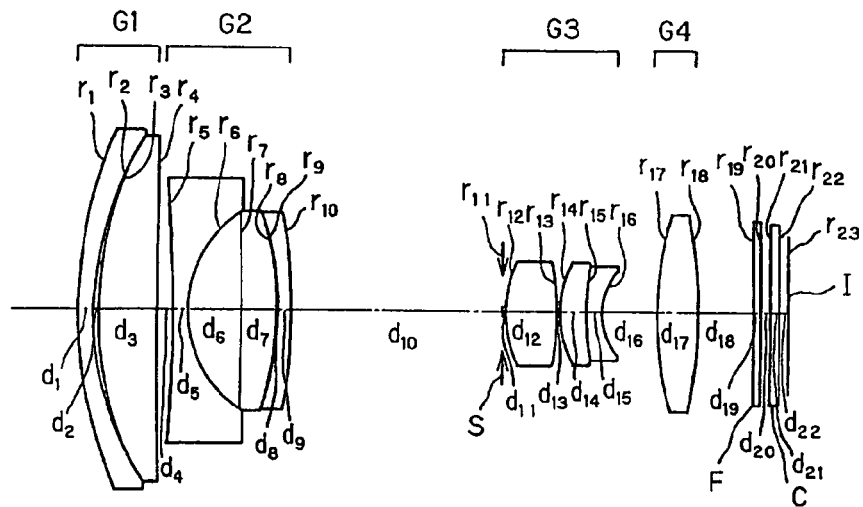
FIGS. 2A to 2C are sectional views of Example 2 of the zoom lens system including the optical axis according to the present invention when focused at infinity.
Figure 2B:
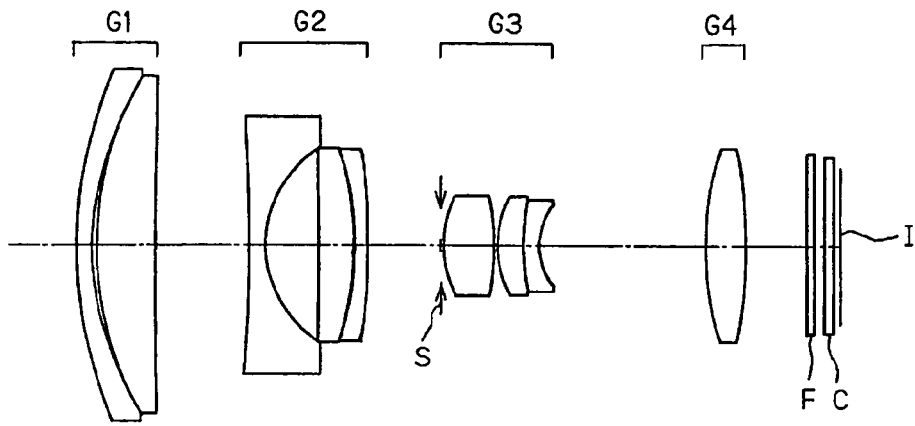
Figure 2C:
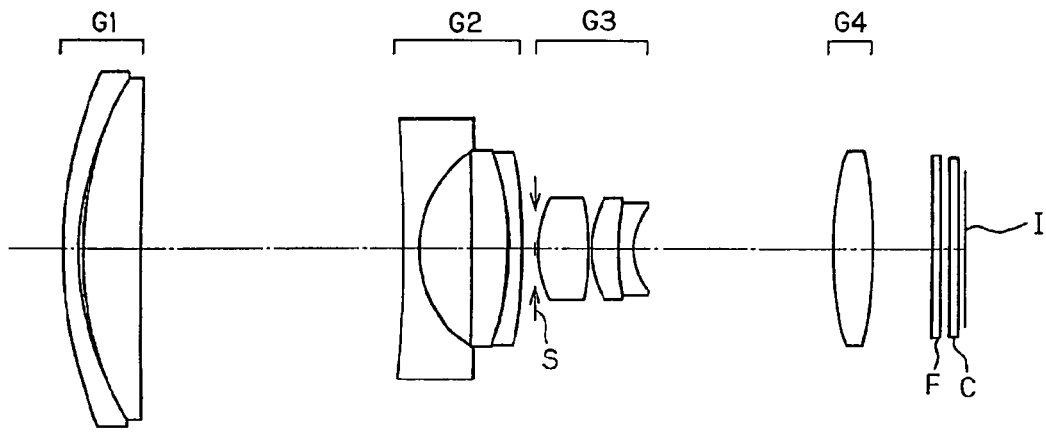

As shown in FIGS. 2A to 2C, Example 2 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3 and an object-side surface of the double-convex positive lens of the fourth lens unit G4.

Figure 3A:
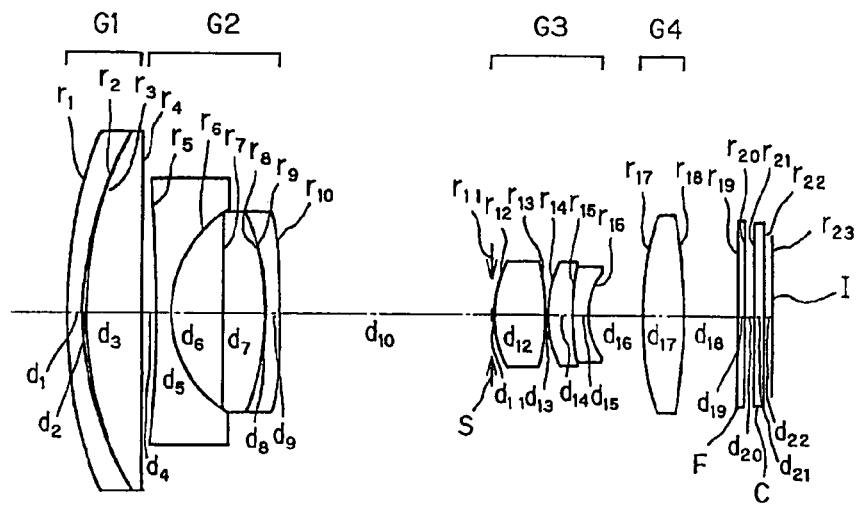
FIGS. 3A to 3C are sectional views of Example 3 of the zoom lens system including the optical axis according to the present invention when focused at infinity.
Figure 3B:
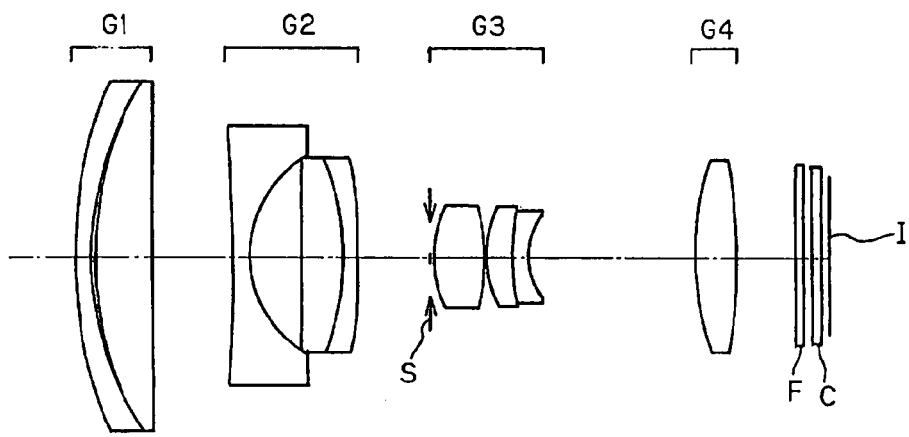
Figure 3C:
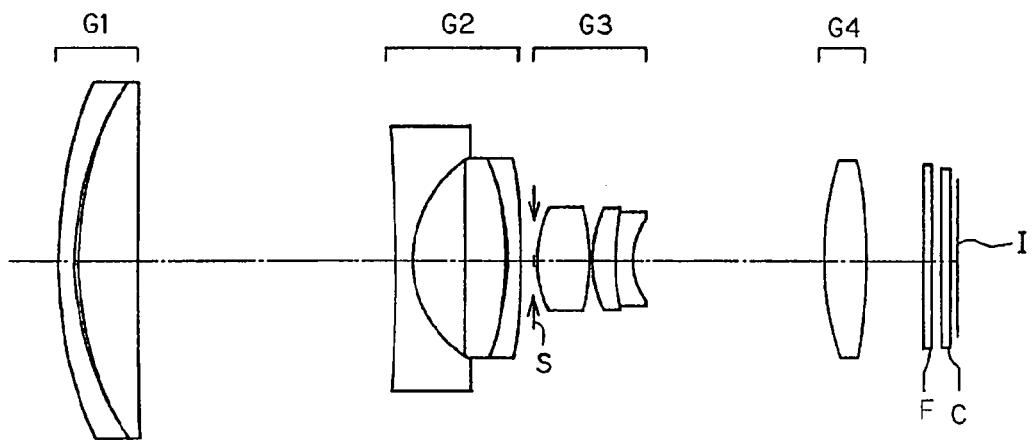

As shown in FIGS. 3A to 3C, Example 3 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3 and an object-side surface of the double-convex positive lens of the fourth lens unit G4.

Figure 4A:
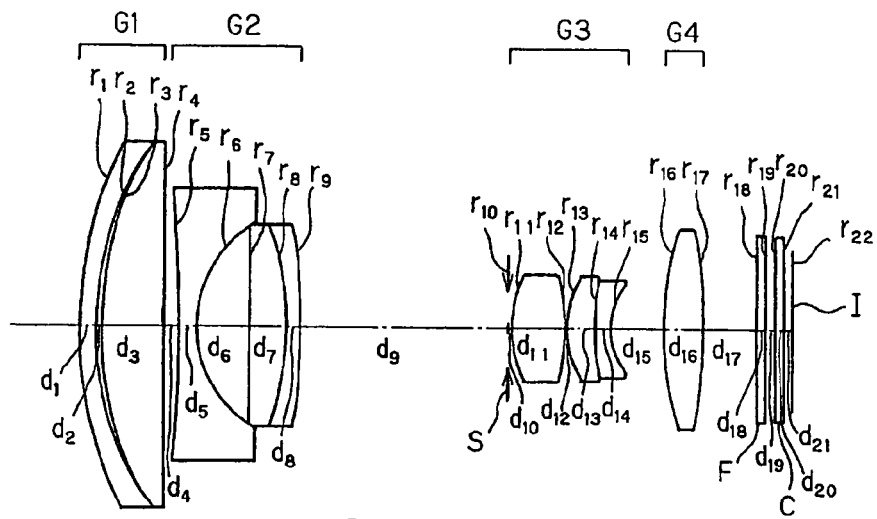
FIGS. 4A to 4C are sectional views of Example 4 of the zoom lens system including the optical axis according to the present invention when focused at infinity.
Figure 4B:
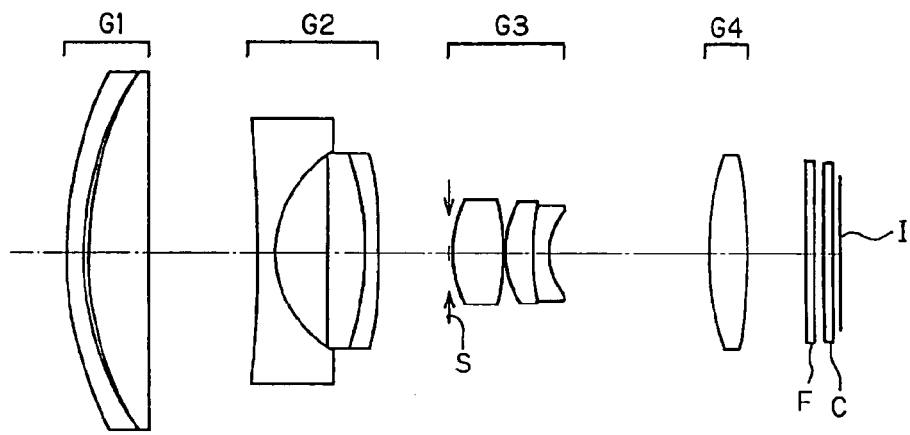
Figure 4C:
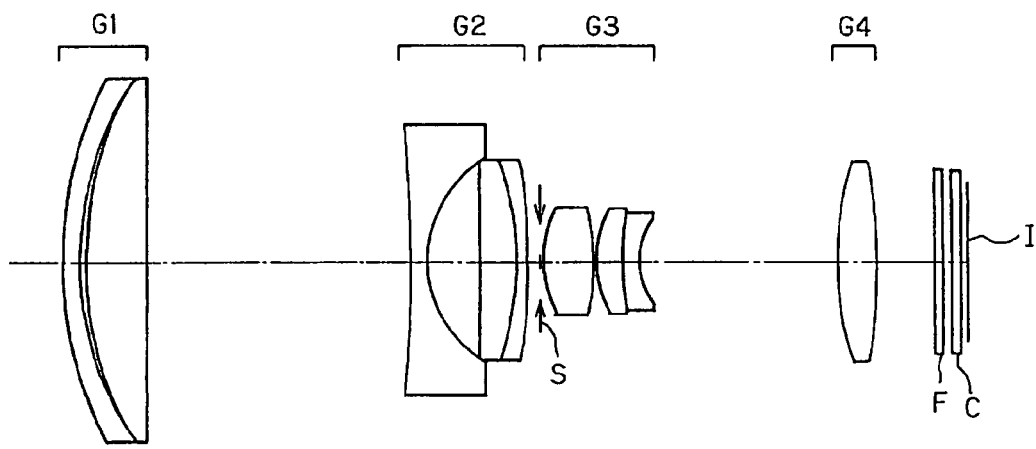

As shown in FIGS. 4A to 4C, Example 4 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 5A:
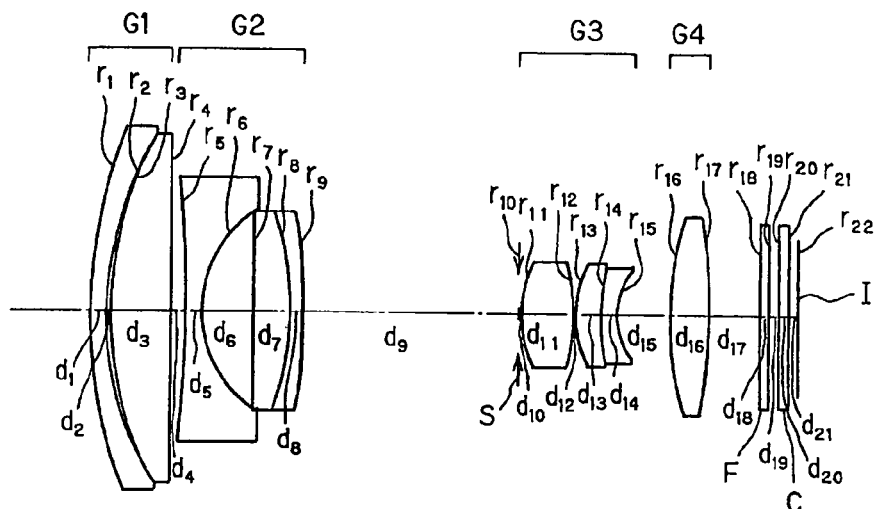
FIGS. 5A to 5C are sectional views of Example 5 of the zoom lens system including the optical axis according to the present invention when focused at infinity.
Figure 5B:
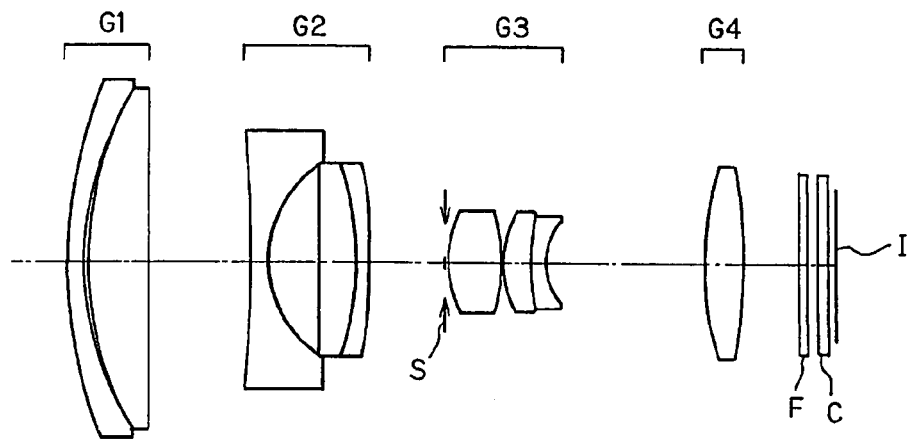
Figure 5C:
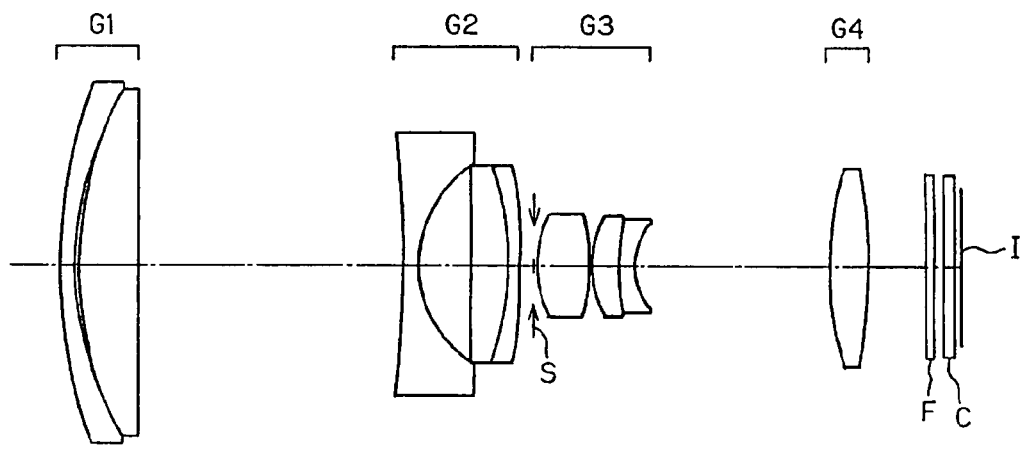

As shown in FIGS. 5A to 5C, Example 5 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side. The fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a double-convex positive lens. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 6A:
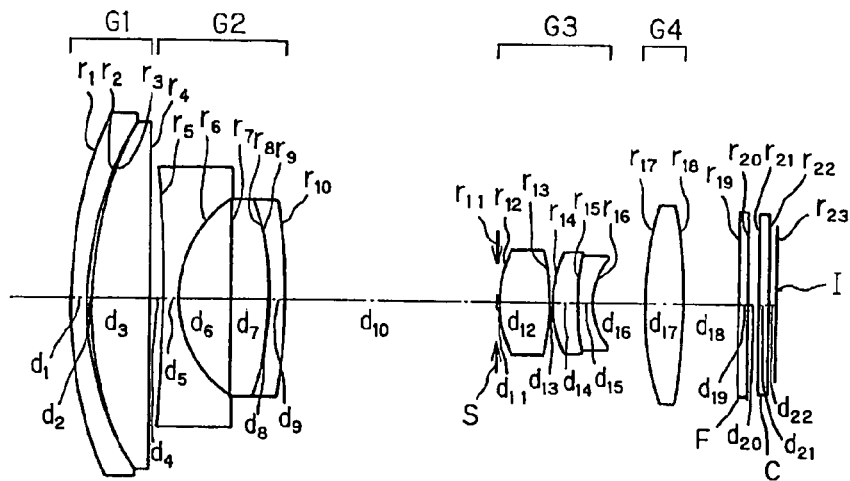
FIGS. 6A to 6C are sectional views of Example 6 of the zoom lens system including the optical axis according to the present invention when focused at infinity.
Figure 6B:
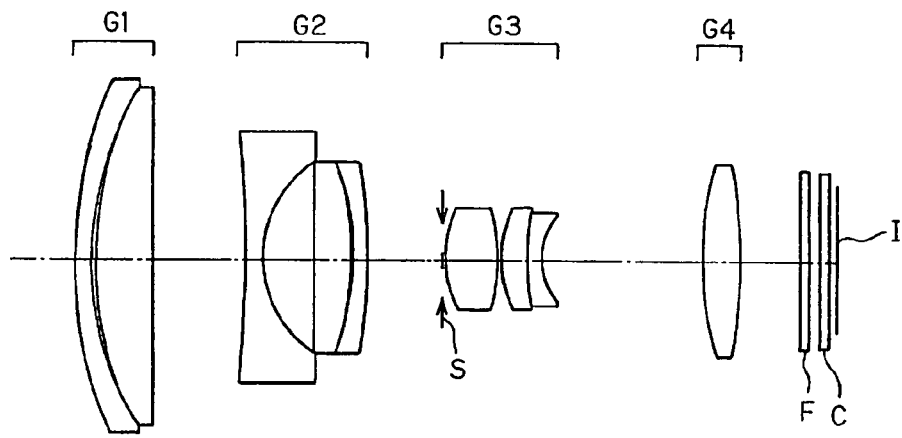
Figure 6C:
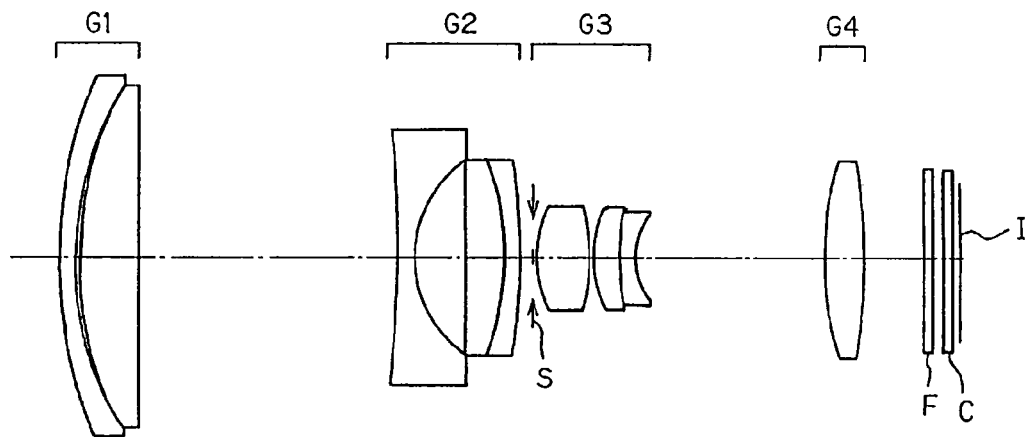

As shown in FIGS. 6A to 6C, Example 6 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side. The fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes a double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3, and the object-side surface of the double-convex positive lens of the fourth lens unit G4.

Figure 7A:
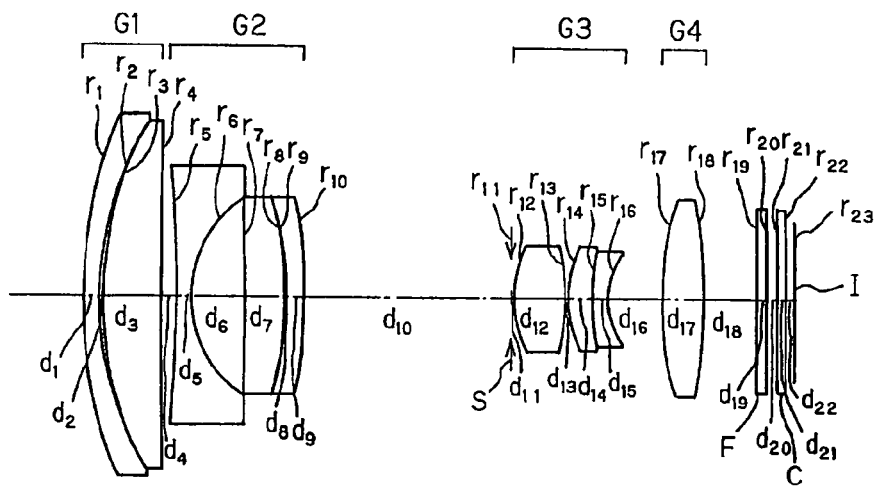
FIGS. 7A to 7C are sectional views of Example 7 of the zoom lens system including the optical axis according to the present invention when focused at infinity.
Figure 7B:
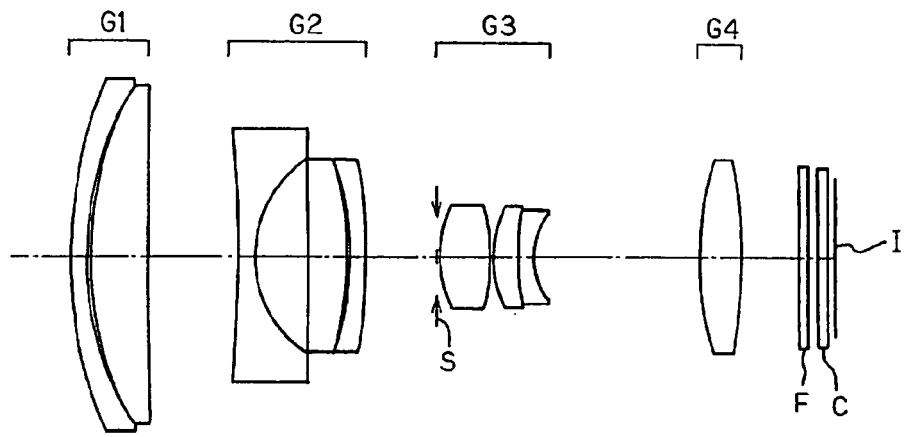
Figure 7C:
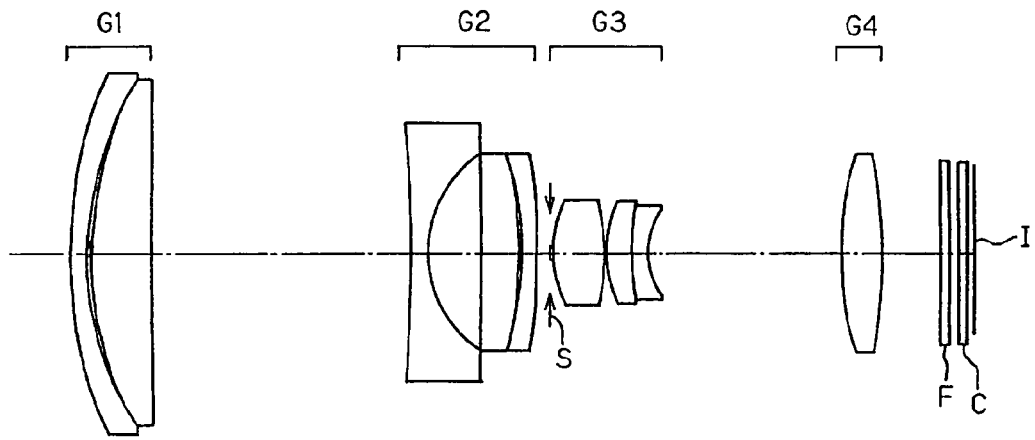

As shown in FIGS. 7A to 7C, Example 7 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side, and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3, and an object-side surface of the double-convex positive lens of the fourth lens unit G4.

Figure 8A:
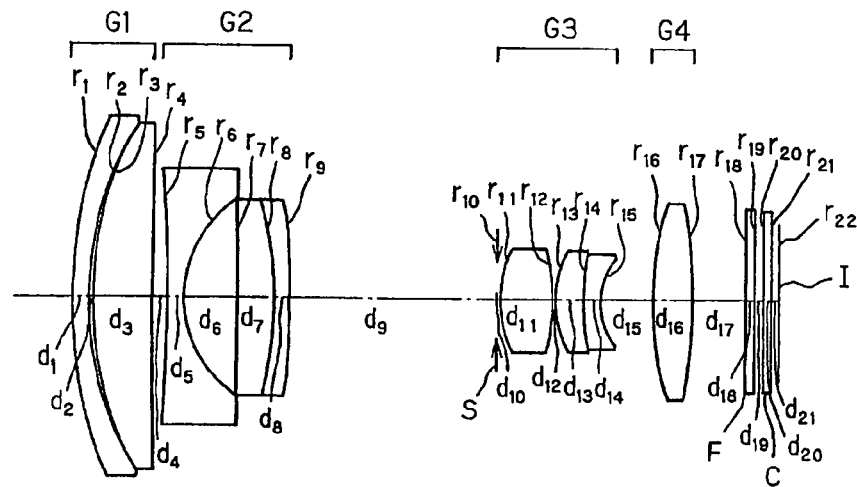
FIGS. 8A to 8C are sectional views of Example 8 of the zoom lens system including the optical axis according to the present invention when focused at infinity.
Figure 8B:
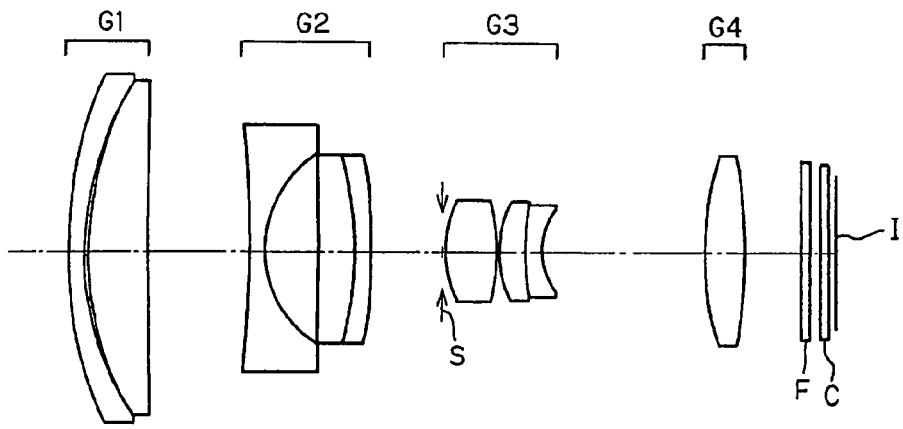
Figure 8C:
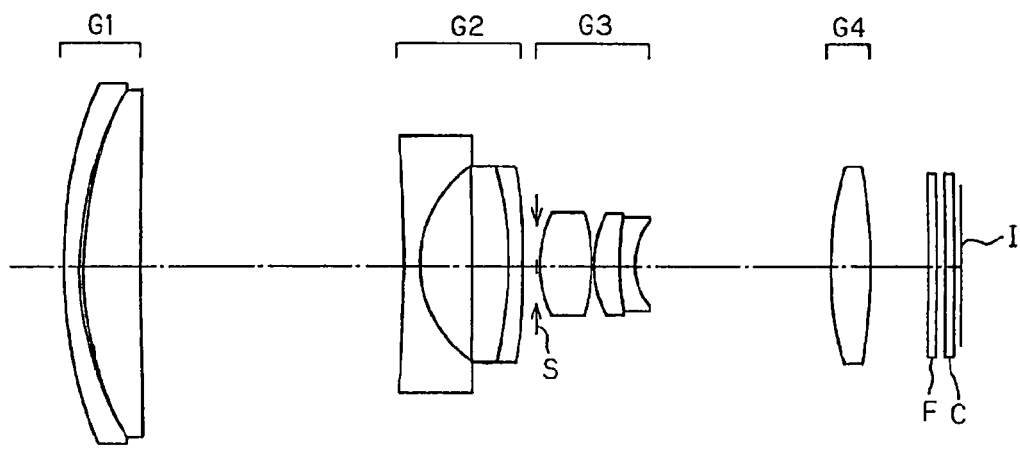

As shown in FIGS. 8A to 8C, Example 8 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 9A:
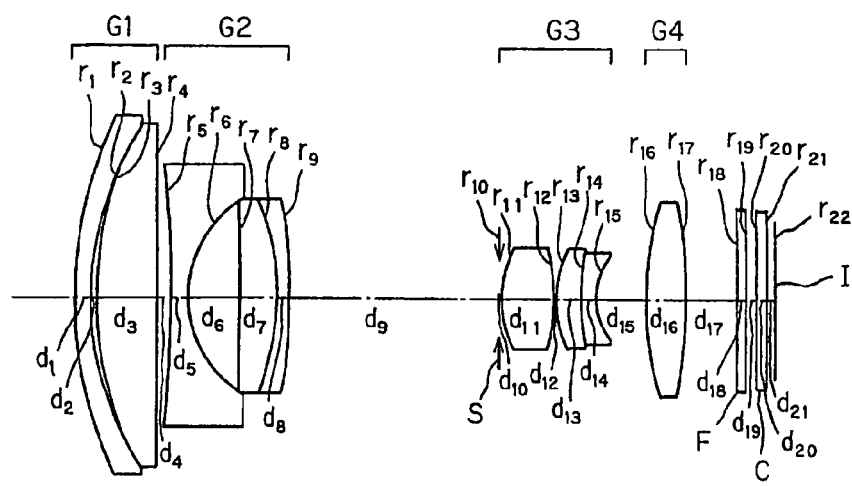
FIGS. 9A to 9C are sectional views of Example 9 of the zoom lens system including the optical axis according to the present invention when focused at infinity.
Figure 9B:
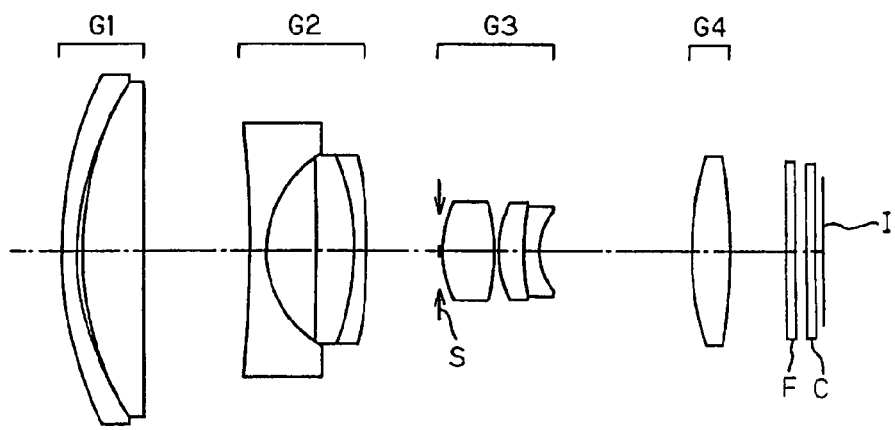
Figure 9C:
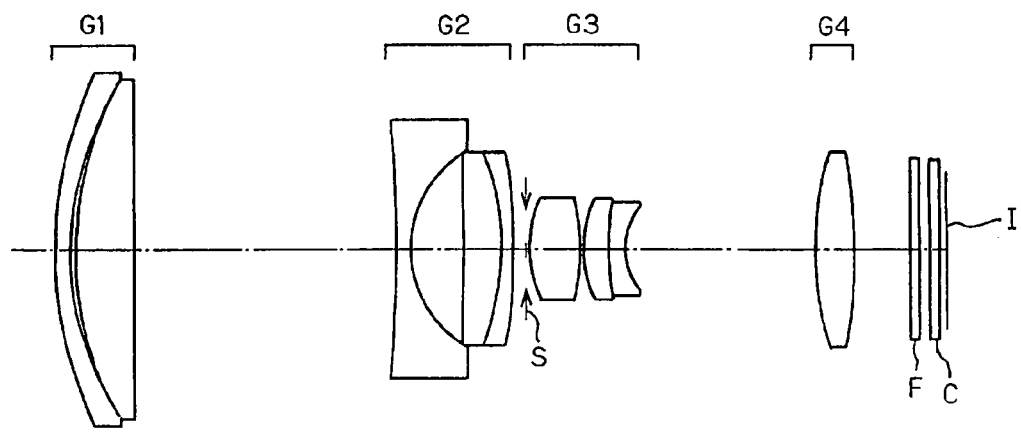

As shown in FIGS. 9A to 9C, Example 9 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 10A:
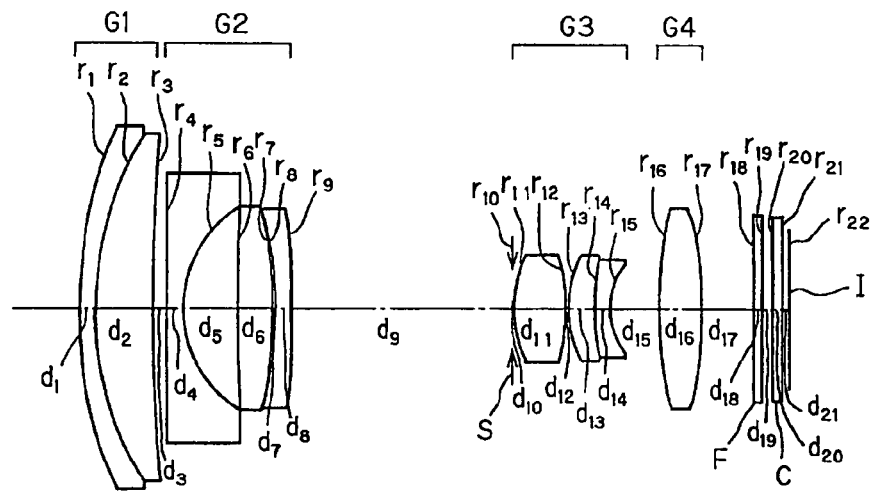
FIGS. 10A to 10C are sectional views of Example 10 of the zoom lens system including the optical axis according to the present invention when focused at infinity.
Figure 10B:
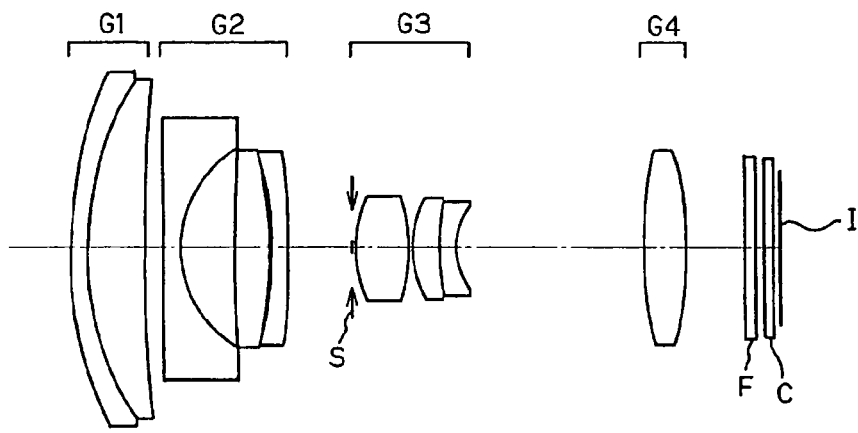
Figure 10C:
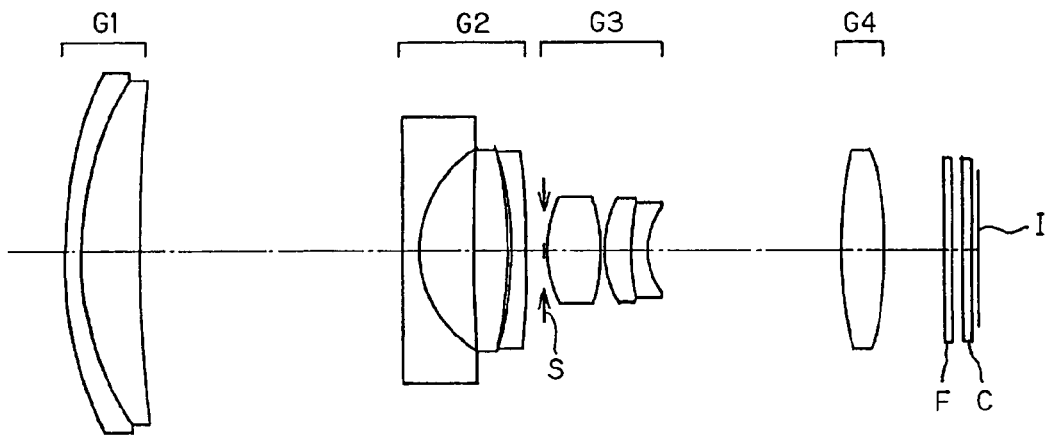

As shown in FIGS. 10A to 10C, Example 10 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves along a track being convex toward the image side, is positioned slightly closer to the image side in an intermediate position than in the wide-angle end, and is positioned closer to the object side in the telephoto end than in the wide-angle end. The second lens unit G2 moves toward the image side while enlarging a space between the second lens unit and the first lens unit G1. The aperture stop S and the third lens unit G3 integrally move toward the object side, and the fourth lens unit G4 moves toward the object side while enlarging a space between the fourth lens unit and the third lens unit G3 from the wide-angle end to the intermediate position, and is substantially fixed from the intermediate position to the telephoto end.

The first lens unit G1 includes, in order from the object side, a cemented lens including a negative meniscus lens whose convex surface faces the object side and a positive meniscus lens whose convex surface faces the object side. The second lens unit G2 includes, in order from the object side, a double-concave negative lens, a double-convex positive lens and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3 and an object-side surface of the double-convex positive lens of the fourth lens unit G4.

Figure 11A:
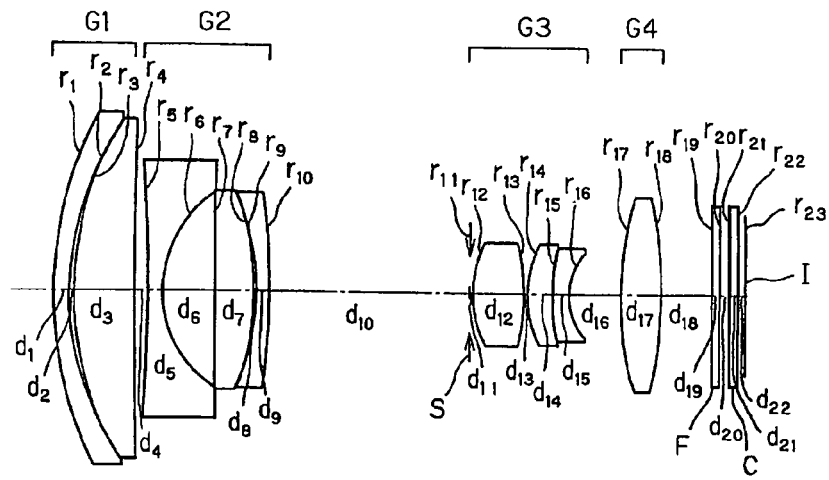
FIGS. 11A to 11C are sectional views of Example 11 of the zoom lens system including the optical axis according to the present invention when focused at infinity.
Figure 11B:
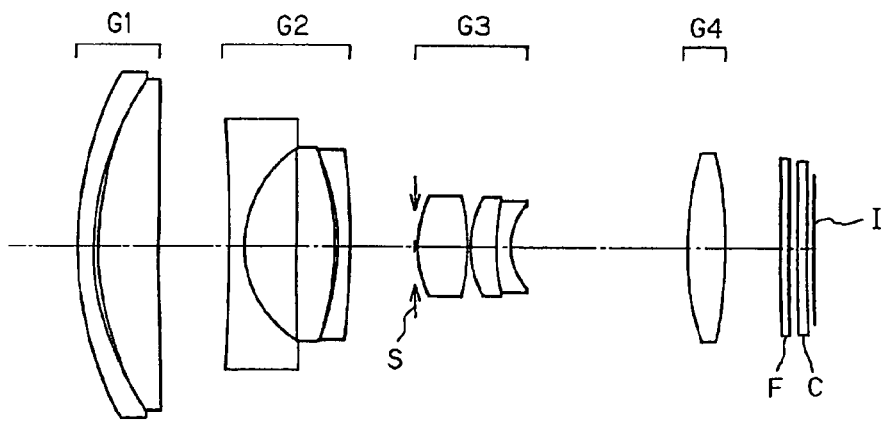
Figure 11C:
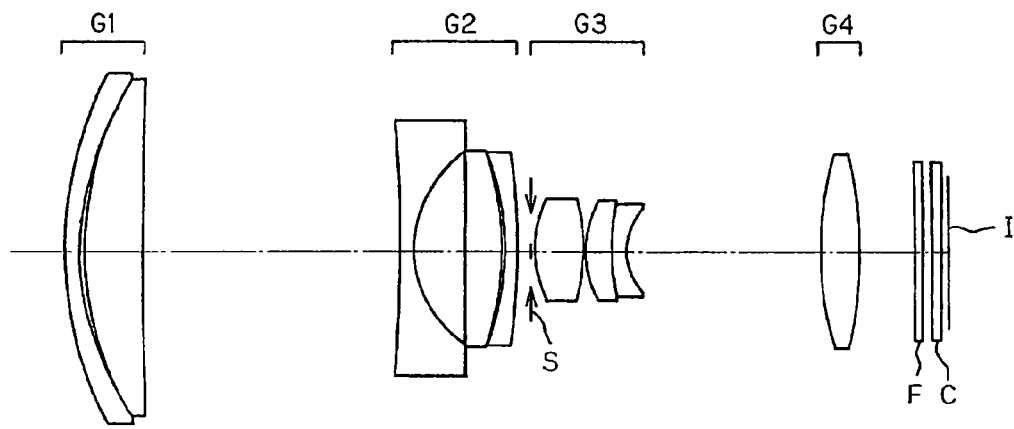

As shown in FIGS. 11A to 11C, Example 11 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, an object-side surface of the negative meniscus lens of the second lens unit, opposite surfaces of the double-convex positive lens of the third lens unit G3 and an object-side surface of the double-convex positive lens of the fourth lens unit G4.

Figure 12A:
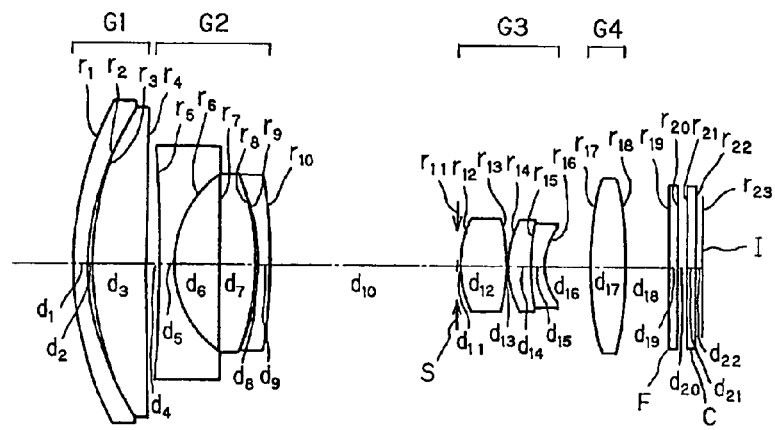
FIGS. 12A to 12C are sectional views of Example 12 of the zoom lens system including the optical axis according to the present invention when focused at infinity.
Figure 12B:
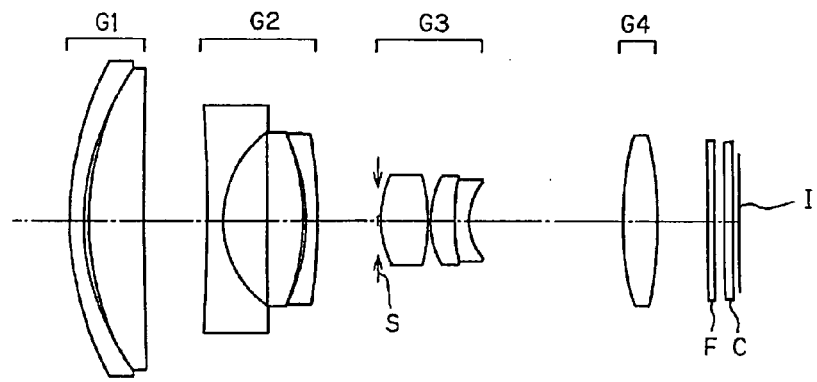
Figure 12C:
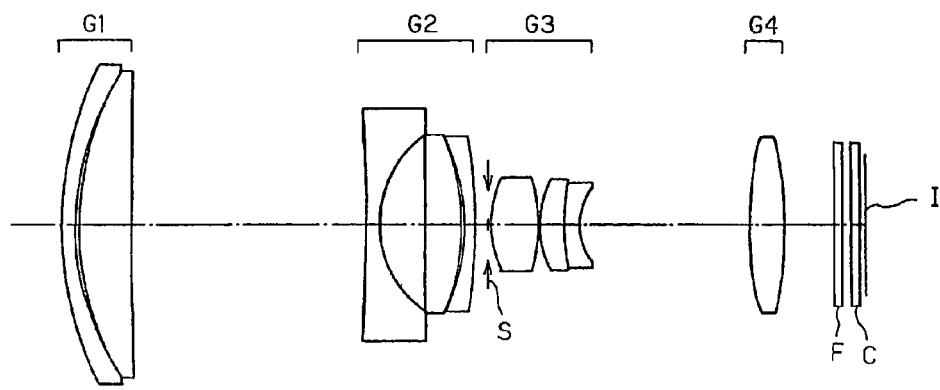

As shown in FIGS. 12A to 12C, Example 12 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves along a track being convex toward the object side while enlarging a space between the fourth lens unit and the third lens unit G3, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on seven surfaces including opposite surfaces of the double-concave negative lens of the second lens unit G2, opposite surfaces of the negative meniscus lens of the second lens unit, opposite surfaces of the double-convex positive lens of the third lens unit G3 and an object-side surface of the double-convex positive lens of the fourth lens unit G4.

Figure 13A:
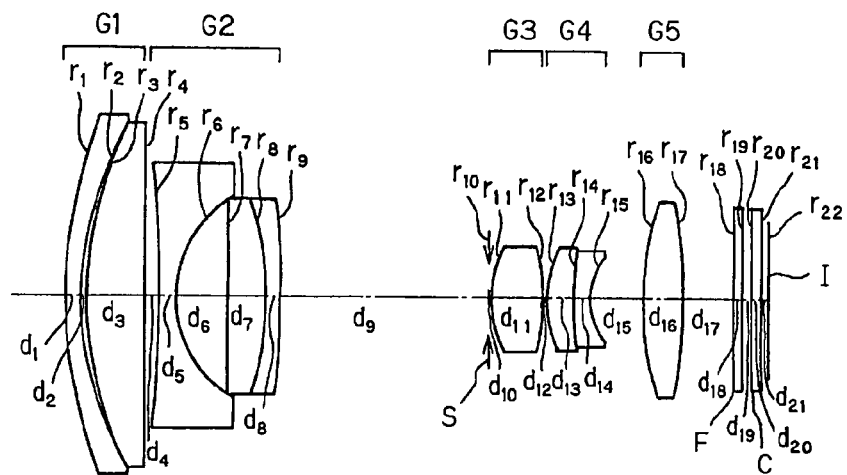
FIGS. 13A to 13C are sectional views of Example 13 of the zoom lens system including the optical axis according to the present invention when focused at infinity.
Figure 13B:
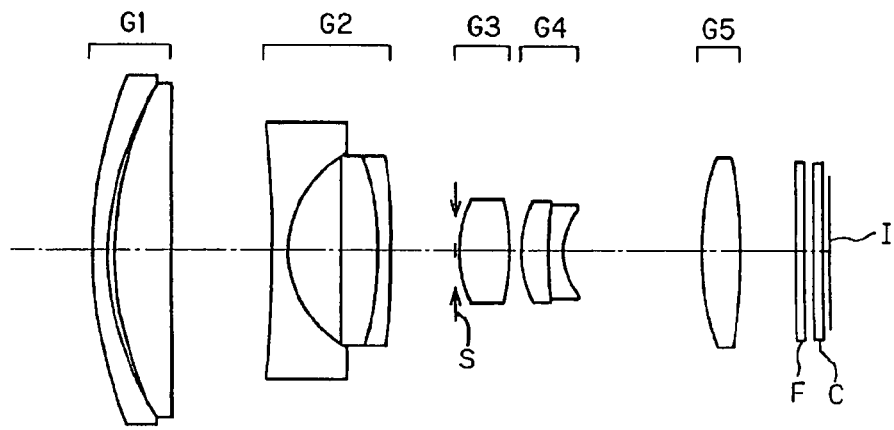
Figure 13C:
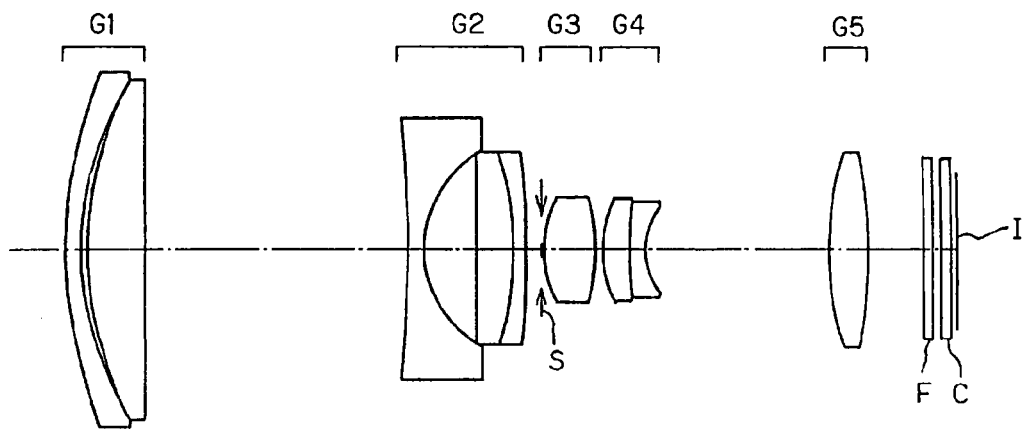

As shown in FIGS. 13A to 13C, Example 13 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, the fourth lens unit G4 moves toward the object side while once enlarging and then narrowing a space between the fourth lens unit and the third lens unit G3, and the fifth lens unit G5 moves toward the object side while enlarging a space between the fifth lens unit and the fourth lens unit G4.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes one double-convex positive lens. The fourth lens unit G4 includes a cemented lens including, in order from the object side, a positive meniscus lens whose convex surface faces the object side and a negative meniscus lens whose convex surface faces the object side. The fifth lens unit G5 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fifth lens unit G5.

Figure 14A:
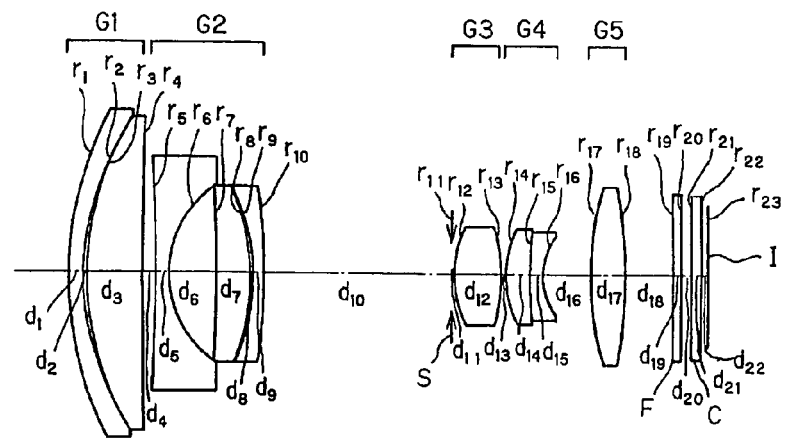
FIGS. 14A to 14C are sectional views of Example 14 of the zoom lens system including the optical axis according to the present invention when focused at infinity.
Figure 14B:
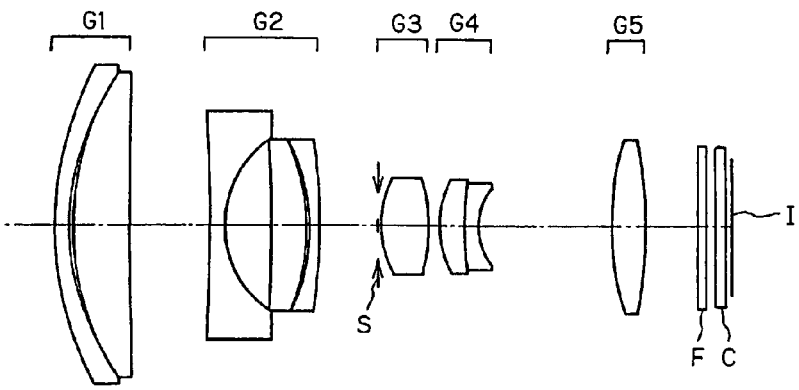
Figure 14C:
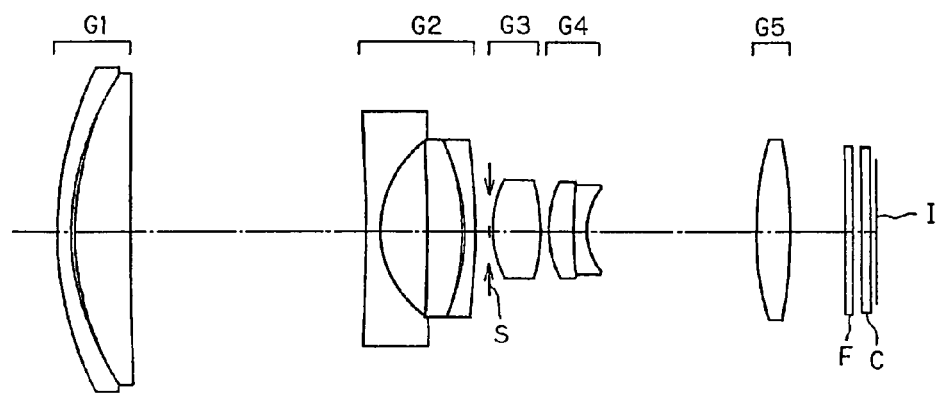

As shown in FIGS. 14A to 14C, Example 14 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves toward the object side while once enlarging and then reducing a space between the fourth lens unit and the third lens unit G3. The fifth lens unit G5 moves along a track being convex toward the object side while enlarging a space between the fifth lens unit and the fourth lens unit G4, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side and a negative meniscus lens whose convex surface faces the image side. The third lens unit G3 includes one double-convex positive lens. The fourth lens unit G4 includes a cemented lens including, in order from the object side, a positive meniscus lens whose convex surface faces the object side and a negative meniscus lens whose convex surface faces the object side. The fifth lens unit G5 includes one double-convex positive lens.

Aspherical surfaces are used on six surfaces including opposite surfaces of the double-concave negative lens of the second lens unit G2, an object side surface of the negative meniscus lens of the second lens unit, opposite surfaces of the double-convex positive lens of the third lens unit G3 and an object-side surface of the double-convex positive lens of the fifth lens unit G5.

Figure 15A:
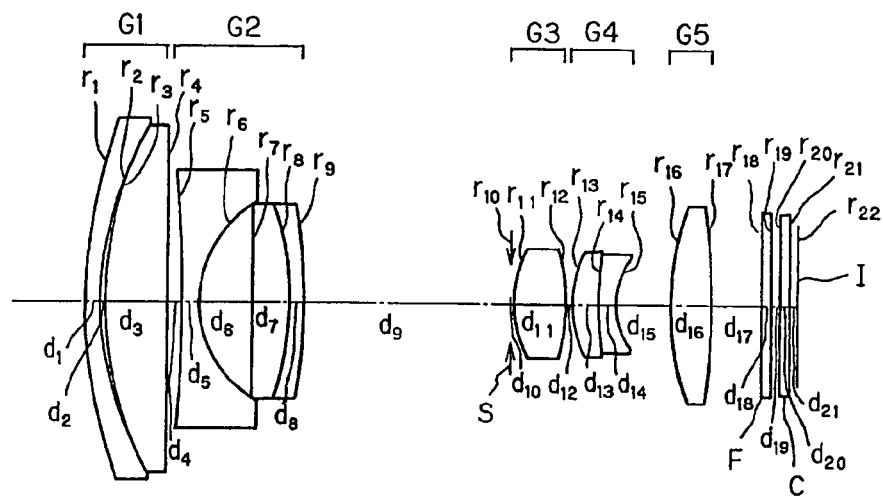
FIGS. 15A to 15C are sectional views of Example 15 of the zoom lens system including the optical axis according to the present invention when focused at infinity.
Figure 15B:
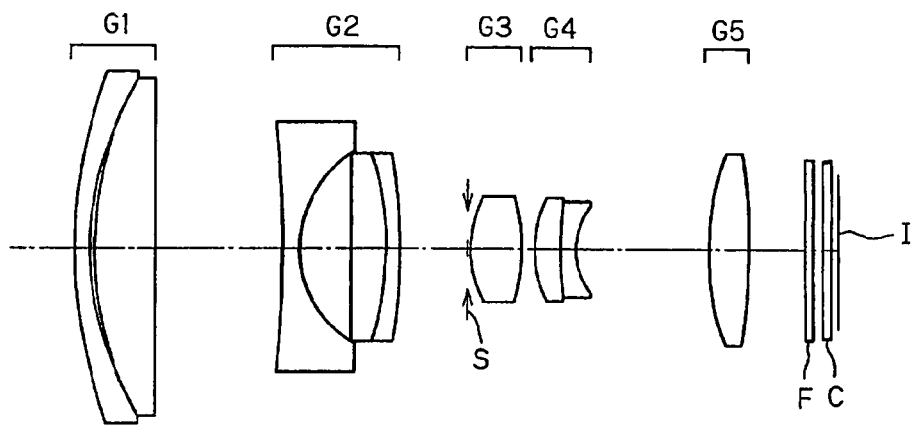
Figure 15C:
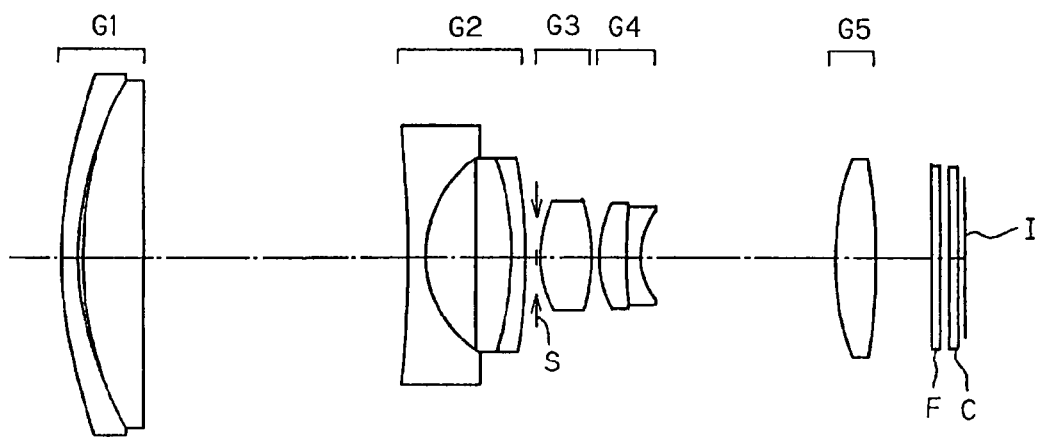

As shown in FIGS. 15A to 15C, Example 15 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During zooming from a wide-angle end to a telephoto end, the first lens unit G1 moves toward the object side, and the second lens unit G2 moves along a track being convex toward the image side, and is positioned closer to the image side in the telephoto end than in the wide-angle end. The aperture stop S and the third lens unit G3 integrally move toward the object side. The fourth lens unit G4 moves toward the object side while once enlarging and then reducing a space between the fourth lens unit and the third lens unit G3. The fifth lens unit G5 moves along a track being convex toward the object side while enlarging a space between the fifth lens unit and the fourth lens unit G4, and is positioned slightly closer to the object side in the telephoto end than in the wide-angle end.

The first lens unit G1 includes, in order from the object side, a negative meniscus lens whose convex surface faces the object side and a double-convex positive lens. The second lens unit G2 includes, in order from the object side, a double-concave negative lens, and a cemented lens including a positive meniscus lens whose convex surface faces the image side and a negative meniscus lens whose convex surface faces the image side. The third lens unit G3 includes one double-convex positive lens. The fourth lens unit G4 includes a cemented lens including, in order from the object side, a positive meniscus lens whose convex surface faces the object side and a negative meniscus lens whose convex surface faces the object side. The fifth lens unit G5 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fifth lens unit G5.

Figure 16A:
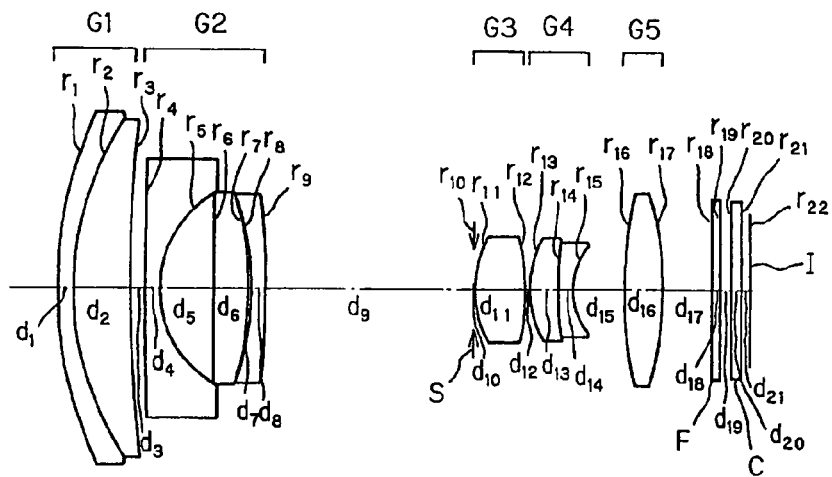
FIGS. 16A to 16C are sectional views of Example 16 of the zoom lens system including the optical axis according to the present invention when focused at infinity.
Figure 16B:
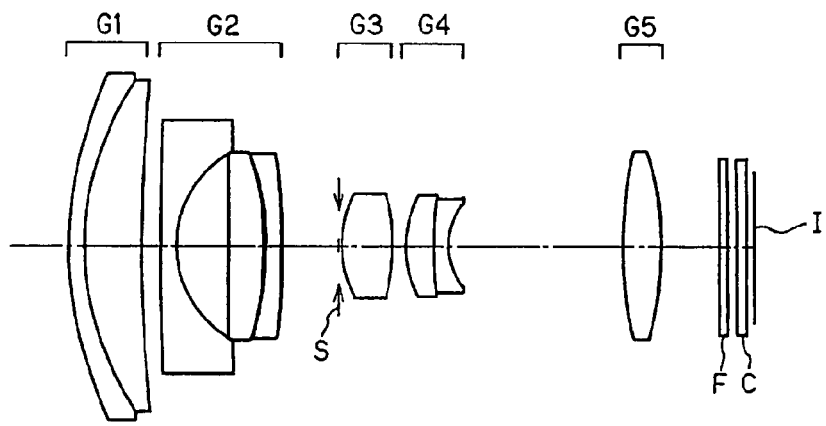
Figure 16C:
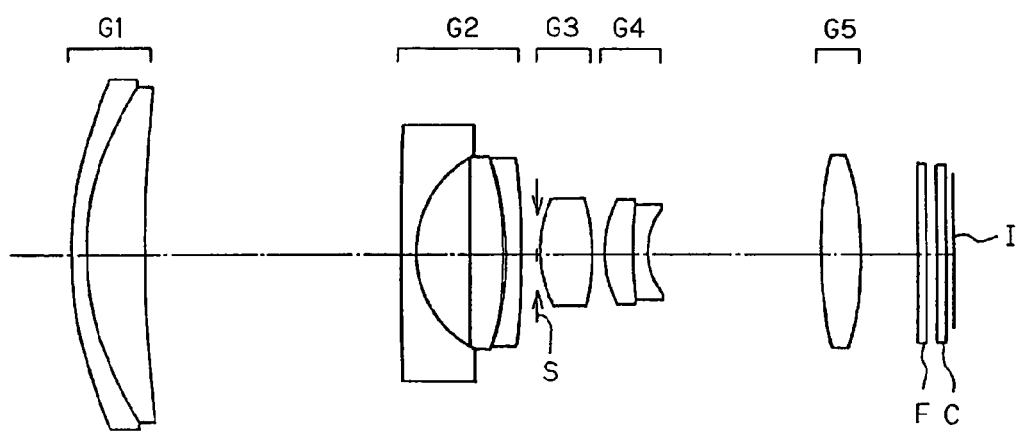

As shown in FIGS. 16A to 16C, Example 16 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power and a fifth lens unit G5 having a positive refractive power. During zooming from a wide-angle end to a telephoto end, the first lens unit G1 moves along a track being convex toward the image side, is positioned slightly closer to the image side in an intermediate position than in the wide-angle end and is positioned closer to the object side in the telephoto end than in the wide-angle end. The second lens unit G2 moves toward the image side. The aperture stop S and the third lens unit G3 integrally move along a track being convex toward the object side, and is positioned slightly closer to the image side in the telephoto end than in the intermediate position and closer to the object side in the telephoto end than in the wide-angle end. The fourth lens unit G4 moves along a track being convex toward the object side while once enlarging and then reducing a space between the fourth lens unit and the third lens unit G3, is positioned slightly closer to the image side in the telephoto end than in the intermediate position and is positioned closer to the object side in the telephoto end than in the wide-angle end. The fifth lens unit G5 moves along a track being convex toward the object side while once enlarging and then slightly reducing a space between the fifth lens unit and the fourth lens unit G4, and is positioned slightly closer to the object side in the telephoto end than in the wide-angle end.

The first lens unit G1 includes, in order from the object side, a cemented lens including a negative meniscus lens whose convex surface faces the object side and a positive meniscus lens whose convex surface faces the object side, and the second lens unit G2 includes, in order from the object side, a double-concave negative lens, a positive meniscus lens whose convex surface faces the image side and a negative meniscus lens whose convex surface faces the image side. The third lens unit G3 includes one double-convex positive lens, and the fourth lens unit G4 includes a cemented lens including, in order from the object side, a positive meniscus lens whose convex surface faces the object side and a negative meniscus lens whose convex surface faces the object side. The fifth lens unit G5 includes one double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3 and an object-side surface of the double-convex positive lens of the fifth lens unit G5.

Figure 17A:
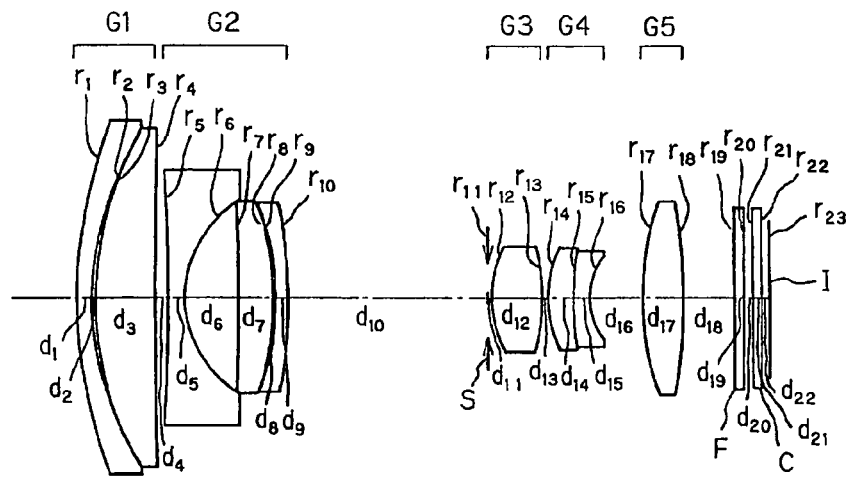
FIGS. 17A to 17C are sectional views of Example 17 of the zoom lens system including the optical axis according to the present invention when focused at infinity.
Figure 17B:
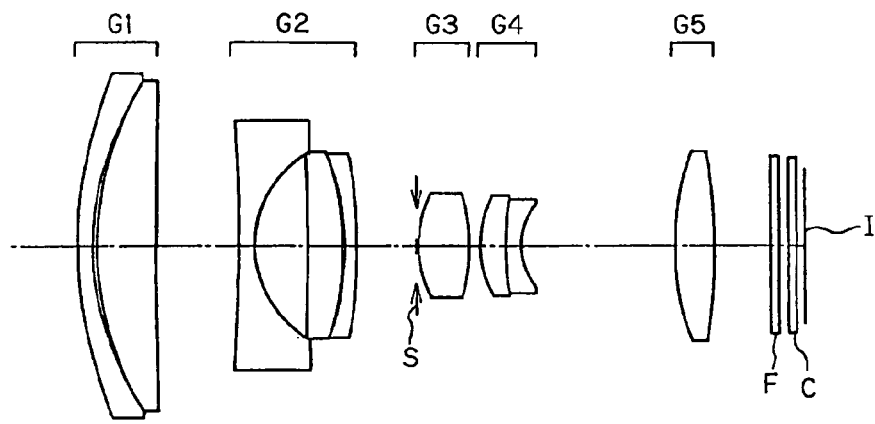
Figure 17C:
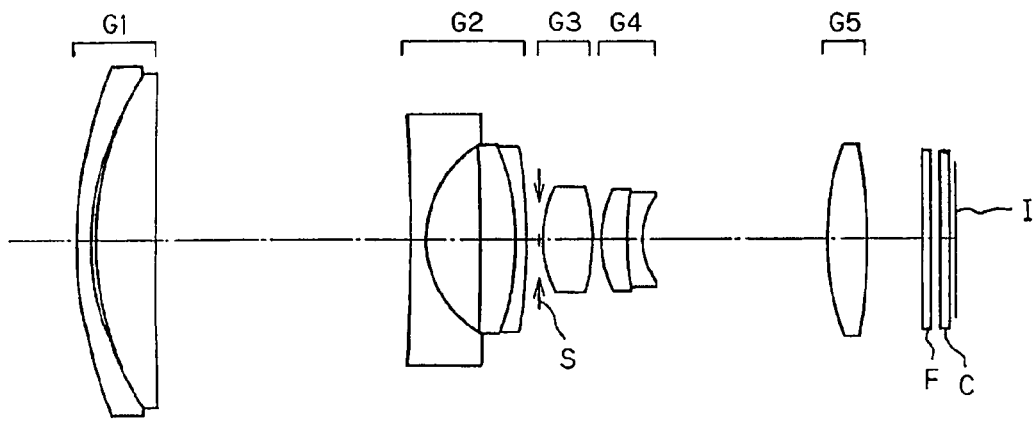

As shown in FIGS. 17A to 17C, Example 17 includes, in order from an object side, a first lens unit G1 having a positive refractive power, a second lens unit G2 having a negative refractive power, an aperture stop S, a third lens unit G3 having a positive refractive power, a fourth lens unit G4 having a negative refractive power, and a fifth lens unit G5 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves toward the object side while once enlarging and then reducing a space between the fourth lens unit and the third lens unit G3. The fifth lens unit G5 moves along a track being convex toward the object side while enlarging a space between the fifth lens unit and the fourth lens unit G4, and is positioned slightly closer to the object side in the telephoto end than in the wide-angle end.

The first lens unit G1 includes, in order from the object side, a negative meniscus lens whose convex surface faces the object side and a positive meniscus lens whose convex surface faces the object side. The second lens unit G2 includes, in order from the object side, a double-concave negative lens, a positive meniscus lens whose convex surface faces the image side, and a negative meniscus lens whose convex surface faces the image side. The third lens unit G3 includes one double-convex positive lens. The fourth lens unit G4 includes a cemented lens including, in order from the object side, a positive meniscus lens whose convex surface faces the object side and a negative meniscus lens whose convex surface faces the object side. The fifth lens unit G5 includes one double-convex positive lens.

Aspherical surfaces are used on six surfaces including opposite surfaces of the double-concave negative lens of the second lens unit G2, an image-side surface of the negative meniscus lens of the second lens unit, opposite surfaces of the double-convex positive lens of the third lens unit G3, and an object-side surface of the double-convex positive lens of the fifth lens unit G5.

Figure 18A:
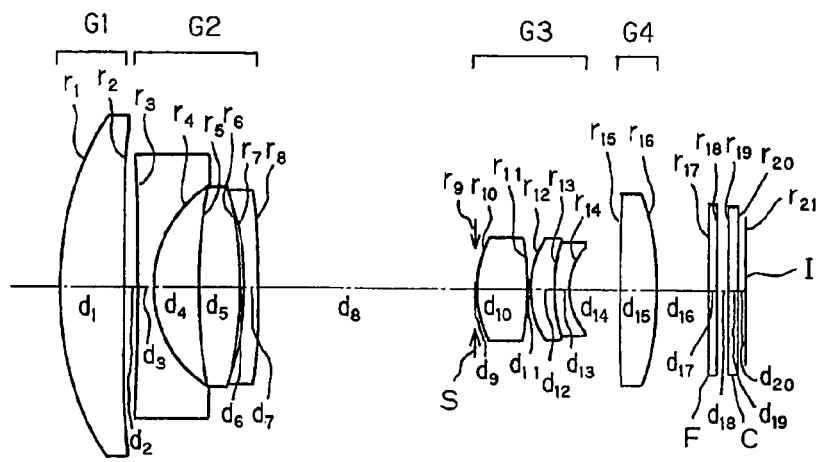
FIGS. 18A to 18C are sectional views of Example 18 of the zoom lens system including the optical axis according to the present invention when focused at infinity.
Figure 18B:
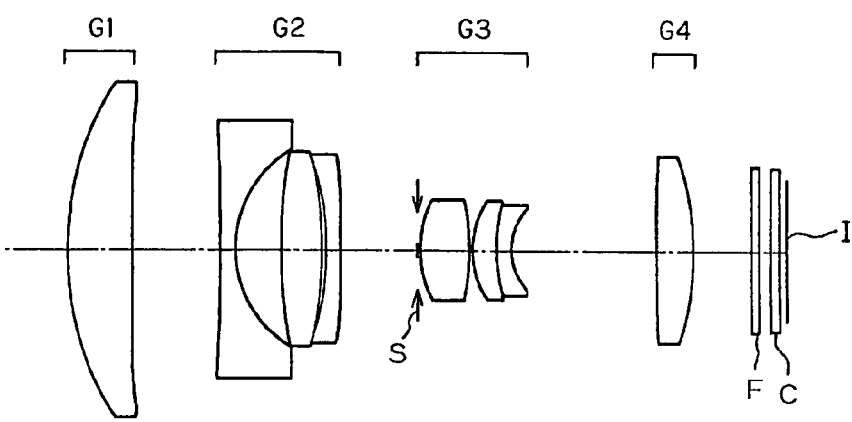
Figure 18C:
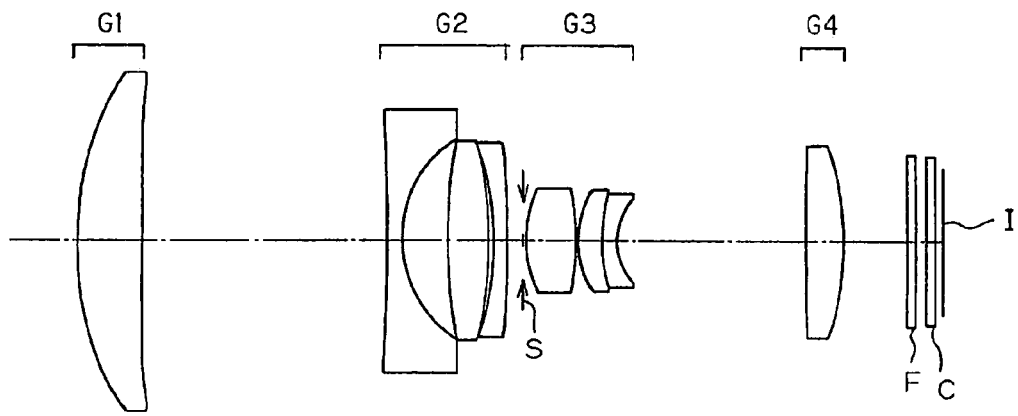

As shown in FIGS. 18A to 18C, Example 18 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves toward the object side while enlarging a space between the fourth lens unit and the third lens unit G3.

The first lens unit G1 includes one positive meniscus lens whose convex surface faces the object side, and the second lens unit G2 includes, in order from the object side, a double-concave negative lens, a double-convex positive lens and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one positive meniscus lens whose convex surface faces the image side.

Aspherical surfaces are used on eight surfaces including opposite surfaces of the positive meniscus lens of the first lens unit G1, opposite surfaces of the double-concave negative lens of the second lens unit G2, an image-side surface of the negative meniscus lens of the second lens unit, opposite surfaces of the double-convex positive lens of the third lens unit G3 and an object-side surface of the positive meniscus lens of the fourth lens unit G4.

Figure 19A:
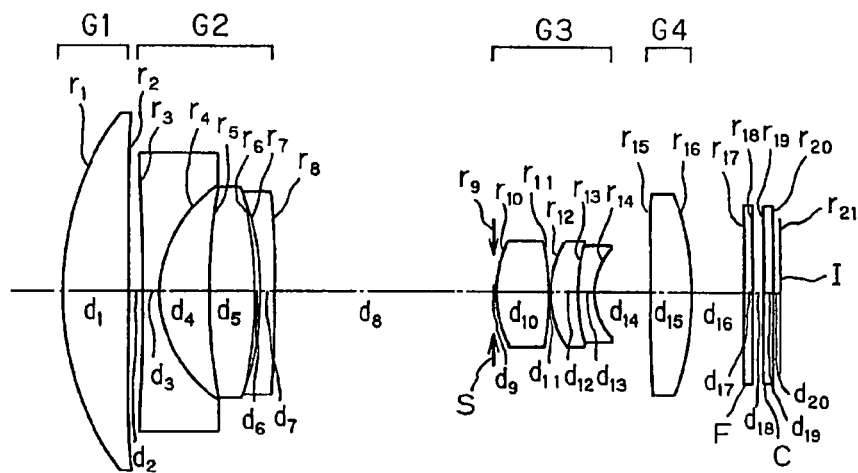
FIGS. 19A to 19C are sectional views of Example 19 of the zoom lens system including the optical axis according to the present invention when focused at infinity.
Figure 19B:
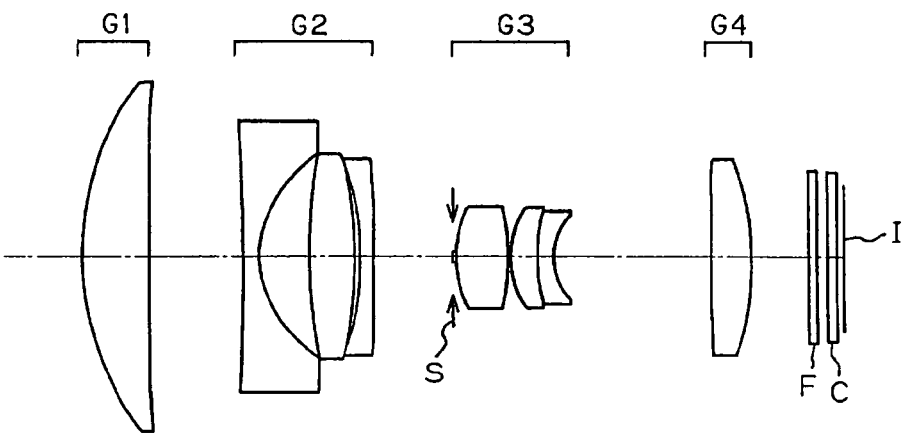
Figure 19C:
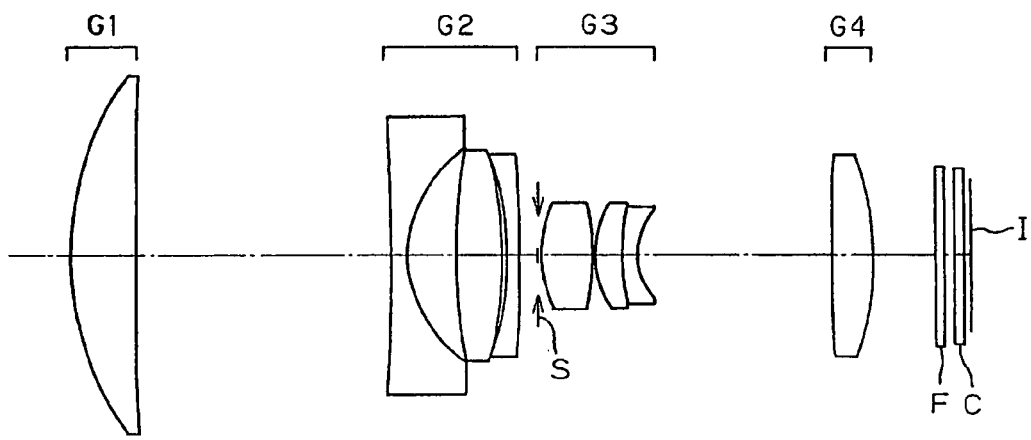

As shown in FIGS. 19A to 19C, Example 19 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves toward the object side while enlarging a space between the fourth lens unit and the third lens unit G3.

The first lens unit G1 includes one positive meniscus lens whose convex surface faces the object side. The second lens unit G2 includes, in order from the object side, a double-concave negative lens, a double-convex positive lens and a double-concave negative lens. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one positive meniscus lens whose convex surface faces the image side.

Aspherical surfaces are used on eight surfaces including opposite surfaces of the positive meniscus lens of the first lens unit G1, opposite surfaces of the object-side double-concave negative lens of the second lens unit G2, an image-side surface of the image-side double-concave negative lens of the second lens unit, opposite surfaces of the double-convex positive lens of the third lens unit G3 and an object-side surface of the positive meniscus lens of the fourth lens unit G4.

Figure 20A:
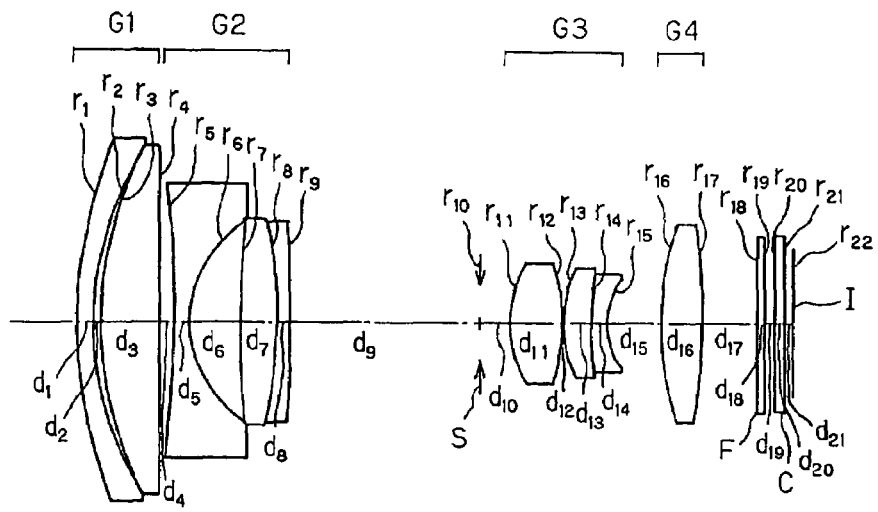
FIGS. 20A to 20C are sectional views of Example 20 of the zoom lens system including the optical axis according to the present invention when focused at infinity.
Figure 20B:
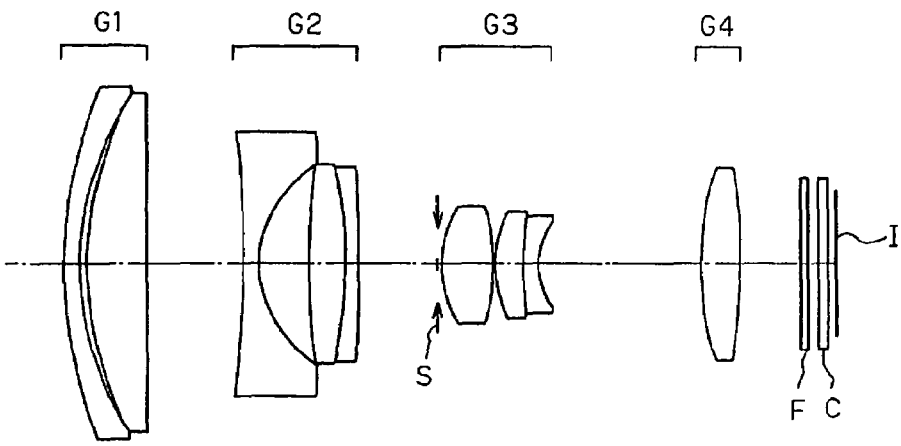
Figure 20C:
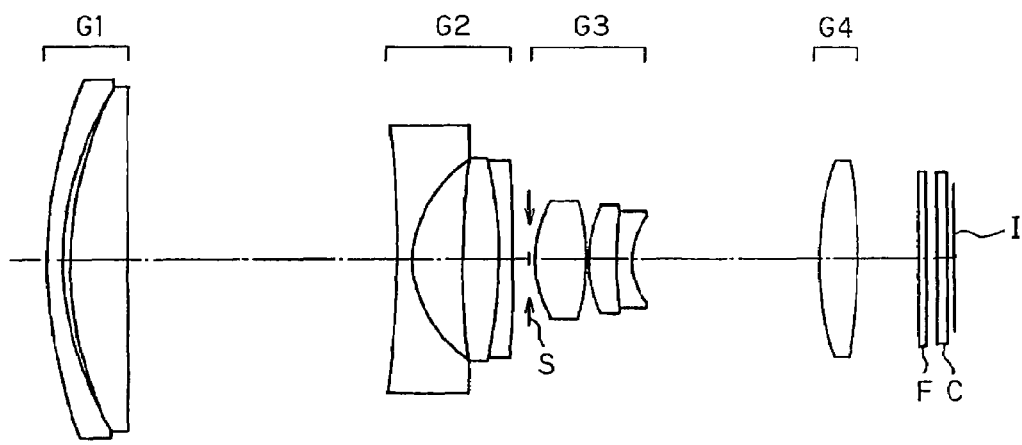

As shown in FIGS. 20A to 20C, Example 20 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 move toward the object side independently of each other, and the third lens unit G3 moves toward the object side while reducing a space between the third lens unit and the aperture stop S from the wide-angle end to a intermediate position and enlarging the space from the intermediate position to the telephoto end. The fourth lens unit G4 slightly moves toward the object side while enlarging a space between the fourth lens unit and the third lens unit G3.

The first lens unit G1 includes, in order from the object side, a negative meniscus lens whose convex surface faces the object side and a double-convex positive lens. The second lens unit G2 includes, in order from the object side, a double-concave negative lens and a cemented lens including a double-convex positive lens and a double-concave negative lens. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on six surfaces including opposite surfaces of the double-concave negative lens of the second lens unit G2, the surface of the cemented lens of the second lens unit closest to the image side, opposite surfaces of the double-convex positive lens of the third lens unit G3 and an object-side surface of the double-convex positive lens of the fourth lens unit G4.

Figure 21A:
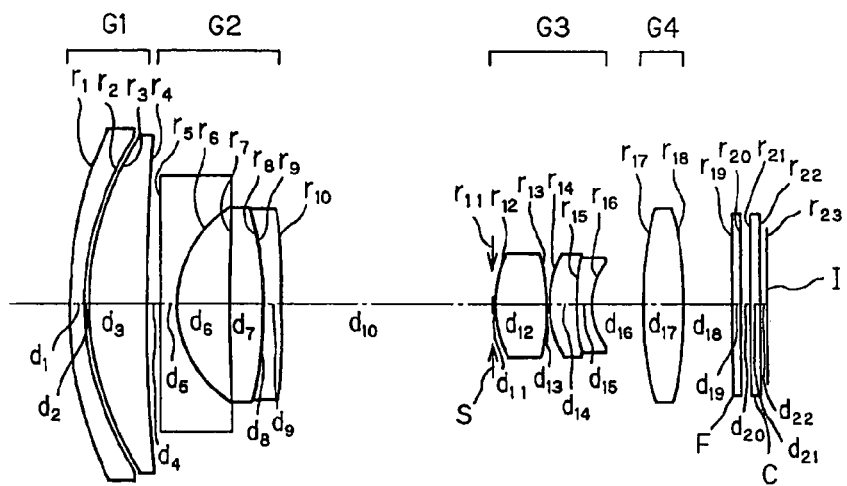
FIGS. 21A to 21C are sectional views of Example 21 of the zoom lens system including the optical axis according to the present invention when focused at infinity.
Figure 21B:
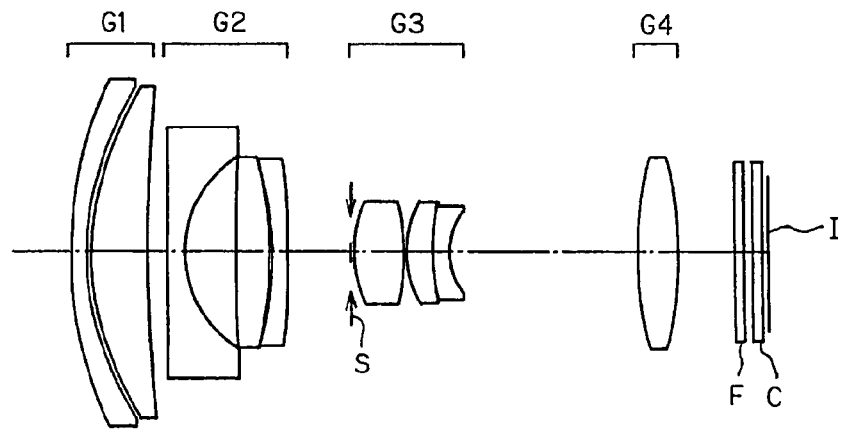
Figure 21C:
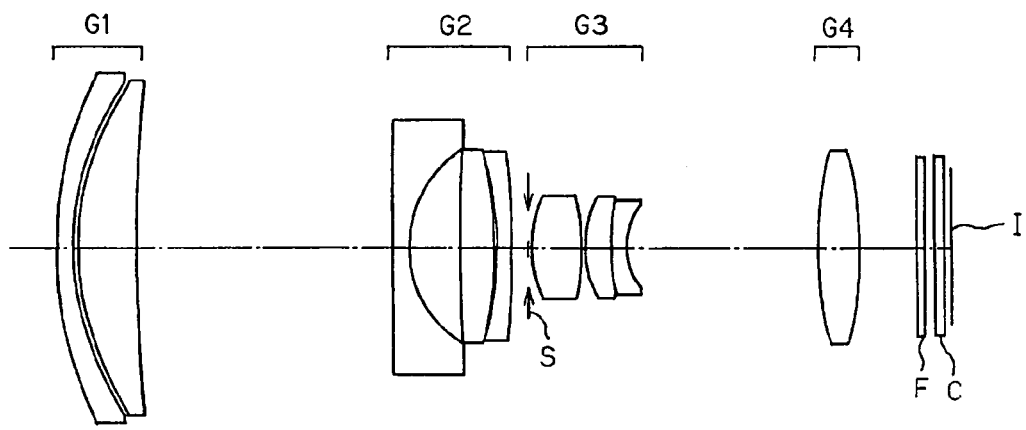

As shown in FIGS. 21A to 21C, Example 21 includes, in order from an object side, a first lens unit G1 having a positive refractive power, a second lens unit G2 having a negative refractive power, an aperture stop S, a third lens unit G3 having a positive refractive power and a fourth lens unit G4 having a positive refractive power. During zooming from a wide-angle end to a telephoto end, the first lens unit G1 moves toward the object side, and the second lens unit G2 moves toward an image side. The aperture stop S and the third lens unit G3 integrally move toward the object side, and the fourth lens unit G4 moves toward the object side while enlarging a space between the fourth lens unit and the third lens unit G3 from the wide-angle end to an intermediate position, and is substantially fixed from the intermediate position to the telephoto end.

The first lens unit G1 includes, in order from the object side, a negative meniscus lens whose convex surface faces the object side and a positive meniscus lens whose convex surface faces the object side. The second lens unit G2 includes, in order from the object side, a negative meniscus lens whose convex surface faces the object side, a double-convex positive lens, and a negative meniscus lens whose convex surface faces the image side. The third lens unit G3 includes, in order from the object side, a double-convex positive lens, and a cemented lens including a positive meniscus lens whose convex surface faces the object side and a negative meniscus lens whose convex surface faces the object side. The fourth lens unit G4 includes one double-convex positive lens.

Aspherical surfaces are used on five surfaces including an image-side surface of the object-side negative meniscus lens of the second lens unit G2, an image-side surface of the image-side negative meniscus lens of the second lens unit, opposite surfaces of the double-convex positive lens of the third lens unit G3 and an object-side surface of the double-convex positive lens of the fourth lens unit G4.

Next, numerical data of the above examples will be described. In addition to the above symbols, f is a focal length of a zoom lens system, $F_{no}$ is the F-number, $2\omega$ is an angle of view, WE is a wide-angle end, ST is an intermediate position, TE is a telephoto end, $r_1, r_2, \ldots$ are paraxial radii of curvature of lens surfaces, $d_1, d_2, \ldots$ are spaces between the lens surfaces, $n_{d1}, n_{d2}, \ldots$ are refractive indices of lenses for the d-line, and $v_{d1}, v_{d2}, \ldots$ are the Abbe numbers of the lenses. Symbol (AS) after the radius of curvature indicates that the surface is an aspherical surface, (S) indicates that the surface is an aperture stop surface and (I) indicates that the surface is an image surface, respectively. It is to be noted that a shape of the aspherical surface is represented by the following equation in a coordinate system in which an optical axis is an x-axis (a light travel direction is a positive direction), an intersection between the optical axis and the aspherical surface is an origin, and a y-axis passes through the origin and crosses the optical axis at right angles:

$$x=(y^2/r)/[1+\{1-(K+1)(y/r)^2\}^{1/2}]+A_4 y^4+A_6 y^6+A_8 y^8+A_{10} y^{10},$$

in which r is a paraxial radius of curvature, K is a conic constant, and $A_4, A_6, A_8$ and $A_{10}$ are 4-th, 6-th, 8-th and 10-th order aspherical coefficients.

Example 1

| | | | |
|---|---|---|---|
| $r_1 = 19.996$ | $d_1 = 0.80$ | $n_{d1} = 1.92286$ | $v_{d1} = 18.90$ |
| $r_2 = 15.394$ | $d_2 = 0.26$ | | |
| $r_3 = 17.278$ | $d_3 = 3.11$ | $n_{d2} = 1.76802$ | $v_{d2} = 49.24$ |
| $r_4 = 534.344$ | $d_4$ = variable | | |
| $r_5 = -58.703$ (AS) | $d_5 = 0.82$ | $n_{d3} = 1.88300$ | $v_{d3} = 40.76$ |
| $r_6 = 5.969$ (AS) | $d_6 = 2.65$ | | |
| $r_7 = -431.058$ | $d_7 = 1.95$ | $n_{d4} = 2.00170$ | $v_{d4} = 20.64$ |
| $r_8 = -14.597$ | $d_8 = 0.07$ | | |
| $r_9 = -13.708$ | $d_9 = 0.67$ | $n_{d5} = 1.81600$ | $v_{d5} = 46.62$ |

-continued

| | | | |
|---|---|---|---|
| $r_{10} = -67.948$ (AS) | $d_{10}$ = variable | | |
| $r_{11} = \infty$ (S) | $d_{11} = 0.10$ | | |
| $r_{12} = 5.491$ (AS) | $d_{12} = 2.70$ | $n_{d6} = 1.58913$ | $v_{d6} = 61.14$ |
| $r_{13} = -11.075$ (AS) | $d_{13} = 0.10$ | | |
| $r_{14} = 5.503$ | $d_{14} = 1.38$ | $n_{d7} = 1.59201$ | $v_{d7} = 67.02$ |
| $r_{15} = 13.913$ | $d_{15} = 0.80$ | $n_{d8} = 2.00069$ | $v_{d8} = 25.46$ |
| $r_{16} = 3.463$ | $d_{16}$ = variable | | |
| $r_{17} = 19.919$ (AS) | $d_{17} = 2.07$ | $n_{d9} = 1.74330$ | $v_{d9} = 49.33$ |
| $r_{18} = -25.922$ | $d_{18}$ = variable | | |
| $r_{19} = \infty$ | $d_{19} = 0.40$ | $n_{d10} = 1.54771$ | $v_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $v_{d11} = 64.14$ |
| $r_{22} = \infty$ | $d_{22} = 0.36$ | | |
| $r_{23} = \infty$ (I) | | | |

Aspherical coefficients

5th surface $K = 0.000$
$A_4 = 1.99104 \times 10^{-4}$    $A_6 = -8.59909 \times 10^{-6}$    $A_8 = 2.01071 \times 10^{-7}$
$A_{10} = -1.73584 \times 10^{-9}$ 6th surface $K = 0.000$
$A_4 = 7.61962 \times 10^{-5}$    $A_6 = 2.30339 \times 10^{-5}$    $A_8 = -1.98717 \times 10^{-6}$
$A_{10} = 4.99512 \times 10^{-8}$ 10th surface $K = 10.849$
$A_4 = -2.64668 \times 10^{-4}$    $A_6 = -1.16671 \times 10^{-6}$    $A_8 = -1.29451 \times 10^{-7}$
$A_{10} = 0$ 12th surface $K = -0.000$
$A_4 = -9.20803 \times 10^{-4}$    $A_6 = 7.90503 \times 10^{-6}$    $A_8 = -4.58612 \times 10^{-6}$
$A_{10} = 5.46733 \times 10^{-7}$ 13th surface $K = 0.000$
$A_4 = 5.31169 \times 10^{-4}$    $A_6 = 2.85804 \times 10^{-5}$    $A_8 = -8.58478 \times 10^{-6}$
$A_{10} = 9.90563 \times 10^{-7}$ 17th surface $K = 0.000$
$A_4 = -2.06640 \times 10^{-6}$    $A_6 = 1.19043 \times 10^{-5}$    $A_8 = -4.13589 \times 10^{-7}$
$A_{10} = 6.77582 \times 10^{-9}$ Zoom Data(∞)

| | WE | ST | TE |
|---|---|---|---|
| f (mm) | 5.06 | 12.01 | 24.29 |
| $F_{NO}$ | 3.10 | 4.58 | 4.91 |
| $2\omega$ (°) | 80.14 | 35.47 | 17.64 |
| $d_4$ | 0.73 | 4.49 | 13.26 |
| $d_{10}$ | 10.82 | 3.67 | 0.68 |
| $d_{16}$ | 2.75 | 8.58 | 9.99 |
| $d_{18}$ | 2.83 | 3.05 | 2.97 |

Example 2

| | | | |
|---|---|---|---|
| $r_1 = 23.279$ | $d_1 = 0.80$ | $n_{d1} = 1.92286$ | $v_{d1} = 18.90$ |
| $r_2 = 16.155$ | $d_2 = 0.18$ | | |
| $r_3 = 17.729$ | $d_3 = 3.05$ | $n_{d2} = 1.85719$ | $v_{d2} = 43.01$ |
| $r_4 = 577.289$ | $d_4$ = variable | | |
| $r_5 = -57.796$ (AS) | $d_5 = 0.80$ | $n_{d3} = 1.83481$ | $v_{d3} = 42.71$ |
| $r_6 = 5.963$ (AS) | $d_6 = 2.79$ | | |
| $r_7 = -136.071$ | $d_7 = 1.78$ | $n_{d4} = 1.94595$ | $v_{d4} = 17.98$ |
| $r_8 = -16.198$ | $d_8 = 0.09$ | | |
| $r_9 = -14.697$ | $d_9 = 0.68$ | $n_{d5} = 1.83481$ | $v_{d5} = 42.71$ |
| $r_{10} = -44.810$ (AS) | $d_{10}$ = variable | | |
| $r_{11} = \infty$ (S) | $d_{11} = 0.10$ | | |
| $r_{12} = 5.548$ (AS) | $d_{12} = 2.70$ | $n_{d6} = 1.58913$ | $v_{d6} = 61.14$ |
| $r_{13} = -10.984$ (AS) | $d_{13} = 0.10$ | | |
| $r_{14} = 5.510$ | $d_{14} = 1.36$ | $n_{d7} = 1.59201$ | $v_{d7} = 67.02$ |
| $r_{15} = 13.333$ | $d_{15} = 0.80$ | $n_{d8} = 2.00069$ | $v_{d8} = 25.46$ |
| $r_{16} = 3.476$ | $d_{16}$ = variable | | |
| $r_{17} = 19.243$ (AS) | $d_{17} = 2.07$ | $n_{d9} = 1.74330$ | $v_{d9} = 49.33$ |

-continued

| | | | |
|---|---|---|---|
| $r_{18} = -28.285$ | $d_{18}$ = variable | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.36$ | | |
| $r_{23} = \infty$ (I) | | | |

Aspherical coefficients

5th surface $K = 0.000$
$A_4 = 1.91532 \times 10^{-4}$  $A_6 = -6.16585 \times 10^{-6}$  $A_8 = 9.93129 \times 10^{-8}$
$A_{10} = -6.19551 \times 10^{-10}$ 6th surface $K = 0.000$
$A_4 = 8.56780 \times 10^{-5}$  $A_6 = 2.37196 \times 10^{-5}$  $A_8 = -1.32112 \times 10^{-6}$
$A_{10} = 1.29769 \times 10^{-8}$ 10th surface $K = 5.360$
$A_4 = -2.35672 \times 10^{-4}$  $A_6 = -2.32986 \times 10^{-6}$  $A_8 = 3.46565 \times 10^{-8}$
$A_{10} = 0$ 12th surface $K = -0.000$
$A_4 = -9.12531 \times 10^{-4}$  $A_6 = -2.10029 \times 10^{-6}$  $A_8 = -2.33162 \times 10^{-6}$
$A_{10} = 3.38870 \times 10^{-7}$ 13th surface $K = 0.000$
$A_4 = 5.13813 \times 10^{-4}$  $A_6 = 9.30700 \times 10^{-6}$  $A_8 = -3.76459 \times 10^{-6}$
$A_{10} = 5.20840 \times 10^{-7}$ 17th surface $K = 0.000$
$A_4 = 1.55240 \times 10^{-5}$  $A_6 = 1.05486 \times 10^{-5}$  $A_8 = -3.44689 \times 10^{-7}$
$A_{10} = 5.43477 \times 10^{-9}$ Zoom Data($\infty$)

| | WE | ST | TE |
|---|---|---|---|
| f(mm) | 5.06 | 12.01 | 24.29 |
| $F_{NO}$ | 3.11 | 4.54 | 4.94 |
| 2ω (°) | 80.14 | 35.40 | 17.62 |
| $d_4$ | 0.73 | 4.73 | 13.26 |
| $d_{10}$ | 10.87 | 3.73 | 0.66 |
| $d_{16}$ | 2.77 | 8.48 | 10.09 |
| $d_{18}$ | 2.86 | 3.06 | 2.97 |

Example 3

| | | | |
|---|---|---|---|
| $r_1 = 24.343$ | $d_1 = 0.80$ | $n_{d1} = 1.92286$ | $\nu_{d1} = 18.90$ |
| $r_2 = 16.189$ | $d_2 = 0.16$ | | |
| $r_3 = 17.639$ | $d_3 = 3.05$ | $n_{d2} = 1.88300$ | $\nu_{d2} = 40.76$ |
| $r_4 = 598.304$ | $d_4$ = variable | | |
| $r_5 = -58.725$ (AS) | $d_5 = 0.82$ | $n_{d3} = 1.88300$ | $\nu_{d3} = 40.76$ |
| $r_6 = 6.041$ (AS) | $d_6 = 2.60$ | | |
| $r_7 = 407.018$ | $d_7 = 2.01$ | $n_{d4} = 2.00170$ | $\nu_{d4} = 20.64$ |
| $r_8 = -14.787$ | $d_8 = 0.08$ | | |
| $r_9 = -13.762$ | $d_9 = 0.68$ | $n_{d5} = 1.83481$ | $\nu_{d5} = 42.71$ |
| $r_{10} = -88.096$ (AS) | $d_{10}$ = variable | | |
| $r_{11} = \infty$ (S) | $d_{11} = 0.10$ | | |
| $r_{12} = 5.462$ (AS) | $d_{12} = 2.70$ | $n_{d6} = 1.58913$ | $\nu_{d6} = 61.14$ |
| $r_{13} = -11.013$ (AS) | $d_{13} = 0.10$ | | |
| $r_{14} = 5.530$ | $d_{14} = 1.36$ | $n_{d7} = 1.59201$ | $\nu_{d7} = 67.02$ |
| $r_{15} = 13.426$ | $d_{15} = 0.80$ | $n_{d8} = 2.00069$ | $\nu_{d8} = 25.46$ |
| $r_{16} = 3.443$ | $d_{16}$ = variable | | |
| $r_{17} = 19.462$ (AS) | $d_{17} = 2.07$ | $n_{d9} = 1.74330$ | $\nu_{d9} = 49.33$ |
| $r_{18} = -27.222$ | $d_{18}$ = variable | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.36$ | | |
| $r_{23} = \infty$ (I) | | | |

Aspherical coefficients

5th surface $K = 0.000$
$A_4 = 1.78466 \times 10^{-4}$  $A_6 = -8.17272 \times 10^{-6}$  $A_8 = 2.01295 \times 10^{-7}$
$A_{10} = -1.77746 \times 10^{-9}$ 6th surface $K = 0.000$
$A_4 = 5.13913 \times 10^{-5}$  $A_6 = 2.24397 \times 10^{-5}$  $A_8 = -1.94651 \times 10^{-6}$
$A_{10} = 5.11678 \times 10^{-8}$ 10th surface $K = 11.427$
$A_4 = -2.56902 \times 10^{-4}$  $A_6 = -1.57604 \times 10^{-6}$  $A_8 = -1.15551 \times 10^{-7}$
$A_{10} = 0$ 12th surface $K = -0.000$
$A_4 = -9.39293 \times 10^{-4}$  $A_6 = -5.83997 \times 10^{-6}$  $A_8 = -2.22901 \times 10^{-6}$
$A_{10} = 3.45022 \times 10^{-7}$ 13th surface $K = 0.000$
$A_4 = 5.38804 \times 10^{-4}$  $A_6 = 3.49744 \times 10^{-6}$  $A_8 = -2.93189 \times 10^{-6}$
$A_{10} = 4.74550 \times 10^{-7}$ 17th surface $K = 0.000$
$A_4 = 2.27544 \times 10^{-5}$  $A_6 = 1.04163 \times 10^{-5}$  $A_8 = -3.36814 \times 10^{-7}$
$A_{10} = 5.32127 \times 10^{-9}$ Zoom Data($\infty$)

| | WE | ST | TE |
|---|---|---|---|
| f(mm) | 5.06 | 12.01 | 24.29 |
| $F_{NO}$ | 3.11 | 4.62 | 4.92 |
| 2ω (°) | 80.16 | 35.55 | 17.62 |
| $d_4$ | 0.73 | 4.28 | 13.31 |
| $d_{10}$ | 10.93 | 3.71 | 0.72 |
| $d_{16}$ | 2.76 | 8.74 | 9.98 |
| $d_{18}$ | 2.84 | 3.04 | 2.97 |

Example 4

| | | | |
|---|---|---|---|
| $r_1 = 20.367$ | $d_1 = 0.80$ | $n_{d1} = 1.92286$ | $\nu_{d1} = 18.90$ |
| $r_2 = 15.608$ | $d_2 = 0.29$ | | |
| $r_3 = 17.741$ | $d_3 = 3.14$ | $n_{d2} = 1.76802$ | $\nu_{d2} = 49.24$ |
| $r_4 = 3497.716$ | $d_4$ = variable | | |
| $r_5 = -45.639$ (AS) | $d_5 = 0.80$ | $n_{d3} = 1.83481$ | $\nu_{d3} = 42.71$ |
| $r_6 = 5.950$ (AS) | $d_6 = 2.73$ | | |
| $r_7 = -255.106$ | $d_7 = 1.84$ | $n_{d4} = 1.92286$ | $\nu_{d4} = 18.90$ |
| $r_8 = -15.843$ | $d_8 = 0.68$ | $n_{d5} = 1.83481$ | $\nu_{d5} = 42.71$ |
| $r_9 = -58.807$ (AS) | $d_9$ = variable | | |
| $r_{10} = \infty$ (S) | $d_{10} = 0.10$ | | |
| $r_{11} = 5.586$ (AS) | $d_{11} = 2.70$ | $n_{d6} = 1.58913$ | $\nu_{d6} = 61.14$ |
| $r_{12} = -11.262$ (AS) | $d_{12} = 0.10$ | | |
| $r_{13} = 5.436$ | $d_{13} = 1.38$ | $n_{d7} = 1.59201$ | $\nu_{d7} = 67.02$ |
| $r_{14} = 13.074$ | $d_{14} = 0.80$ | $n_{d8} = 2.00069$ | $\nu_{d8} = 25.46$ |
| $r_{15} = 3.469$ | $d_{15}$ = variable | | |
| $r_{16} = 19.614$ (AS) | $d_{16} = 2.07$ | $n_{d9} = 1.74330$ | $\nu_{d9} = 49.33$ |
| $r_{17} = -26.892$ | $d_{17}$ = variable | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.36$ | | |
| $r_{22} = \infty$ (I) | | | |

Aspherical coefficients

5th surface $K = 0.000$
$A_4 = 2.17672 \times 10^{-4}$  $A_6 = -5.32946 \times 10^{-6}$  $A_8 = 7.95875 \times 10^{-8}$
$A_{10} = -5.34232 \times 10^{-10}$ -continued 6th surface K = 0.000
$A_4 = 1.20203 \times 10^{-4}$  $A_6 = 2.54566 \times 10^{-5}$  $A_8 = -1.22695 \times 10^{-6}$
$A_{10} = 2.02973 \times 10^{-8}$ 9th surface K = 19.659
$A_4 = -2.47017 \times 10^{-4}$  $A_6 = -1.58699 \times 10^{-6}$  $A_8 = -1.04315 \times 10^{-7}$
$A_{10} = 0$ 11th surface K = -0.000
$A_4 = -8.71078 \times 10^{-4}$  $A_6 = -4.22508 \times 10^{-7}$  $A_8 = -1.92565 \times 10^{-6}$
$A_{10} = 3.14754 \times 10^{-7}$ 12th surface K = 0.000
$A_4 = 5.15823 \times 10^{-4}$  $A_6 = 1.00484 \times 10^{-5}$  $A_8 = -2.82400 \times 10^{-6}$
$A_{10} = 4.47946 \times 10^{-7}$ 16th surface K = 0.000
$A_4 = 6.80361 \times 10^{-6}$  $A_6 = 1.09868 \times 10^{-5}$  $A_8 = -3.72817 \times 10^{-7}$
$A_{10} = 5.90895 \times 10^{-9}$ Zoom Data(∞)

|  | WE | ST | TE |
|---|---|---|---|
| f (mm) | 5.06 | 12.01 | 24.29 |
| $F_{NO}$ | 3.05 | 4.41 | 4.82 |
| 2ω (°) | 80.12 | 35.18 | 17.61 |
| $d_4$ | 0.72 | 5.37 | 13.24 |
| $d_9$ | 10.83 | 3.84 | 0.65 |
| $d_{15}$ | 2.75 | 8.06 | 10.08 |
| $d_{17}$ | 2.86 | 3.05 | 2.97 |

Example 5

| $r_1 = 25.173$ | $d_1 = 0.80$ | $n_{d1} = 1.92286$ | $\nu_{d1} = 18.90$ |
|---|---|---|---|
| $r_2 = 16.537$ | $d_2 = 0.20$ | | |
| $r_3 = 18.252$ | $d_3 = 3.06$ | $n_{d2} = 1.88300$ | $\nu_{d2} = 40.76$ |
| $r_4 = -4161.584$ | $d_4$ = variable | | |
| $r_5 = -44.093$ (AS) | $d_5 = 0.80$ | $n_{d3} = 1.83481$ | $\nu_{d3} = 42.71$ |
| $r_6 = 6.129$ (AS) | $d_6 = 2.67$ | | |
| $r_7 = -897.611$ | $d_7 = 1.86$ | $n_{d4} = 1.92286$ | $\nu_{d4} = 18.90$ |
| $r_8 = -16.194$ | $d_8 = 0.68$ | $n_{d5} = 1.83481$ | $\nu_{d5} = 42.71$ |
| $r_9 = -75.584$ (AS) | $d_9$ = variable | | |
| $r_{10} = \infty$ (S) | $d_{10} = 0.10$ | | |
| $r_{11} = 5.515$ (AS) | $d_{11} = 2.70$ | $n_{d6} = 1.58913$ | $\nu_{d6} = 61.14$ |
| $r_{12} = -10.975$ (AS) | $d_{12} = 0.10$ | | |
| $r_{13} = 5.494$ | $d_{13} = 1.36$ | $n_{d7} = 1.59201$ | $\nu_{d7} = 67.02$ |
| $r_{14} = 12.850$ | $d_{14} = 0.80$ | $n_{d8} = 2.00069$ | $\nu_{d8} = 25.46$ |
| $r_{15} = 3.429$ | $d_{15}$ = variable | | |
| $r_{16} = 19.614$ (AS) | $d_{16} = 2.07$ | $n_{d9} = 1.74330$ | $\nu_{d9} = 49.33$ |
| $r_{17} = -27.158$ | $d_{17}$ = variable | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.36$ | | |
| $r_{22} = \infty$ (I) | | | |

Aspherical coefficients

5th surface

K = 0.000
$A_4 = 2.01152 \times 10^{-4}$  $A_6 = -5.53549 \times 10^{-6}$  $A_8 = 1.09307 \times 10^{-7}$
$A_{10} = -9.22389 \times 10^{-10}$ 6th surface K = 0.000
$A_4 = 1.24289 \times 10^{-4}$  $A_6 = 2.52204 \times 10^{-5}$  $A_8 = -1.55015 \times 10^{-6}$
$A_{10} = 3.87174 \times 10^{-8}$ 9th surface K = 15.880
$A_4 = -2.56363 \times 10^{-4}$  $A_6 = 3.83459 \times 10^{-7}$  $A_8 = -1.74921 \times 10^{-7}$
$A_{10} = 0$ 11th surface K = -0.000
$A_4 = -9.56239 \times 10^{-4}$  $A_6 = -9.52999 \times 10^{-6}$  $A_8 = -3.92591 \times 10^{-7}$
$A_{10} = 1.39818 \times 10^{-7}$ 12th surface K = 0.000
$A_4 = 4.88481 \times 10^{-4}$  $A_6 = -6.29539 \times 10^{-6}$  $A_8 = 4.03797 \times 10^{-7}$
$A_{10} = 1.15552 \times 10^{-7}$ 16th surface K = 0.000
$A_4 = 3.74250 \times 10^{-5}$  $A_6 = 1.03247 \times 10^{-5}$  $A_8 = -3.43630 \times 10^{-7}$
$A_{10} = 5.32503 \times 10^{-9}$ Zoom Data(∞)

|  | WE | ST | TE |
|---|---|---|---|
| f (mm) | 5.06 | 12.01 | 24.29 |
| $F_{NO}$ | 3.10 | 4.44 | 4.96 |
| 2ω (°) | 80.15 | 35.27 | 17.62 |
| $d_4$ | 0.72 | 5.21 | 13.32 |
| $d_9$ | 11.01 | 3.94 | 0.73 |
| $d_{15}$ | 2.77 | 8.18 | 10.05 |
| $d_{17}$ | 2.83 | 3.00 | 2.97 |

Example 6

| $r_1 = 23.739$ | $d_1 = 0.81$ | $n_{d1} = 1.94595$ | $\nu_{d1} = 17.98$ |
|---|---|---|---|
| $r_2 = 16.355$ | $d_2 = 0.21$ | | |
| $r_3 = 18.106$ | $d_3 = 3.01$ | $n_{d2} = 1.88300$ | $\nu_{d2} = 40.76$ |
| $r_4 = 846.562$ | $d_4$ = variable | | |
| $r_5 = -52.113$ (AS) | $d_5 = 0.82$ | $n_{d3} = 1.88300$ | $\nu_{d3} = 40.76$ |
| $r_6 = 6.190$ (AS) | $d_6 = 2.65$ | | |
| $r_7 = -235.098$ | $d_7 = 1.86$ | $n_{d4} = 1.94595$ | $\nu_{d4} = 17.98$ |
| $r_8 = -15.562$ | $d_8 = 0.09$ | | |
| $r_9 = -14.315$ | $d_9 = 0.80$ | $n_{d5} = 1.88300$ | $\nu_{d5} = 40.76$ |
| $r_{10} = -41.886$ (AS) | $d_{10}$ = variable | | |
| $r_{11} = \infty$ (S) | $d_{11} = 0.10$ | | |
| $r_{12} = 5.555$ (AS) | $d_{12} = 2.70$ | $n_{d6} = 1.58913$ | $\nu_{d6} = 61.14$ |
| $r_{13} = -10.974$ (AS) | $d_{13} = 0.10$ | | |
| $r_{14} = 5.438$ | $d_{14} = 1.38$ | $n_{d7} = 1.59201$ | $\nu_{d7} = 67.02$ |
| $r_{15} = 13.503$ | $d_{15} = 0.80$ | $n_{d8} = 2.00069$ | $\nu_{d8} = 25.46$ |
| $r_{16} = 3.433$ | $d_{16}$ = variable | | |
| $r_{17} = 18.727$ (AS) | $d_{17} = 2.07$ | $n_{d9} = 1.74330$ | $\nu_{d9} = 49.33$ |
| $r_{18} = -29.343$ | $d_{18}$ = variable | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$ (I) | | | |

Aspherical coefficients

5th surface

K = 0.000
$A_4 = 2.02790 \times 10^{-4}$  $A_6 = -6.36728 \times 10^{-6}$  $A_8 = 1.15320 \times 10^{-7}$
$A_{10} = -8.37226 \times 10^{-10}$ 6th surface K = 0.000
$A_4 = 8.20642 \times 10^{-5}$  $A_6 = 2.47151 \times 10^{-5}$  $A_8 = -1.53936 \times 10^{-6}$
$A_{10} = 2.64133 \times 10^{-8}$ 10th surface K = 6.008
$A_4 = -2.06900 \times 10^{-4}$  $A_6 = -2.13247 \times 10^{-6}$  $A_8 = 1.58746 \times 10^{-8}$
$A_{10} = 0$ -continued

12th surface

K = −0.000
$A_4 = -9.21086 \times 10^{-4}$   $A_6 = -6.31048 \times 10^{-6}$   $A_8 = -1.81135 \times 10^{-6}$
$A_{10} = 2.67397 \times 10^{-7}$

13th surface

K = 0.000
$A_4 = 4.87773 \times 10^{-4}$   $A_6 = 3.10768 \times 10^{-6}$   $A_8 = -2.75976 \times 10^{-6}$
$A_{10} = 3.94656 \times 10^{-7}$

17th surface

K = 0.000
$A_4 = 2.23802 \times 10^{-5}$   $A_6 = 1.07437 \times 10^{-5}$   $A_8 = -3.48358 \times 10^{-7}$
$A_{10} = 5.42112 \times 10^{-9}$

Zoom Data(∞)

|          | WE     | ST     | TE     |
|----------|--------|--------|--------|
| f (mm)   | 5.06   | 12.01  | 24.29  |
| $F_{NO}$ | 3.12   | 4.57   | 4.94   |
| 2ω (°)   | 80.16  | 35.42  | 17.62  |
| $d_4$    | 0.72   | 4.78   | 13.23  |
| $d_{10}$ | 10.77  | 3.71   | 0.66   |
| $d_{16}$ | 2.77   | 8.47   | 10.05  |
| $d_{18}$ | 2.85   | 3.06   | 2.96   |

Example 7

| $r_1 = 23.679$ | $d_1 = 0.81$ | $n_{d1} = 1.94595$ | $\nu_{d1} = 17.98$ |
| $r_2 = 16.309$ | $d_2 = 0.20$ | | |
| $r_3 = 17.975$ | $d_3 = 3.03$ | $n_{d2} = 1.88300$ | $\nu_{d2} = 40.76$ |
| $r_4 = 652.312$ | $d_4$ = variable | | |
| $r_5 = -57.513$ (AS) | $d_5 = 0.82$ | $n_{d3} = 1.88300$ | $\nu_{d3} = 40.76$ |
| $r_6 = 6.169$ (AS) | $d_6 = 2.64$ | | |
| $r_7 = -172.005$ | $d_7 = 1.92$ | $n_{d4} = 2.10227$ | $\nu_{d4} = 17.10$ |
| $r_8 = -18.412$ | $d_8 = 0.11$ | | |
| $r_9 = -15.586$ | $d_9 = 0.80$ | $n_{d5} = 1.88300$ | $\nu_{d5} = 40.76$ |
| $r_{10} = -47.805$ (AS) | $d_{10}$ = variable | | |
| $r_{11} = \infty$ (S) | $d_{11} = 0.10$ | | |
| $r_{12} = 5.447$ (AS) | $d_{12} = 2.70$ | $n_{d6} = 1.58913$ | $\nu_{d6} = 61.14$ |
| $r_{13} = -10.900$ (AS) | $d_{13} = 0.10$ | | |
| $r_{14} = 5.577$ | $d_{14} = 1.35$ | $n_{d7} = 1.59201$ | $\nu_{d7} = 67.02$ |
| $r_{15} = 13.324$ | $d_{15} = 0.80$ | $n_{d8} = 2.00069$ | $\nu_{d8} = 25.46$ |
| $r_{16} = 3.452$ | $d_{16}$ = variable | | |
| $r_{17} = 19.617$ (AS) | $d_{17} = 2.07$ | $n_{d9} = 1.74330$ | $\nu_{d9} = 49.33$ |
| $r_{18} = -26.823$ | $d_{18}$ = variable | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.36$ | | |
| $r_{23} = \infty$ (I) | | | |

Aspherical coefficients

5th surface

K = 0.000
$A_4 = 2.08796 \times 10^{-4}$   $A_6 = -7.65961 \times 10^{-6}$   $A_8 = 1.42959 \times 10^{-7}$
$A_{10} = -1.03287 \times 10^{-9}$

6th surface

K = 0.000
$A_4 = 9.25739 \times 10^{-5}$   $A_6 = 2.37928 \times 10^{-5}$   $A_8 = -1.56581 \times 10^{-6}$
$A_{10} = 2.33770 \times 10^{-8}$

10th surface

K = 13.662
$A_4 = -2.04807 \times 10^{-4}$   $A_6 = -2.93679 \times 10^{-6}$   $A_8 = 7.51268 \times 10^{-8}$
$A_{10} = 0$

12th surface

K = −0.000
$A_4 = -9.47047 \times 10^{-4}$   $A_6 = -9.73137 \times 10^{-6}$   $A_8 = -9.44664 \times 10^{-7}$
$A_{10} = 2.30496 \times 10^{-7}$

13th surface

K = 0.000
$A_4 = 5.55221 \times 10^{-4}$   $A_6 = -3.16660 \times 10^{-6}$   $A_8 = -3.51784 \times 10^{-7}$
$A_{10} = 2.04855 \times 10^{-7}$

17th surface

K = 0.000
$A_4 = 2.11262 \times 10^{-5}$   $A_6 = 1.08100 \times 10^{-5}$   $A_8 = -3.55468 \times 10^{-7}$
$A_{10} = 5.58942 \times 10^{-9}$

Zoom Data(∞)

|          | WE     | ST     | TE     |
|----------|--------|--------|--------|
| f (mm)   | 5.06   | 12.01  | 24.29  |
| $F_{NO}$ | 3.11   | 4.57   | 4.91   |
| 2ω (°)   | 80.18  | 35.47  | 17.61  |
| $d_4$    | 0.72   | 4.59   | 13.25  |
| $d_{10}$ | 10.75  | 3.70   | 0.68   |
| $d_{16}$ | 2.76   | 8.58   | 9.98   |
| $d_{18}$ | 2.86   | 3.06   | 2.97   |

Example 8

| $r_1 = 23.572$ | $d_1 = 0.81$ | $n_{d1} = 1.94595$ | $\nu_{d1} = 17.98$ |
| $r_2 = 16.325$ | $d_2 = 0.19$ | | |
| $r_3 = 17.924$ | $d_3 = 3.08$ | $n_{d2} = 1.88300$ | $\nu_{d2} = 40.76$ |
| $r_4 = 481.040$ | $d_4$ = variable | | |
| $r_5 = -63.672$ (AS) | $d_5 = 0.82$ | $n_{d3} = 1.88300$ | $\nu_{d3} = 40.76$ |
| $r_6 = 6.059$ (AS) | $d_6 = 2.72$ | | |
| $r_7 = -238.294$ | $d_7 = 1.87$ | $n_{d4} = 2.10227$ | $\nu_{d4} = 17.10$ |
| $r_8 = -19.462$ | $d_8 = 0.80$ | $n_{d5} = 1.88300$ | $\nu_{d5} = 40.76$ |
| $r_9 = -90.854$ (AS) | $d_9$ = variable | | |
| $r_{10} = \infty$ (S) | $d_{10} = 0.10$ | | |
| $r_{11} = 5.548$ (AS) | $d_{11} = 2.70$ | $n_{d6} = 1.58913$ | $\nu_{d6} = 61.14$ |
| $r_{12} = -11.217$ (AS) | $d_{12} = 0.10$ | | |
| $r_{13} = 5.502$ | $d_{13} = 1.39$ | $n_{d7} = 1.59201$ | $\nu_{d7} = 67.02$ |
| $r_{14} = 13.285$ | $d_{14} = 0.80$ | $n_{d8} = 2.00069$ | $\nu_{d8} = 25.46$ |
| $r_{15} = 3.476$ | $d_{15}$ = variable | | |
| $r_{16} = 19.903$ (AS) | $d_{16} = 2.07$ | $n_{d9} = 1.74330$ | $\nu_{d9} = 49.33$ |
| $r_{17} = -26.017$ | $d_{17}$ = variable | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.36$ | | |
| $r_{22} = \infty$ (I) | | | |

Aspherical coefficients

5th surface

K = 0.000
$A_4 = 2.11173 \times 10^{-4}$   $A_6 = -8.21005 \times 10^{-6}$   $A_8 = 1.62208 \times 10^{-7}$
$A_{10} = -1.25817 \times 10^{-9}$

6th surface

K = 0.000
$A_4 = 1.55260 \times 10^{-4}$   $A_6 = 2.35459 \times 10^{-5}$   $A_8 = -1.47843 \times 10^{-6}$
$A_{10} = 2.40340 \times 10^{-8}$

9th surface

K = 13.988
$A_4 = -2.46764 \times 10^{-4}$   $A_6 = -3.00682 \times 10^{-6}$   $A_8 = 1.43307 \times 10^{-8}$
$A_{10} = 0$

11th surface

K = −0.000
$A_4 = -8.70152 \times 10^{-4}$   $A_6 = 2.07452 \times 10^{-6}$   $A_8 = -2.51898 \times 10^{-6}$
$A_{10} = 3.52050 \times 10^{-7}$

12th surface

K = 0.000
$A_4 = 5.43211 \times 10^{-4}$   $A_6 = 1.77046 \times 10^{-5}$   $A_8 = -4.53251 \times 10^{-6}$
$A_{10} = 5.84184 \times 10^{-7}$ -continued 16th surface K = 0.000
$A_4 = 1.55829 \times 10^{-5}$  $A_6 = 1.00684 \times 10^{-5}$  $A_8 = -3.25292 \times 10^{-7}$
$A_{10} = 5.11814 \times 10^{-9}$ Zoom Data(∞)

|  | WE | ST | TE |
|---|---|---|---|
| f (mm) | 5.06 | 12.01 | 24.29 |
| $F_{NO}$ | 3.03 | 4.45 | 4.73 |
| 2ω (°) | 80.16 | 35.27 | 17.59 |
| $d_4$ | 0.72 | 5.02 | 13.27 |
| $d_9$ | 10.82 | 3.84 | 0.72 |
| $d_{15}$ | 2.75 | 8.31 | 9.95 |
| $d_{17}$ | 2.86 | 3.04 | 2.97 |

Example 9

| $r_1 = 21.524$ | $d_1 = 0.80$ | $n_{d1} = 1.92286$ | $v_{d1} = 18.90$ |
|---|---|---|---|
| $r_2 = 15.990$ | $d_2 = 0.25$ | | |
| $r_3 = 18.038$ | $d_3 = 3.04$ | $n_{d2} = 1.80400$ | $v_{d2} = 46.57$ |
| $r_4 = 1821.002$ | $d_4$ = variable | | |
| $r_5 = -46.956$ (AS) | $d_5 = 0.79$ | $n_{d3} = 1.80610$ | $v_{d3} = 40.92$ |
| $r_6 = 5.863$ (AS) | $d_6 = 2.76$ | | |
| $r_7 = -178.037$ | $d_7 = 1.90$ | $n_{d4} = 1.92286$ | $v_{d4} = 18.90$ |
| $r_8 = -14.340$ | $d_8 = 0.67$ | $n_{d5} = 1.80610$ | $v_{d5} = 40.92$ |
| $r_9 = -72.767$ (AS) | $d_9$ = variable | | |
| $r_{10} = \infty$ (S) | $d_{10} = 0.10$ | | |
| $r_{11} = 5.470$ (AS) | $d_{11} = 2.70$ | $n_{d6} = 1.58913$ | $v_{d6} = 61.14$ |
| $r_{12} = -11.162$ (AS) | $d_{12} = 0.10$ | | |
| $r_{13} = 5.576$ | $d_{13} = 1.36$ | $n_{d7} = 1.59201$ | $v_{d7} = 67.02$ |
| $r_{14} = 13.756$ | $d_{14} = 0.80$ | $n_{d8} = 2.00069$ | $v_{d8} = 25.46$ |
| $r_{15} = 3.493$ | $d_{15}$ = variable | | |
| $r_{16} = 19.520$ (AS) | $d_{16} = 2.07$ | $n_{d9} = 1.74330$ | $v_{d9} = 49.33$ |
| $r_{17} = -27.248$ | $d_{17}$ = variable | | |
| $r_{18} = \infty$ | $d_{18} = 0.40$ | $n_{d10} = 1.54771$ | $v_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $v_{d11} = 64.14$ |
| $r_{21} = \infty$ | $d_{21} = 0.36$ | | |
| $r_{22} = \infty$ (I) | | | |

Aspherical coefficients

5th surface

K = 0.000
$A_4 = 2.34682 \times 10^{-4}$  $A_6 = -7.08038 \times 10^{-6}$  $A_8 = 1.25390 \times 10^{-7}$
$A_{10} = -9.36786 \times 10^{-10}$ 6th surface K = 0.000
$A_4 = 1.52904 \times 10^{-4}$  $A_6 = 2.55798 \times 10^{-5}$  $A_8 = -1.41637 \times 10^{-6}$
$A_{10} = 2.87416 \times 10^{-8}$ 9th surface K = 4.725
$A_4 = -2.74195 \times 10^{-4}$  $A_6 = -1.46147 \times 10^{-6}$  $A_8 = -1.44866 \times 10^{-7}$
$A_{10} = 0$ 11th surface K = -0.000
$A_4 = -9.07011 \times 10^{-4}$  $A_6 = 6.10900 \times 10^{-6}$  $A_8 = -3.38866 \times 10^{-6}$
$A_{10} = 4.78449 \times 10^{-7}$ 12th surface K = 0.000
$A_4 = 5.63212 \times 10^{-4}$  $A_6 = 2.36073 \times 10^{-5}$  $A_8 = -6.03623 \times 10^{-6}$
$A_{10} = 8.08280 \times 10^{-7}$ 16th surface K = 0.000
$A_4 = 1.27541 \times 10^{-5}$  $A_6 = 1.11474 \times 10^{-5}$  $A_8 = -3.87618 \times 10^{-7}$
$A_{10} = 6.24145 \times 10^{-9}$ -continued Zoom Data(∞)

|  | WE | ST | TE |
|---|---|---|---|
| f (mm) | 5.06 | 12.01 | 24.29 |
| $F_{NO}$ | 3.11 | 4.45 | 4.93 |
| 2ω (°) | 80.13 | 35.19 | 17.61 |
| $d_4$ | 0.72 | 5.33 | 13.27 |
| $d_9$ | 10.94 | 3.89 | 0.69 |
| $d_{15}$ | 2.76 | 8.08 | 10.07 |
| $d_{17}$ | 2.86 | 3.05 | 2.97 |

Example 10

| $r_1 = 21.929$ | $d_1 = 0.81$ | $n_{d1} = 1.94595$ | $v_{d1} = 17.98$ |
|---|---|---|---|
| $r_2 = 15.886$ | $d_2 = 3.02$ | $n_{d2} = 1.83481$ | $v_{d2} = 42.71$ |
| $r_3 = 87.110$ | $d_3$ = variable | | |
| $r_4 = -603.712$ (AS) | $d_4 = 0.82$ | $n_{d3} = 1.88300$ | $v_{d3} = 40.76$ |
| $r_5 = 5.962$ (AS) | $d_5 = 2.72$ | | |
| $r_6 = 108.526$ | $d_6 = 1.76$ | $n_{d4} = 2.10227$ | $v_{d4} = 17.10$ |
| $r_7 = -23.243$ | $d_7 = 0.16$ | | |
| $r_8 = -17.863$ | $d_8 = 0.80$ | $n_{d5} = 1.88300$ | $v_{d5} = 40.76$ |
| $r_9 = -201.302$ (AS) | $d_9$ = variable | | |
| $r_{10} = \infty$ (S) | $d_{10} = 0.10$ | | |
| $r_{11} = 5.737$ (AS) | $d_{11} = 2.70$ | $n_{d6} = 1.58913$ | $v_{d6} = 61.14$ |
| $r_{12} = -10.526$ (AS) | $d_{12} = 0.10$ | | |
| $r_{13} = 5.184$ | $d_{13} = 1.42$ | $n_{d7} = 1.59201$ | $v_{d7} = 67.02$ |
| $r_{14} = 12.685$ | $d_{14} = 0.80$ | $n_{d8} = 2.00069$ | $v_{d8} = 25.46$ |
| $r_{15} = 3.389$ | $d_{15}$ = variable | | |
| $r_{16} = 28.421$ (AS) | $d_{16} = 2.07$ | $n_{d9} = 1.74330$ | $v_{d9} = 49.33$ |
| $r_{17} = -19.743$ | $d_{17}$ = variable | | |
| $r_{18} = \infty$ | $d_{18} = 0.40$ | $n_{d10} = 1.54771$ | $v_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $v_{d11} = 64.14$ |
| $r_{21} = \infty$ | $d_{21} = 0.35$ | | |
| $r_{22} = \infty$ (I) | | | |

Aspherical coefficients

4th surface

K = 0.000
$A_4 = 1.17638 \times 10^{-4}$  $A_6 = -1.87398 \times 10^{-6}$  $A_8 = -1.21415 \times 10^{-8}$
$A_{10} = 3.25687 \times 10^{-10}$ 5th surface K = 0.000
$A_4 = 9.74365 \times 10^{-5}$  $A_6 = 1.86507 \times 10^{-5}$  $A_8 = -6.27883 \times 10^{-7}$
$A_{10} = -6.71787 \times 10^{-9}$ 9th surface K = 300.320
$A_4 = -2.68737 \times 10^{-4}$  $A_6 = -2.18216 \times 10^{-8}$  $A_8 = -4.79877 \times 10^{-8}$
$A_{10} = 0$ 11th surface K = -0.000
$A_4 = -9.41932 \times 10^{-4}$  $A_6 = -1.82332 \times 10^{-5}$  $A_8 = -9.47875 \times 10^{-7}$
$A_{10} = 1.96272 \times 10^{-7}$ 12th surface K = 0.000
$A_4 = 4.34113 \times 10^{-4}$  $A_6 = -1.86904 \times 10^{-5}$  $A_8 = -3.97394 \times 10^{-7}$
$A_{10} = 1.70317 \times 10^{-7}$ 16th surface K = 0.000
$A_4 = 2.98825 \times 10^{-5}$  $A_6 = 7.00636 \times 10^{-6}$  $A_8 = -2.06857 \times 10^{-7}$
$A_{10} = 3.08660 \times 10^{-9}$ Zoom Data(∞)

|  | WE | ST | TE |
|---|---|---|---|
| f (mm) | 5.06 | 12.01 | 24.29 |
| $F_{NO}$ | 3.03 | 4.93 | 4.99 |
| 2ω (°) | 80.21 | 36.18 | 17.76 |
| $d_3$ | 0.74 | 0.99 | 13.31 |
| $d_9$ | 11.18 | 3.27 | 0.898 |

|  |  |  |  |
|---|---|---|---|
| $d_{15}$ | 2.71 | 9.95 | 10.21 |
| $d_{17}$ | 2.64 | 2.99 | 2.99 |

Example 11

$r_1 = 19.964$    $d_1 = 0.80$    $n_{d1} = 1.92286$    $\nu_{d1} = 18.90$
$r_2 = 15.354$    $d_2 = 0.22$
$r_3 = 16.981$    $d_3 = 3.10$    $n_{d2} = 1.76802$    $\nu_{d2} = 49.24$
$r_4 = 321.532$    $d_4 = $ variable
$r_5 = -79.400$ (AS)    $d_5 = 0.82$    $n_{d3} = 1.88300$    $\nu_{d3} = 40.76$
$r_6 = 6.026$ (AS)    $d_6 = 2.65$
$r_7 = -512.296$    $d_7 = 2.00$    $n_{d4} = 2.00170$    $\nu_{d4} = 20.64$
$r_8 = -14.190$    $d_8 = 0.13$
$r_9 = -10.837$ (AS)    $d_9 = 0.67$    $n_{d5} = 1.81600$    $\nu_{d5} = 46.62$
$r_{10} = -38.820$    $d_{10} = $ variable
$r_{11} = \infty$ (S)    $d_{11} = 0.10$
$r_{12} = 5.567$ (AS)    $d_{12} = 2.70$    $n_{d6} = 1.58913$    $\nu_{d6} = 61.14$
$r_{13} = -10.835$ (AS)    $d_{13} = 0.10$
$r_{14} = 5.426$    $d_{14} = 1.39$    $n_{d7} = 1.59201$    $\nu_{d7} = 67.02$
$r_{15} = 13.374$    $d_{15} = 0.80$    $n_{d8} = 2.00069$    $\nu_{d8} = 25.46$
$r_{16} = 3.434$    $d_{16} = $ variable
$r_{17} = 21.181$ (AS)    $d_{17} = 2.07$    $n_{d9} = 1.74330$    $\nu_{d9} = 49.33$
$r_{18} = -23.592$    $d_{18} = $ variable
$r_{19} = \infty$    $d_{19} = 0.40$    $n_{d10} = 1.54771$    $\nu_{d10} = 62.84$
$r_{20} = \infty$    $d_{20} = 0.50$
$r_{21} = \infty$    $d_{21} = 0.50$    $n_{d11} = 1.51633$    $\nu_{d11} = 64.14$
$r_{22} = \infty$    $d_{22} = 0.36$
$r_{23} = \infty$ (I)

Aspherical coefficients

5th surface $K = 0.000$
$A_4 = 1.81913 \times 10^{-4}$    $A_6 = -7.45514 \times 10^{-6}$    $A_8 = 1.16696 \times 10^{-7}$
$A_{10} = -6.24258 \times 10^{-10}$ 6th surface $K = 0.000$
$A_4 = 3.02384 \times 10^{-5}$    $A_6 = 2.11070 \times 10^{-5}$    $A_8 = -1.27196 \times 10^{-6}$
$A_{10} = 4.98377 \times 10^{-9}$ 9th surface $K = -0.063$
$A_4 = 2.66985 \times 10^{-4}$    $A_6 = 5.08873 \times 10^{-6}$    $A_8 = -1.46937 \times 10^{-7}$
$A_{10} = 0$ 12th surface $K = -0.000$
$A_4 = -9.20807 \times 10^{-4}$    $A_6 = -4.91248 \times 10^{-6}$    $A_8 = -3.02284 \times 10^{-6}$
$A_{10} = 3.84485 \times 10^{-7}$ 13th surface $K = 0.000$
$A_4 = 5.02906 \times 10^{-4}$    $A_6 = 7.33058 \times 10^{-6}$    $A_8 = -5.38763 \times 10^{-6}$
$A_{10} = 6.41876 \times 10^{-7}$ 17th surface $K = 0.000$
$A_4 = 2.80646 \times 10^{-6}$    $A_6 = 1.03678 \times 10^{-5}$    $A_8 = -3.21345 \times 10^{-7}$
$A_{10} = 4.86255 \times 10^{-9}$ Zoom Data(∞)

|  | WE | ST | TE |
|---|---|---|---|
| f (mm) | 5.06 | 12.01 | 24.29 |
| $F_{NO}$ | 3.09 | 4.69 | 4.91 |
| 2ω (°) | 80.15 | 35.68 | 17.65 |
| $d_4$ | 0.73 | 3.65 | 13.26 |
| $d_{10}$ | 10.76 | 3.56 | 0.77 |
| $d_{16}$ | 2.74 | 9.08 | 10.01 |
| $d_{18}$ | 2.81 | 3.04 | 2.97 |

Example 12

$r_1 = 20.035$    $d_1 = 0.80$    $n_{d1} = 1.92286$    $\nu_{d1} = 18.90$
$r_2 = 15.388$    $d_2 = 0.21$
$r_3 = 16.987$    $d_3 = 3.10$    $n_{d2} = 1.76802$    $\nu_{d2} = 49.24$
$r_4 = 322.739$    $d_4 = $ variable
$r_5 = -67.042$ (AS)    $d_5 = 0.82$    $n_{d3} = 1.88300$    $\nu_{d3} = 40.76$
$r_6 = 6.104$ (AS)    $d_6 = 2.63$
$r_7 = -553.055$    $d_7 = 2.02$    $n_{d4} = 2.00170$    $\nu_{d4} = 20.64$
$r_8 = -14.110$    $d_8 = 0.17$
$r_9 = -11.468$ (AS)    $d_9 = 0.67$    $n_{d5} = 1.81600$    $\nu_{d5} = 46.62$
$r_{10} = -48.428$ (AS)    $d_{10} = $ variable
$r_{11} = \infty$ (S)    $d_{11} = 0.10$
$r_{12} = 5.592$ (AS)    $d_{12} = 2.70$    $n_{d6} = 1.58913$    $\nu_{d6} = 61.14$
$r_{13} = -10.777$ (AS)    $d_{13} = 0.10$
$r_{14} = 5.381$    $d_{14} = 1.39$    $n_{d7} = 1.59201$    $\nu_{d7} = 67.02$
$r_{15} = 13.633$    $d_{15} = 0.80$    $n_{d8} = 2.00069$    $\nu_{d8} = 25.46$
$r_{16} = 3.428$    $d_{16} = $ variable
$r_{17} = 21.377$ (AS)    $d_{17} = 2.07$    $n_{d9} = 1.74330$    $\nu_{d9} = 49.33$
$r_{18} = -23.467$    $d_{18} = $ variable
$r_{19} = \infty$    $d_{19} = 0.40$    $n_{d10} = 1.54771$    $\nu_{d10} = 62.84$
$r_{20} = \infty$    $d_{20} = 0.50$
$r_{21} = \infty$    $d_{21} = 0.50$    $n_{d11} = 1.51633$    $\nu_{d11} = 64.14$
$r_{22} = \infty$    $d_{22} = 0.36$
$r_{23} = \infty$ (I)

Aspherical coefficients

5th surface $K = 0.000$
$A_4 = 2.02227 \times 10^{-4}$    $A_6 = -8.03922 \times 10^{-6}$    $A_8 = 1.51641 \times 10^{-7}$
$A_{10} = -1.06462 \times 10^{-9}$ 6th surface $K = 0.000$
$A_4 = 3.98938 \times 10^{-5}$    $A_6 = 1.96692 \times 10^{-5}$    $A_8 = -1.68354 \times 10^{-6}$
$A_{10} = 2.76679 \times 10^{-8}$ 9th surface $K = -0.063$
$A_4 = 2.07247 \times 10^{-5}$    $A_6 = -3.77371 \times 10^{-6}$    $A_8 = 2.63786 \times 10^{-7}$
$A_{10} = 0$ 10th surface $K = -0.897$
$A_4 = -2.19314 \times 10^{-4}$    $A_6 = -5.31018 \times 10^{-6}$    $A_8 = 3.15789 \times 10^{-7}$
$A_{10} = 0$ 12th surface $K = -0.000$
$A_4 = -9.35871 \times 10^{-4}$    $A_6 = -1.13973 \times 10^{-5}$    $A_8 = -7.24228 \times 10^{-7}$
$A_{10} = 1.19444 \times 10^{-7}$ 13th surface $K = 0.000$
$A_4 = 4.83658 \times 10^{-4}$    $A_6 = -9.01954 \times 10^{-6}$    $A_8 = 1.55326 \times 10^{-7}$
$A_{10} = 4.11169 \times 10^{-8}$ 17th surface $K = 0.000$
$A_4 = 8.51281 \times 10^{-6}$    $A_6 = 9.83773 \times 10^{-6}$    $A_8 = -3.17684 \times 10^{-7}$
$A_{10} = 5.22025 \times 10^{-9}$ Zoom Data(∞)

|  | WE | ST | TE |
|---|---|---|---|
| f (mm) | 5.06 | 12.01 | 24.29 |
| $F_{NO}$ | 3.09 | 4.69 | 4.92 |
| 2ω (°) | 80.14 | 35.67 | 17.64 |
| $d_4$ | 0.73 | 3.64 | 13.26 |
| $d_{10}$ | 10.77 | 3.56 | 0.77 |
| $d_{16}$ | 2.74 | 9.08 | 10.02 |
| $d_{18}$ | 2.80 | 3.03 | 2.97 |

Example 13

$r_1 = 24.847$    $d_1 = 0.80$    $n_{d1} = 1.94595$    $\nu_{d1} = 17.98$
$r_2 = 16.542$    $d_2 = 0.29$
$r_3 = 18.208$    $d_3 = 3.02$    $n_{d2} = 1.88300$    $\nu_{d2} = 40.76$
$r_4 = 3582.698$    $d_4 = $ variable
$r_5 = -43.179$ (AS)    $d_5 = 0.79$    $n_{d3} = 1.80610$    $\nu_{d3} = 40.92$
$r_6 = 5.891$ (AS)    $d_6 = 2.64$ -continued

| | | | |
|---|---|---|---|
| $r_7 = -157590.062$ | $d_7 = 1.91$ | $n_{d4} = 1.94595$ | $\nu_{d4} = 17.98$ |
| $r_8 = -15.395$ | $d_8 = 0.67$ | $n_{d5} = 1.80610$ | $\nu_{d5} = 40.92$ |
| $r_9 = -175.340$ (AS) | $d_9$ = variable | | |
| $r_{10} = \infty$ (S) | $d_{10} = 0.10$ | | |
| $r_{11} = 5.417$ (AS) | $d_{11} = 2.70$ | $n_{d6} = 1.58913$ | $\nu_{d6} = 61.14$ |
| $r_{12} = -10.144$ (AS) | $d_{12}$ = variable | | |
| $r_{13} = 5.942$ | $d_{13} = 1.42$ | $n_{d7} = 1.59201$ | $\nu_{d7} = 67.02$ |
| $r_{14} = 24.078$ | $d_{14} = 0.80$ | $n_{d8} = 2.00069$ | $\nu_{d8} = 25.46$ |
| $r_{15} = 3.618$ | $d_{15}$ = variable | | |
| $r_{16} = 17.723$ (AS) | $d_{16} = 2.07$ | $n_{d9} = 1.74330$ | $\nu_{d9} = 49.33$ |
| $r_{17} = -30.024$ | $d_{17}$ = variable | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.36$ | | |
| $r_{22} = \infty$ (I) | | | |

Aspherical coefficients

5th surface $K = 0.000$
$A_4 = 2.41650 \times 10^{-4}$  $A_6 = -7.80486 \times 10^{-6}$  $A_8 = 1.53963 \times 10^{-7}$
$A_{10} = -1.21087 \times 10^{-9}$ 6th surface $K = 0.000$
$A_4 = 1.85981 \times 10^{-4}$  $A_6 = 2.55754 \times 10^{-5}$  $A_8 = -1.92596 \times 10^{-6}$
$A_{10} = 3.81224 \times 10^{-8}$ 9th surface $K = -4.077$
$A_4 = -3.33609 \times 10^{-4}$  $A_6 = 6.19746 \times 10^{-6}$  $A_8 = -2.40693 \times 10^{-7}$
$A_{10} = 4.21649 \times 10^{-10}$ 11th surface $K = -0.000$
$A_4 = -1.00640 \times 10^{-3}$  $A_6 = 2.89626 \times 10^{-5}$  $A_8 = -5.10096 \times 10^{-6}$
$A_{10} = 7.01287 \times 10^{-7}$ 12th surface $K = 0.000$
$A_4 = 6.92460 \times 10^{-4}$  $A_6 = 4.80286 \times 10^{-5}$  $A_8 = -9.42465 \times 10^{-6}$
$A_{10} = 1.22823 \times 10^{-6}$ 16th surface $K = 0.000$
$A_4 = 3.67077 \times 10^{-5}$  $A_6 = 1.07760 \times 10^{-5}$  $A_8 = -3.84914 \times 10^{-7}$
$A_{10} = 6.38037 \times 10^{-9}$ Zoom Data(∞)

| | WE | ST | TE |
|---|---|---|---|
| f (mm) | 5.06 | 12.00 | 24.28 |
| $F_{NO}$ | 3.23 | 4.54 | 5.07 |
| 2ω (°) | 80.19 | 35.07 | 17.60 |
| $d_4$ | 0.71 | 5.09 | 13.51 |
| $d_9$ | 10.96 | 3.46 | 0.85 |
| $d_{12}$ | 0.20 | 0.57 | 0.40 |
| $d_{15}$ | 2.75 | 7.12 | 9.46 |
| $d_{17}$ | 2.80 | 2.94 | 2.96 |

Example 14

| | | | |
|---|---|---|---|
| $r_1 = 19.959$ | $d_1 = 0.80$ | $n_{d1} = 1.92286$ | $\nu_{d1} = 18.90$ |
| $r_2 = 15.153$ | $d_2 = 0.19$ | | |
| $r_3 = 16.567$ | $d_3 = 3.19$ | $n_{d2} = 1.76802$ | $\nu_{d2} = 49.24$ |
| $r_4 = 328.834$ | $d_4$ = variable | | |
| $r_5 = -66.705$ (AS) | $d_5 = 0.82$ | $n_{d3} = 1.88300$ | $\nu_{d3} = 40.76$ |
| $r_6 = 6.014$ (AS) | $d_6 = 2.67$ | | |
| $r_7 = -97.974$ | $d_7 = 1.95$ | $n_{d4} = 2.00170$ | $\nu_{d4} = 20.64$ |
| $r_8 = -12.905$ | $d_8 = 0.12$ | | |
| $r_9 = -10.476$ (AS) | $d_9 = 0.67$ | $n_{d5} = 1.81600$ | $\nu_{d5} = 46.62$ |
| $r_{10} = -36.471$ | $d_{10}$ = variable | | |
| $r_{11} = \infty$ (S) | $d_{11} = 0.10$ | | |
| $r_{12} = 5.598$ (AS) | $d_{12} = 2.70$ | $n_{d6} = 1.58913$ | $\nu_{d6} = 61.14$ |
| $r_{13} = -10.200$ (AS) | $d_{13}$ = variable | | |
| $r_{14} = 5.893$ | $d_{14} = 1.42$ | $n_{d7} = 1.59201$ | $\nu_{d7} = 67.02$ |
| $r_{15} = 20.687$ | $d_{15} = 0.80$ | $n_{d8} = 2.00069$ | $\nu_{d8} = 25.46$ |
| $r_{16} = 3.680$ | $d_{16}$ = variable | | |
| $r_{17} = 18.589$ (AS) | $d_{17} = 2.07$ | $n_{d9} = 1.74330$ | $\nu_{d9} = 49.33$ |
| $r_{18} = -26.724$ | $d_{18}$ = variable | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.36$ | | |
| $r_{23} = \infty$ (I) | | | |

Aspherical coefficients

5th surface $K = 0.000$
$A_4 = 1.92323 \times 10^{-4}$  $A_6 = -4.86162 \times 10^{-6}$  $A_8 = 5.55922 \times 10^{-8}$
$A_{10} = -2.22548 \times 10^{-10}$ 6th surface $K = 0.000$
$A_4 = 9.52228 \times 10^{-5}$  $A_6 = 2.45561 \times 10^{-5}$  $A_8 = -1.19859 \times 10^{-6}$
$A_{10} = 6.02161 \times 10^{-9}$ 9th surface $K = 0.020$
$A_4 = 3.06753 \times 10^{-4}$  $A_6 = -6.37184 \times 10^{-7}$  $A_8 = 2.66117 \times 10^{-8}$
$A_{10} = 0$ 12th surface $K = -0.000$
$A_4 = -9.26843 \times 10^{-4}$  $A_6 = 3.04592 \times 10^{-5}$  $A_8 = -6.90151 \times 10^{-6}$
$A_{10} = 7.46676 \times 10^{-7}$ 13th surface $K = 0.000$
$A_4 = 6.28294 \times 10^{-4}$  $A_6 = 5.21648 \times 10^{-5}$  $A_8 = -1.31953 \times 10^{-5}$
$A_{10} = 1.46113 \times 10^{-6}$ 17th surface $K = 0.000$
$A_4 = -6.81284 \times 10^{-6}$  $A_6 = 1.02822 \times 10^{-5}$  $A_8 = -3.09403 \times 10^{-7}$
$A_{10} = 4.47496 \times 10^{-9}$ Zoom Data(∞)

| | WE | ST | TE |
|---|---|---|---|
| f (mm) | 5.06 | 12.01 | 24.29 |
| $F_{NO}$ | 3.13 | 4.50 | 4.92 |
| 2ω (°) | 80.23 | 35.24 | 17.60 |
| $d_4$ | 0.72 | 4.62 | 13.21 |
| $d_{10}$ | 10.56 | 3.30 | 0.78 |
| $d_{13}$ | 0.23 | 0.57 | 0.43 |
| $d_{16}$ | 2.76 | 7.67 | 9.68 |
| $d_{18}$ | 2.86 | 3.00 | 2.96 |

Example 15

| | | | |
|---|---|---|---|
| $r_1 = 25.601$ | $d_1 = 0.80$ | $n_{d1} = 1.92286$ | $\nu_{d1} = 18.90$ |
| $r_2 = 16.493$ | $d_2 = 0.20$ | | |
| $r_3 = 18.075$ | $d_3 = 3.23$ | $n_{d2} = 1.88300$ | $\nu_{d2} = 40.76$ |
| $r_4 = -1234.242$ | $d_4$ = variable | | |
| $r_5 = -40.268$ (AS) | $d_5 = 0.80$ | $n_{d3} = 1.83481$ | $\nu_{d3} = 42.71$ |
| $r_6 = 6.022$ (AS) | $d_6 = 2.62$ | | |
| $r_7 = -407.214$ | $d_7 = 1.83$ | $n_{d4} = 1.92286$ | $\nu_{d4} = 18.90$ |
| $r_8 = -15.866$ | $d_8 = 0.68$ | $n_{d5} = 1.83481$ | $\nu_{d5} = 42.71$ |
| $r_9 = -66.674$ (AS) | $d_9$ = variable | | |
| $r_{10} = \infty$ (S) | $d_{10} = 0.10$ | | |
| $r_{11} = 5.520$ (AS) | $d_{11} = 2.70$ | $n_{d6} = 1.58913$ | $\nu_{d6} = 61.14$ |
| $r_{12} = -9.949$ (AS) | $d_{12}$ = variable | | |
| $r_{13} = 6.163$ | $d_{13} = 1.35$ | $n_{d7} = 1.59201$ | $\nu_{d7} = 67.02$ |
| $r_{14} = 18.256$ | $d_{14} = 0.80$ | $n_{d8} = 2.00069$ | $\nu_{d8} = 25.46$ |
| $r_{15} = 3.675$ | $d_{15}$ = variable | | |
| $r_{16} = 15.963$ (AS) | $d_{16} = 2.07$ | $n_{d9} = 1.74330$ | $\nu_{d9} = 49.33$ |
| $r_{17} = -38.145$ | $d_{17}$ = variable | | |
| $r_{18} = \infty$ | $d_{18} = 0.40$ | $n_{d10} = 1.54771$ | $\nu_{d10} = 62.84$ |

-continued

| | | | |
|---|---|---|---|
| $d_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.37$ | | |
| $r_{22} = \infty$ (I) | | | |

Aspherical coefficients

5th surface $K = 0.000$
$A_4 = 2.05163 \times 10^{-4}$   $A_6 = -3.37326 \times 10^{-6}$   $A_8 = 4.45283 \times 10^{-8}$
$A_{10} = -3.62203 \times 10^{-10}$ 6th surface $K = 0.000$
$A_4 = 1.47479 \times 10^{-4}$   $A_6 = 2.72737 \times 10^{-5}$   $A_8 = -1.43607 \times 10^{-6}$
$A_{10} = 3.29097 \times 10^{-8}$ 9th surface $K = 17.341$
$A_4 = -2.82382 \times 10^{-4}$   $A_6 = 3.16842 \times 10^{-6}$   $A_8 = -2.28861 \times 10^{-7}$
$A_{10} = 0$ 11th surface $K = -0.000$
$A_4 = -1.03741 \times 10^{-3}$   $A_6 = 2.15062 \times 10^{-5}$   $A_8 = -6.81878 \times 10^{-6}$
$A_{10} = 7.72131 \times 10^{-7}$ 12th surface $K = 0.000$
$A_4 = 5.90361 \times 10^{-4}$   $A_6 = 4.12917 \times 10^{-5}$   $A_8 = -1.28212 \times 10^{-5}$
$A_{10} = 1.50309 \times 10^{-6}$ 16th surface $K = 0.000$
$A_4 = 2.50156 \times 10^{-5}$   $A_6 = 1.12904 \times 10^{-5}$   $A_8 = -3.91013 \times 10^{-7}$
$A_{10} = 6.07074 \times 10^{-9}$ Zoom Data(∞)

| | WE | ST | TE |
|---|---|---|---|
| f (mm) | 5.06 | 12.00 | 24.29 |
| $F_{NO}$ | 3.13 | 4.24 | 4.94 |
| 2ω (°) | 80.27 | 34.68 | 17.58 |
| $d_4$ | 0.71 | 6.26 | 13.33 |
| $d_9$ | 10.81 | 3.63 | 0.72 |
| $d_{12}$ | 0.27 | 0.57 | 0.42 |
| $d_{15}$ | 2.76 | 6.65 | 9.78 |
| $d_{17}$ | 2.83 | 3.00 | 2.96 |

Example 16

| | | | |
|---|---|---|---|
| $r_1 = 21.193$ | $d_1 = 0.81$ | $n_{d1} = 1.94595$ | $\nu_{d1} = 17.98$ |
| $r_2 = 15.192$ | $d_2 = 3.09$ | $n_{d2} = 1.83481$ | $\nu_{d2} = 42.71$ |
| $r_3 = 81.748$ | $d_3$ = variable | | |
| $r_4 = -603.712$ (AS) | $d_4 = 0.82$ | $n_{d3} = 1.88300$ | $\nu_{d3} = 40.76$ |
| $r_5 = 5.982$ (AS) | $d_5 = 2.78$ | | |
| $r_6 = -237.176$ | $d_6 = 1.71$ | $n_{d4} = 2.10227$ | $\nu_{d4} = 17.10$ |
| $r_7 = -18.101$ | $d_7 = 0.09$ | | |
| $r_8 = -15.997$ | $d_8 = 0.80$ | $n_{d5} = 1.88300$ | $\nu_{d5} = 40.76$ |
| $r_9 = -168.381$ (AS) | $d_9$ = variable | | |
| $r_{10} = \infty$ (S) | $d_{10} = 0.10$ | | |
| $r_{11} = 5.812$ (AS) | $d_{11} = 2.70$ | $n_{d6} = 1.58913$ | $\nu_{d6} = 61.14$ |
| $r_{12} = -10.295$ (AS) | $d_{12}$ = variable | | |
| $r_{13} = 5.387$ | $d_{13} = 1.54$ | $n_{d7} = 1.59201$ | $\nu_{d7} = 67.02$ |
| $r_{14} = 19.283$ | $d_{14} = 0.80$ | $n_{d8} = 2.00069$ | $\nu_{d8} = 25.46$ |
| $r_{15} = 3.554$ | $d_{15}$ = variable | | |
| $r_{16} = 24.991$ (AS) | $d_{16} = 2.07$ | $n_{d9} = 1.74330$ | $\nu_{d9} = 49.33$ |
| $r_{17} = -19.483$ | $d_{17}$ = variable | | |
| $r_{18} = \infty$ | $d_{18} = 0.40$ | $n_{d10} = 1.54771$ | $\nu_{d10} = 62.84$ |
| $r_{19} = \infty$ | $d_{19} = 0.50$ | | |
| $r_{20} = \infty$ | $d_{20} = 0.50$ | $n_{d11} = 1.51633$ | $\nu_{d11} = 64.14$ |
| $r_{21} = \infty$ | $d_{21} = 0.35$ | | |
| $r_{22} = \infty$ (I) | | | |

Aspherical coefficients

4th surface $K = 0.000$
$A_4 = 1.21970 \times 10^{-4}$   $A_6 = -1.08084 \times 10^{-6}$   $A_8 = -1.14600 \times 10^{-8}$
$A_{10} = 1.97222 \times 10^{-10}$ 5th surface $K = 0.000$
$A_4 = 1.75555 \times 10^{-4}$   $A_6 = 2.16172 \times 10^{-5}$   $A_8 = -8.70023 \times 10^{-7}$
$A_{10} = 1.24313 \times 10^{-8}$ 9th surface $K = 410.383$
$A_4 = -2.79644 \times 10^{-4}$   $A_6 = 4.80703 \times 10^{-6}$   $A_8 = -2.06609 \times 10^{-7}$
$A_{10} = 0$ 11th surface $K = -0.000$
$A_4 = -8.72572 \times 10^{-4}$   $A_6 = 1.99478 \times 10^{-5}$   $A_8 = -4.51334 \times 10^{-6}$
$A_{10} = 5.24324 \times 10^{-7}$ 12th surface $K = 0.000$
$A_4 = 5.50797 \times 10^{-4}$   $A_6 = 2.74834 \times 10^{-5}$   $A_8 = -6.52190 \times 10^{-6}$
$A_{10} = 7.69571 \times 10^{-7}$ 16th surface $K = 0.000$
$A_4 = 1.78974 \times 10^{-5}$   $A_6 = 7.85039 \times 10^{-6}$   $A_8 = -2.65852 \times 10^{-7}$
$A_{10} = 4.28825 \times 10^{-9}$ Zoom Data(∞)

| | WE | ST | TE |
|---|---|---|---|
| f (mm) | 5.06 | 12.01 | 24.29 |
| $F_{NO}$ | 3.08 | 4.93 | 4.91 |
| 2ω (°) | 80.33 | 36.11 | 17.66 |
| $d_3$ | 0.74 | 1.00 | 13.34 |
| $d_9$ | 10.94 | 3.05 | 0.89 |
| $d_{12}$ | 0.16 | 0.57 | 0.55 |
| $d_{15}$ | 2.75 | 9.30 | 9.26 |
| $d_{17}$ | 2.70 | 3.00 | 2.99 |

Example 17

| | | | |
|---|---|---|---|
| $r_1 = 24.005$ | $d_1 = 0.80$ | $n_{d1} = 1.92286$ | $\nu_{d1} = 18.90$ |
| $r_2 = 15.730$ | $d_2 = 0.18$ | | |
| $r_3 = 16.798$ | $d_3 = 3.12$ | $n_{d2} = 1.88300$ | $\nu_{d2} = 40.76$ |
| $r_4 = 320.063$ | $d_4$ = variable | | |
| $r_5 = -63.961$ (AS) | $d_5 = 0.80$ | $n_{d3} = 1.83481$ | $\nu_{d3} = 42.71$ |
| $r_6 = 5.769$ (AS) | $d_6 = 2.79$ | | |
| $r_7 = -110.876$ | $d_7 = 1.74$ | $n_{d4} = 1.94595$ | $\nu_{d4} = 17.98$ |
| $r_8 = -15.935$ | $d_8 = 0.08$ | | |
| $r_9 = -14.478$ | $d_9 = 0.68$ | $n_{d5} = 1.83481$ | $\nu_{d5} = 42.71$ |
| $r_{10} = -43.168$ (AS) | $d_{10}$ = variable | | |
| $r_{11} = \infty$ (S) | $d_{11} = 0.10$ | | |
| $r_{12} = 5.627$ (AS) | $d_{12} = 2.70$ | $n_{d6} = 1.58913$ | $\nu_{d6} = 61.14$ |
| $r_{13} = -9.958$ (AS) | $d_{13}$ = variable | | |
| $r_{14} = 6.057$ | $d_{14} = 1.36$ | $n_{d7} = 1.59201$ | $\nu_{d7} = 67.02$ |
| $r_{15} = 18.994$ | $d_{15} = 0.80$ | $n_{d8} = 2.00069$ | $\nu_{d8} = 25.46$ |
| $r_{16} = 3.702$ | $d_{16}$ = variable | | |
| $r_{17} = 16.931$ (AS) | $d_{17} = 2.07$ | $n_{d9} = 1.74330$ | $\nu_{d9} = 49.33$ |
| $r_{18} = -33.088$ | $d_{18}$ = variable | | |
| $r_{19} = \infty$ | $d_{19} = 0.40$ | $n_{d10} = 1.54771$ | $\nu_{d10} = 62.84$ |
| $r_{20} = \infty$ | $d_{20} = 0.50$ | | |
| $r_{21} = \infty$ | $d_{21} = 0.50$ | $n_{d11} = 1.51633$ | $\nu_{d11} = 64.14$ |
| $r_{22} = \infty$ | $d_{22} = 0.37$ | | |
| $r_{23} = \infty$ (I) | | | |

Aspherical coefficients

5th surface $K = 0.000$
$A_4 = 2.20322 \times 10^{-4}$   $A_6 = -8.05410 \times 10^{-6}$   $A_8 = 1.50663 \times 10^{-7}$
$A_{10} = -1.08544 \times 10^{-9}$ -continued 6th surface K = 0.000
$A_4 = 1.19766 \times 10^{-4}$    $A_6 = 2.71353 \times 10^{-5}$    $A_8 = -1.79261 \times 10^{-6}$
$A_{10} = 2.50985 \times 10^{-8}$ 10th surface K = 4.763
$A_4 = -2.60503 \times 10^{-4}$    $A_6 = -1.23050 \times 10^{-6}$    $A_8 = 2.35967 \times 10^{-8}$
$A_{10} = 0$ 12th surface K = −0.000
$A_4 = -9.80569 \times 10^{-4}$    $A_6 = 1.94848 \times 10^{-5}$    $A_8 = -5.98539 \times 10^{-6}$
$A_{10} = 6.24092 \times 10^{-7}$ 13th surface K = 0.000
$A_4 = 5.74317 \times 10^{-4}$    $A_6 = 3.99276 \times 10^{-5}$    $A_8 = -1.14945 \times 10^{-5}$
$A_{10} = 1.22736 \times 10^{-6}$ 17th surface K = 0.000
$A_4 = 8.72792 \times 10^{-7}$    $A_6 = 1.10477 \times 10^{-5}$    $A_8 = -3.58880 \times 10^{-7}$
$A_{10} = 5.71191 \times 10^{-9}$ Zoom Data(∞)

|  | WE | ST | TE |
|---|---|---|---|
| f (mm) | 5.06 | 12.01 | 24.29 |
| $F_{NO}$ | 3.14 | 4.56 | 4.90 |
| 2ω (°) | 80.18 | 35.40 | 17.59 |
| $d_4$ | 0.73 | 4.26 | 13.29 |
| $d_{10}$ | 10.70 | 3.25 | 0.68 |
| $d_{13}$ | 0.29 | 0.58 | 0.46 |
| $d_{16}$ | 2.76 | 7.98 | 9.63 |
| $d_{18}$ | 2.86 | 3.05 | 2.96 |

Example 18

| $r_1 = 17.636$ (AS) | $d_1 = 3.46$ | $n_{d1} = 1.49700$ | $\nu_{d1} = 81.54$ |
|---|---|---|---|
| $r_2 = 1651.373$ (AS) | $d_2$ = variable | | |
| $r_3 = -89.845$ (AS) | $d_3 = 0.82$ | $n_{d2} = 1.88300$ | $\nu_{d2} = 40.76$ |
| $r_4 = 6.252$ (AS) | $d_4 = 2.41$ | | |
| $r_5 = 36.538$ | $d_5 = 2.14$ | $n_{d3} = 1.94595$ | $\nu_{d3} = 17.98$ |
| $r_6 = -20.686$ | $d_6 = 0.20$ | | |
| $r_7 = -15.473$ | $d_7 = 0.70$ | $n_{d4} = 1.88300$ | $\nu_{d4} = 40.76$ |
| $r_8 = -705.490$ (AS) | $d_8$ = variable | | |
| $r_9 = \infty$ (S) | $d_9 = 0.10$ | | |
| $r_{10} = 5.371$ (AS) | $d_{10} = 2.70$ | $n_{d5} = 1.58913$ | $\nu_{d5} = 61.14$ |
| $r_{11} = -12.630$ (AS) | $d_{11} = 0.10$ | | |
| $r_{12} = 4.840$ | $d_{12} = 1.30$ | $n_{d6} = 1.59201$ | $\nu_{d6} = 67.02$ |
| $r_{13} = 8.993$ | $d_{13} = 0.80$ | $n_{d7} = 2.00170$ | $\nu_{d7} = 20.64$ |
| $r_{14} = 3.169$ | $d_{14}$ = variable | | |
| $r_{15} = -175.389$ (AS) | $d_{15} = 2.05$ | $n_{d8} = 2.00170$ | $\nu_{d8} = 20.64$ |
| $r_{16} = -15.339$ | $d_{16}$ = variable | | |
| $r_{17} = \infty$ | $d_{17} = 0.40$ | $n_{d9} = 1.54771$ | $\nu_{d9} = 62.84$ |
| $r_{18} = \infty$ | $d_{18} = 0.50$ | | |
| $r_{19} = \infty$ | $d_{19} = 0.50$ | $n_{d10} = 1.51633$ | $\nu_{d10} = 64.14$ |
| $r_{20} = \infty$ | $d_{20} = 0.36$ | | |
| $r_{21} = \infty$ (I) | | | |

Aspherical coefficients

1st surface

K = −0.000
$A_4 = -9.36696 \times 10^{-21}$    $A_6 = -3.07965 \times 10^{-7}$    $A_8 = 1.40121 \times 10^{-9}$
$A_{10} = 8.27669 \times 10^{-11}$ 2nd surface K = −0.000
$A_4 = 1.06767 \times 10^{-5}$    $A_6 = -7.16715 \times 10^{-7}$    $A_8 = 1.70324 \times 10^{-8}$
$A_{10} = -3.34505 \times 10^{-11}$ -continued 3rd surface K = 0.000
$A_4 = 4.52338 \times 10^{-5}$    $A_6 = 1.74362 \times 10^{-6}$    $A_8 = -8.20880 \times 10^{-8}$
$A_{10} = 1.09382 \times 10^{-9}$ 4th surface K = 0.000
$A_4 = -5.26435 \times 10^{-5}$    $A_6 = 9.38403 \times 10^{-6}$    $A_8 = -4.26308 \times 10^{-7}$
$A_{10} = 1.16873 \times 10^{-8}$ 8th surface K = −3.680
$A_4 = -2.58689 \times 10^{-4}$    $A_6 = 7.09681 \times 10^{-6}$    $A_8 = -7.55479 \times 10^{-7}$
$A_{10} = 1.66474 \times 10^{-8}$ 10th surface K = −0.000
$A_4 = -8.26225 \times 10^{-4}$    $A_6 = 2.42650 \times 10^{-5}$    $A_8 = -2.03186 \times 10^{-6}$
$A_{10} = 2.44772 \times 10^{-7}$ 11th surface K = 0.000
$A_4 = 6.51537 \times 10^{-4}$    $A_6 = 4.56976 \times 10^{-5}$    $A_8 = -3.58200 \times 10^{-6}$
$A_{10} = 4.02796 \times 10^{-7}$ 15th surface K = 0.000
$A_4 = 8.11366 \times 10^{-5}$    $A_6 = 1.01901 \times 10^{-5}$    $A_8 = -3.84282 \times 10^{-7}$
$A_{10} = 5.33610 \times 10^{-9}$ Zoom Data(∞)

|  | WE | ST | TE |
|---|---|---|---|
| f (mm) | 5.06 | 11.98 | 24.29 |
| $F_{NO}$ | 3.03 | 4.41 | 5.05 |
| 2ω (°) | 81.54 | 36.13 | 18.37 |
| $d_2$ | 0.72 | 4.69 | 12.81 |
| $d_8$ | 11.55 | 4.15 | 0.93 |
| $d_{14}$ | 2.78 | 7.77 | 10.07 |
| $d_{16}$ | 2.78 | 2.99 | 3.33 |

Example 19

| $r_1 = 15.057$ (AS) | $d_1 = 3.36$ | $n_{d1} = 1.43875$ | $\nu_{d1} = 94.93$ |
|---|---|---|---|
| $r_2 = 16740.605$ (AS) | $d_2$ = variable | | |
| $r_3 = -109.482$ (AS) | $d_3 = 0.82$ | $n_{d2} = 1.88300$ | $\nu_{d2} = 40.76$ |
| $r_4 = 5.865$ (AS) | $d_4 = 2.48$ | | |
| $r_5 = 29.434$ | $d_5 = 2.25$ | $n_{d3} = 1.94595$ | $\nu_{d3} = 17.98$ |
| $r_6 = -21.699$ | $d_6 = 0.26$ | | |
| $r_7 = -15.455$ | $d_7 = 0.70$ | $n_{d4} = 1.88300$ | $\nu_{d4} = 40.76$ |
| $r_8 = 61494.611$ (AS) | $d_8$ = variable | | |
| $r_9 = \infty$ (S) | $d_9 = 0.10$ | | |
| $r_{10} = 5.519$ (AS) | $d_{10} = 2.70$ | $n_{d5} = 1.58913$ | $\nu_{d5} = 61.14$ |
| $r_{11} = -12.178$ (AS) | $d_{11} = 0.10$ | | |
| $r_{12} = 4.874$ | $d_{12} = 1.36$ | $n_{d6} = 1.59201$ | $\nu_{d6} = 67.02$ |
| $r_{13} = 9.784$ | $d_{13} = 0.80$ | $n_{d7} = 2.00170$ | $\nu_{d7} = 20.64$ |
| $r_{14} = 3.227$ | $d_{14}$ = variable | | |
| $r_{15} = -455.052$ (AS) | $d_{15} = 2.04$ | $n_{d8} = 2.00170$ | $\nu_{d8} = 20.64$ |
| $r_{16} = -15.796$ | $d_{16}$ = variable | | |
| $r_{17} = \infty$ | $d_{17} = 0.40$ | $n_{d9} = 1.54771$ | $\nu_{d9} = 62.84$ |
| $r_{18} = \infty$ | $d_{18} = 0.50$ | | |
| $r_{19} = \infty$ | $d_{19} = 0.50$ | $n_{d10} = 1.51633$ | $\nu_{d10} = 64.14$ |
| $r_{20} = \infty$ | $d_{20} = 0.36$ | | |
| $r_{21} = \infty$ (I) | | | |

Aspherical coefficients

1st surface

K = −0.000
$A_4 = -9.36696 \times 10^{-21}$    $A_6 = -2.82322 \times 10^{-7}$    $A_8 = -3.32314 \times 10^{-9}$
$A_{10} = 9.80939 \times 10^{-11}$ 2nd surface K = −0.000
$A_4 = 2.03046 \times 10^{-5}$    $A_6 = -8.63339 \times 10^{-7}$    $A_8 = 1.39119 \times 10^{-8}$
$A_{10} = -2.72606 \times 10^{-11}$ -continued

3rd surface

K = 0.000
$A_4 = 1.45879 \times 10^{-4}$   $A_6 = -7.06884 \times 10^{-6}$   $A_8 = 1.23121 \times 10^{-7}$
$A_{10} = -5.62979 \times 10^{-10}$

4th surface

K = 0.000
$A_4 = -5.29316 \times 10^{-5}$   $A_6 = 3.56817 \times 10^{-6}$   $A_8 = -1.11723 \times 10^{-6}$
$A_{10} = 1.49013 \times 10^{-8}$

8th surface

K = -3.680
$A_4 = -2.43119 \times 10^{-4}$   $A_6 = 1.50423 \times 10^{-6}$   $A_8 = -8.73464 \times 10^{-8}$
$A_{10} = 2.80319 \times 10^{-9}$

10th surface

K = -0.000
$A_4 = -7.77230 \times 10^{-4}$   $A_6 = 1.47499 \times 10^{-5}$   $A_8 = -1.23145 \times 10^{-6}$
$A_{10} = 1.55776 \times 10^{-7}$

11th surface

K = 0.000
$A_4 = 6.35918 \times 10^{-4}$   $A_6 = 3.49158 \times 10^{-5}$   $A_8 = -2.91520 \times 10^{-6}$
$A_{10} = 2.80196 \times 10^{-7}$

15th surface

K = 0.000
$A_4 = 4.02871 \times 10^{-5}$   $A_6 = 1.18379 \times 10^{-5}$   $A_8 = -4.08960 \times 10^{-7}$
$A_{10} = 5.70846 \times 10^{-9}$

Zoom Data(∞)

|  | WE | ST | TE |
|---|---|---|---|
| f (mm) | 5.06 | 11.98 | 24.29 |
| $F_{NO}$ | 3.11 | 4.53 | 5.05 |
| 2ω (°) | 81.61 | 36.13 | 18.35 |
| $d_2$ | 0.72 | 4.72 | 12.77 |
| $d_8$ | 11.25 | 4.14 | 0.96 |
| $d_{14}$ | 2.79 | 7.94 | 9.79 |
| $d_{16}$ | 2.84 | 2.99 | 3.34 |

Example 20

$r_1 = 24.617$   $d_1 = 0.80$   $n_{d1} = 1.94595$   $v_{d1} = 17.98$
$r_2 = 16.485$   $d_2 = 0.34$
$r_3 = 18.513$   $d_3 = 3.03$   $n_{d2} = 1.88300$   $v_{d2} = 40.76$
$r_4 = -1350.827$   $d_4$ = variable
$r_5 = -39.777$ (AS)   $d_5 = 0.79$   $n_{d3} = 1.80610$   $v_{d3} = 40.92$
$r_6 = 5.736$ (AS)   $d_6 = 2.50$
$r_7 = 46.539$   $d_7 = 1.93$   $n_{d4} = 1.94595$   $v_{d4} = 17.98$
$r_8 = -22.674$   $d_8 = 0.64$   $n_{d5} = 1.80610$   $v_{d5} = 40.92$
$r_9 = 177.436$ (AS)   $d_9$ = variable
$r_{10} = \infty$ (S)   $d_{10}$ = variable
$r_{11} = 5.325$ (AS)   $d_{11} = 2.70$   $n_{d6} = 1.58913$   $v_{d6} = 61.14$
$r_{12} = -9.884$ (AS)   $d_{12} = 0.10$
$r_{13} = 6.305$   $d_{13} = 1.41$   $n_{d7} = 1.59201$   $v_{d7} = 67.02$
$r_{14} = 18.239$   $d_{14} = 0.80$   $n_{d8} = 2.00069$   $v_{d8} = 25.46$
$r_{15} = 3.616$   $d_{15}$ = variable
$r_{16} = 17.024$ (AS)   $d_{16} = 2.07$   $n_{d9} = 1.74330$   $v_{d9} = 49.33$
$r_{17} = 34.757$   $d_{17}$ = variable
$r_{18} = \infty$   $d_{18} = 0.40$   $n_{d10} = 1.54771$   $v_{d10} = 62.84$
$r_{19} = \infty$   $d_{19} = 0.50$
$r_{20} = \infty$   $d_{20} = 0.50$   $n_{d11} = 1.51633$   $v_{d11} = 64.14$
$r_{21} = \infty$   $d_{21} = 0.37$
$r_{22} = \infty$ (I)

Aspherical coefficients

5th surface

K = 0.000
$A_4 = 2.65294 \times 10^{-4}$   $A_6 = -4.86067 \times 10^{-6}$   $A_8 = -4.95916 \times 10^{-8}$
$A_{10} = 1.45582 \times 10^{-9}$

6th surface

K = 0.000
$A_4 = 1.22290 \times 10^{-4}$   $A_6 = 3.07865 \times 10^{-5}$   $A_8 = -1.23246 \times 10^{-6}$
$A_{10} = -2.75048 \times 10^{-8}$

9th surface

K = -4.077
$A_4 = -3.44903 \times 10^{-4}$   $A_6 = 4.47305 \times 10^{-6}$   $A_8 = -7.49149 \times 10^{-7}$
$A_{10} = 2.89043 \times 10^{-8}$

11th surface

K = -0.000
$A_4 = -1.06943 \times 10^{-3}$   $A_6 = 1.88431 \times 10^{-5}$   $A_8 = -3.97910 \times 10^{-6}$
$A_{10} = 3.05632 \times 10^{-7}$

12th surface

K = 0.000
$A_4 = 7.51908 \times 10^{-4}$   $A_6 = 1.59771 \times 10^{-5}$   $A_8 = -2.43151 \times 10^{-6}$
$A_{10} = 2.99982 \times 10^{-7}$

16th surface

K = 0.000
$A_4 = 2.22601 \times 10^{-5}$   $A_6 = 1.31566 \times 10^{-5}$   $A_8 = -4.73811 \times 10^{-7}$
$A_{10} = 7.81341 \times 10^{-9}$

Zoom Data(∞)

|  | WE | ST | TE |
|---|---|---|---|
| f (mm) | 5.06 | 12.01 | 24.28 |
| $F_{NO}$ | 3.07 | 4.72 | 5.05 |
| 2ω (°) | 80.13 | 35.38 | 17.61 |
| $d_4$ | 0.71 | 4.88 | 13.53 |
| $d_9$ | 9.86 | 4.07 | 0.85 |
| $d_{10}$ | 1.54 | 0.22 | 0.28 |
| $d_{15}$ | 2.73 | 8.32 | 9.66 |
| $d_{17}$ | 2.75 | 2.95 | 2.96 |

Example 21

$r_1 = 21.541$   $d_1 = 0.81$   $n_{d1} = 1.94595$   $v_{d1} = 17.98$
$r_2 = 15.611$   $d_2 = 0.24$
$r_3 = 15.754$   $d_3 = 3.00$   $n_{d2} = 1.83481$   $v_{d2} = 42.71$
$r_4 = 86.752$   $d_4$ = variable
$r_5 = 689.472$   $d_5 = 0.82$   $n_{d3} = 1.88300$   $v_{d3} = 40.76$
$r_6 = 5.858$ (AS)   $d_6 = 2.64$
$r_7 = 187.160$   $d_7 = 1.74$   $n_{d4} = 2.10227$   $v_{d4} = 17.10$
$r_8 = -20.892$   $d_8 = 0.11$
$r_9 = -17.292$   $d_9 = 0.80$   $n_{d5} = 1.88300$   $v_{d5} = 40.76$
$r_{10} = -218.644$ (AS)   $d_{10}$ = variable
$r_{11} = \infty$ (S)   $d_{11} = 0.10$
$r_{12} = 5.786$ (AS)   $d_{12} = 2.70$   $n_{d6} = 1.58913$   $v_{d6} = 61.14$
$r_{13} = -10.671$ (AS)   $d_{13} = 0.10$
$r_{14} = 5.093$   $d_{14} = 1.45$   $n_{d7} = 1.59201$   $v_{d7} = 67.02$
$r_{15} = 13.011$   $d_{15} = 0.80$   $n_{d8} = 2.00069$   $v_{d8} = 25.46$
$r_{16} = 3.389$   $d_{16}$ = variable
$r_{17} = 26.835$ (AS)   $d_{17} = 2.07$   $n_{d9} = 1.74330$   $v_{d9} = 49.33$
$r_{18} = -20.472$   $d_{18}$ = variable
$r_{19} = \infty$   $d_{19} = 0.40$   $n_{d10} = 1.54771$   $v_{d10} = 62.84$
$r_{20} = \infty$   $d_{20} = 0.50$
$r_{21} = \infty$   $d_{21} = 0.50$   $n_{d11} = 1.51633$   $v_{d11} = 64.14$
$r_{22} = \infty$   $d_{22} = 0.35$
$r_{23} = \infty$ (I)

Aspherical coefficients

6th surface

K = 0.000
$A_4 = -8.01634 \times 10^{-6}$   $A_6 = 1.74636 \times 10^{-5}$   $A_8 = -9.27328 \times 10^{-7}$
$A_{10} = 8.36328 \times 10^{-9}$ -continued 10th surface K = 335.081
$A_4 = -2.97735 \times 10^{-4}$  $A_6 = 3.50224 \times 10^{-6}$  $A_8 = -1.54842 \times 10^{-7}$
$A_{10} = 0$ 12th surface K = -0.000
$A_4 = -9.17134 \times 10^{-4}$  $A_6 = 1.14404 \times 10^{-5}$  $A_8 = -5.40338 \times 10^{-6}$
$A_{10} = 5.59156 \times 10^{-7}$ 13th surface K = 0.000
$A_4 = 4.20917 \times 10^{-4}$  $A_6 = 2.06348 \times 10^{-5}$  $A_8 = -7.89133 \times 10^{-6}$
$A_{10} = 8.16743 \times 10^{-7}$ 17th surface K = 0.000
$A_4 = 4.79555 \times 10^{-5}$  $A_6 = 7.02757 \times 10^{-6}$  $A_8 = -2.32832 \times 10^{-7}$
$A_{10} = 3.87420 \times 10^{-9}$ -continued Zoom Data(∞)

|  | WE | ST | TE |
|---|---|---|---|
| f (mm) | 5.06 | 12.01 | 24.29 |
| $F_{NO}$ | 3.08 | 5.02 | 5.05 |
| 2ω (°) | 80.75 | 36.31 | 17.82 |
| $d_4$ | 0.74 | 0.99 | 13.33 |
| $d_{10}$ | 11.11 | 3.28 | 0.91 |
| $d_{16}$ | 2.72 | 9.93 | 10.06 |
| $d_{18}$ | 2.60 | 2.99 | 2.99 |

Figure 22A:
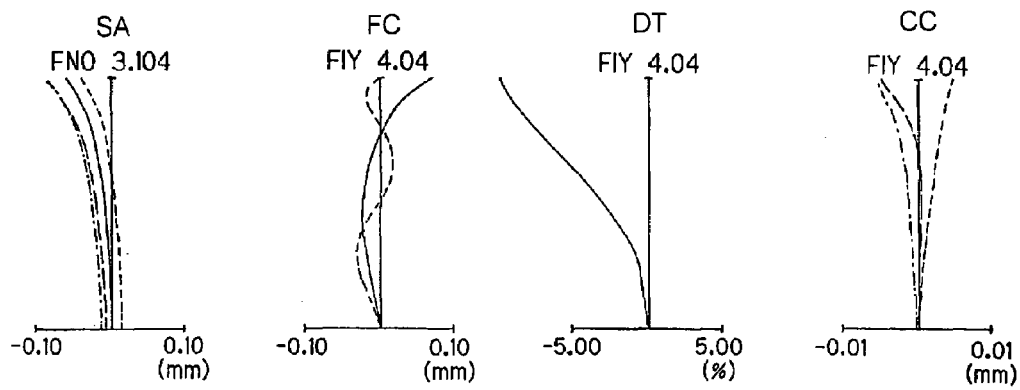
FIGS. 22A to 22C are aberration diagrams of Example 1 of the zoom lens system according to the present invention when focused at infinity, showing a spherical aberration (SA), an astigmatism (FC), a distortion (DT) and a chromatic aberration of magnification (CC)
Figure 22B:
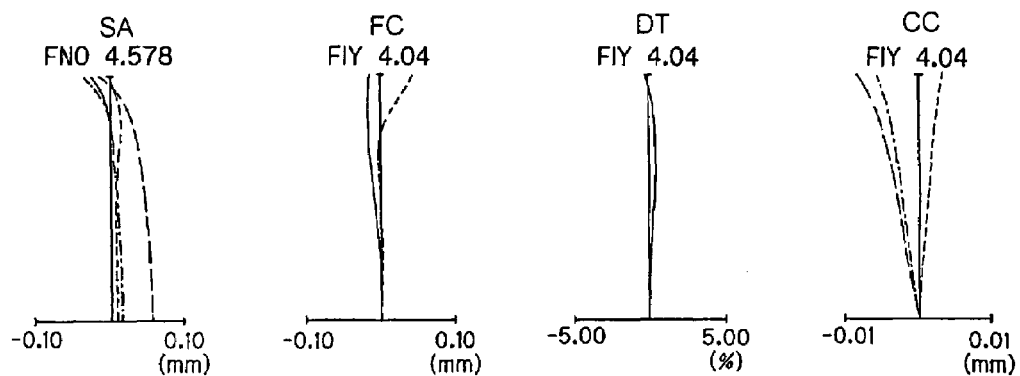
Figure 22C:
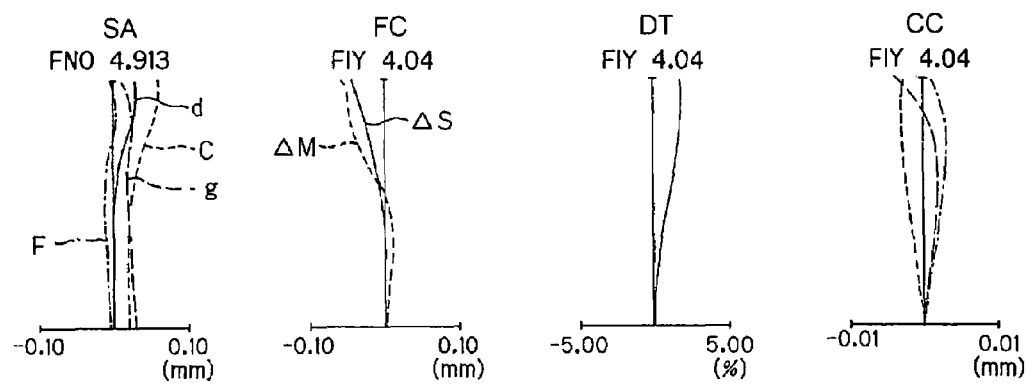
Figure 23A:
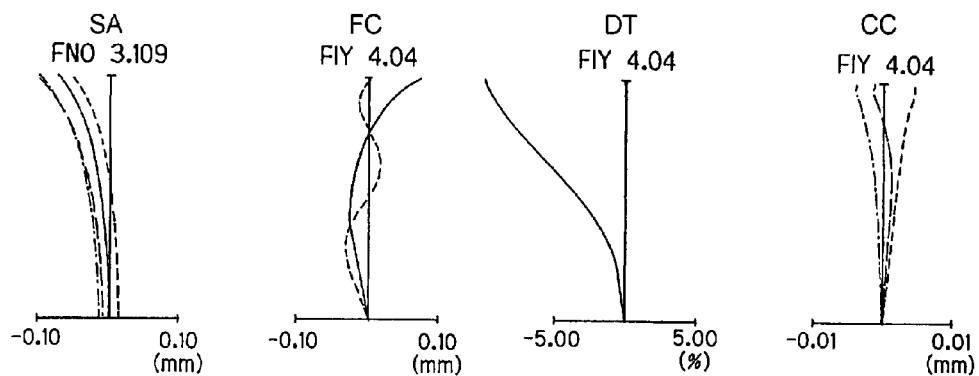
FIGS. 23A to 23C are aberration diagrams of Example 2 of the zoom lens system according to the present invention when focused at infinity, showing a spherical aberration (SA), an astigmatism (FC), a distortion (DT) and a chromatic aberration of magnification (CC)
Figure 23B:
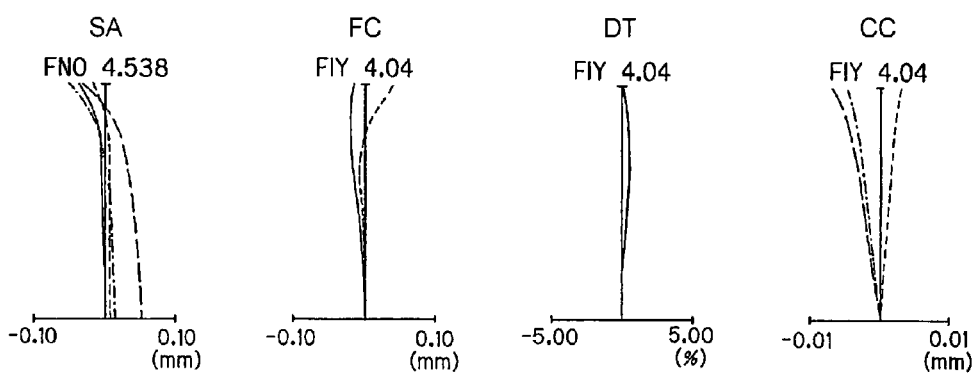
Figure 23C:
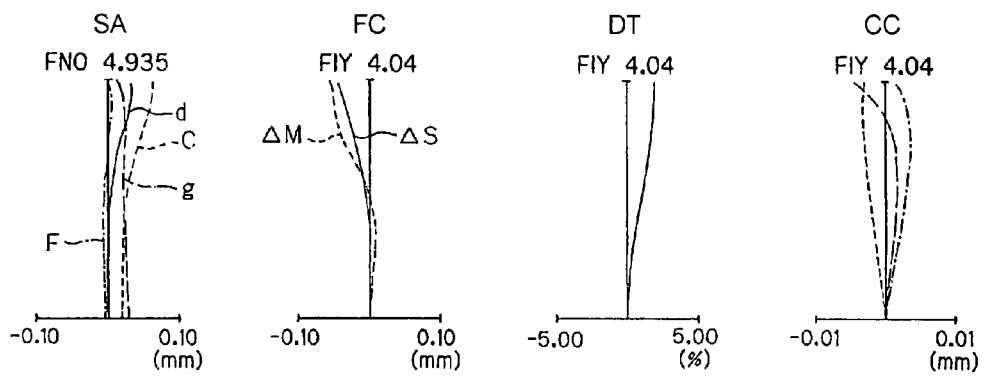
Figure 24A:
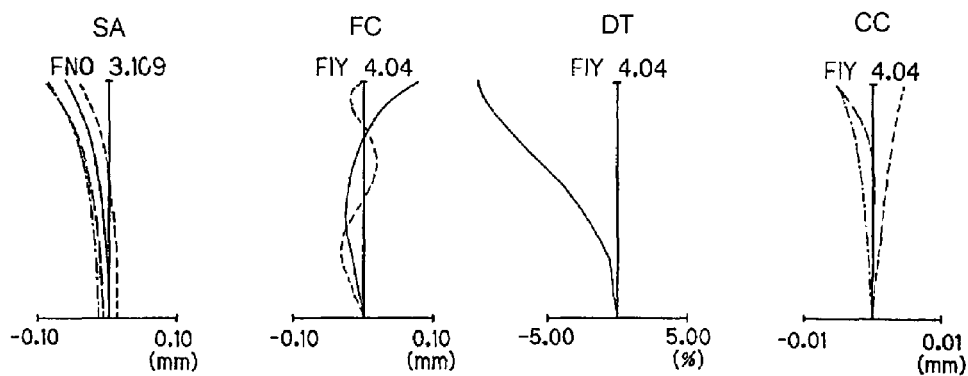
FIGS. 24A to 24C are aberration diagrams of Example 3 of the zoom lens system according to the present invention when focused at infinity, showing a spherical aberration (SA), an astigmatism (FC), a distortion (DT) and a chromatic aberration of magnification (CC)
Figure 24B:
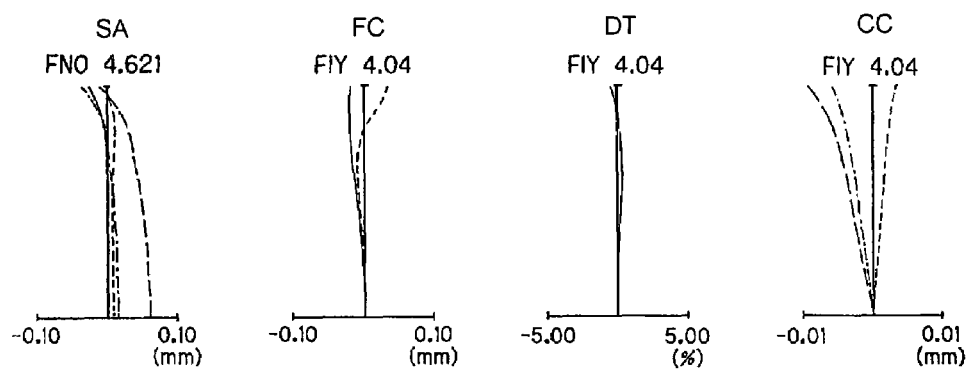
Figure 24C:
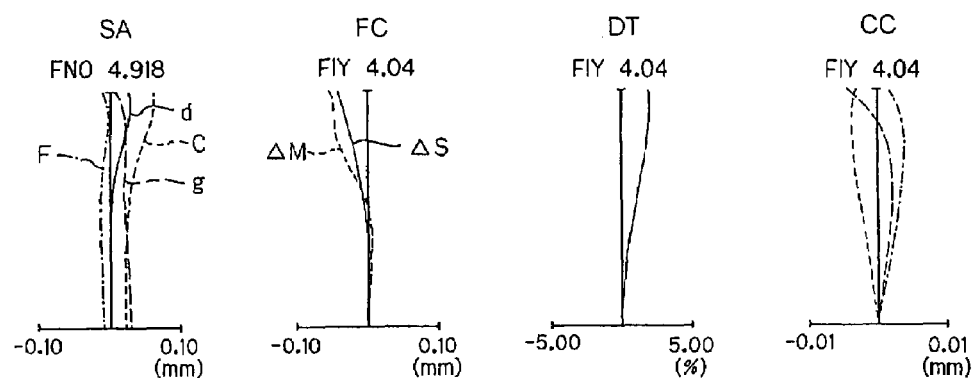
Figure 25A:
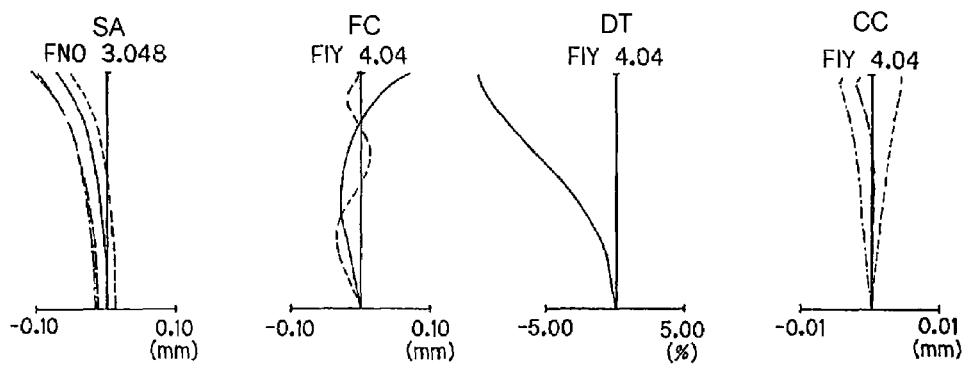
FIGS. 25A to 25C are aberration diagrams of Example 4 of the zoom lens system according to the present invention when focused at infinity, showing a spherical aberration (SA), an astigmatism (FC), a distortion (DT) and a chromatic aberration of magnification (CC)
Figure 25B:
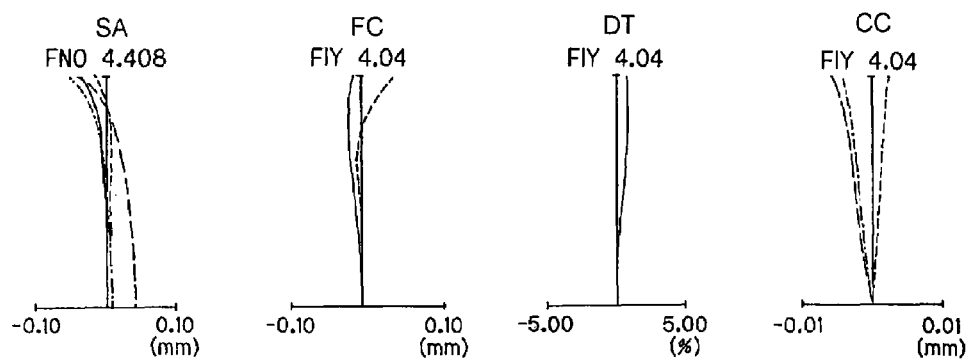
Figure 25C:
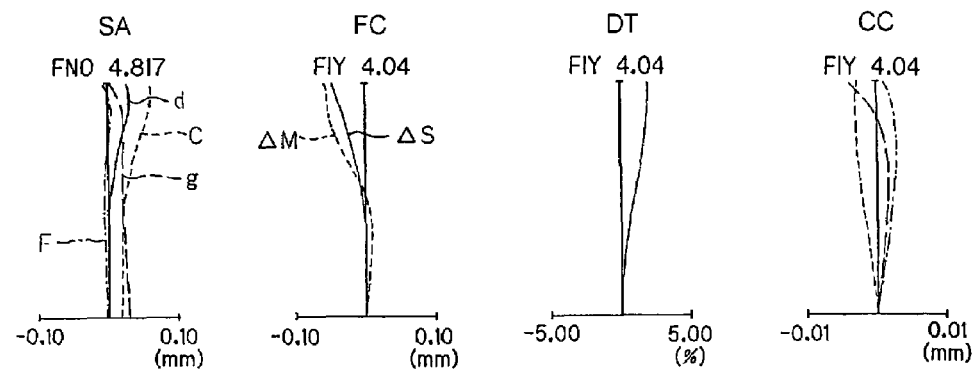
Figure 26A:
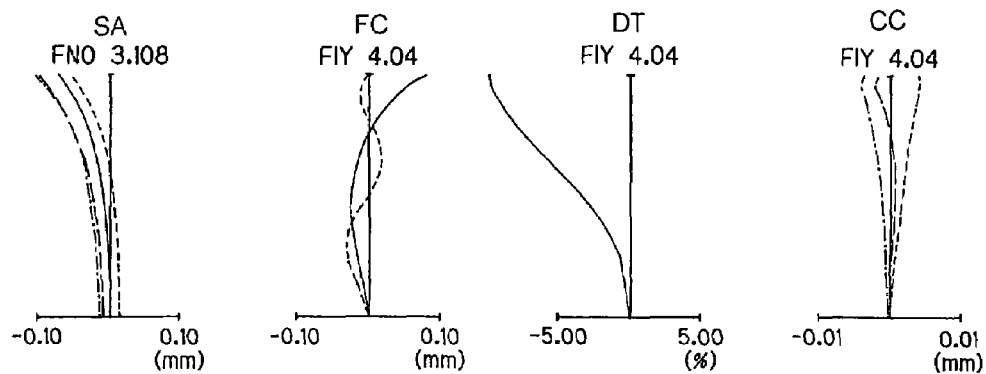
FIGS. 26A to 26C are aberration diagrams of Example 5 of the zoom lens system according to the present invention when focused at infinity, showing a spherical aberration (SA), an astigmatism (FC), a distortion (DT) and a chromatic aberration of magnification (CC)
Figure 26B:
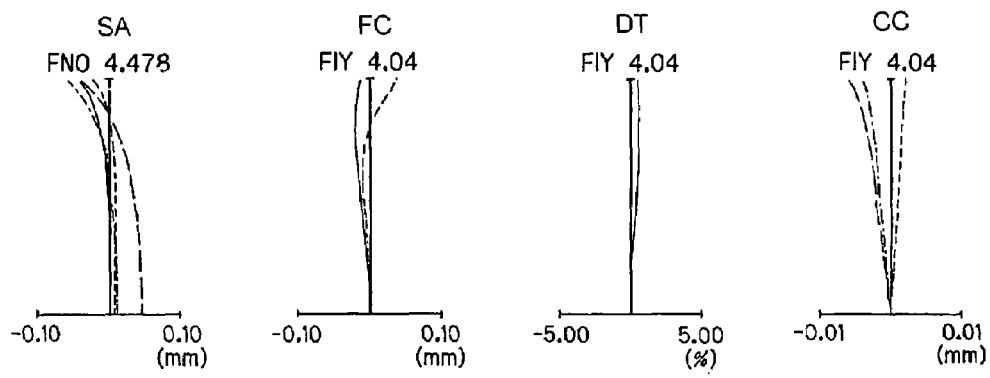
Figure 26C:
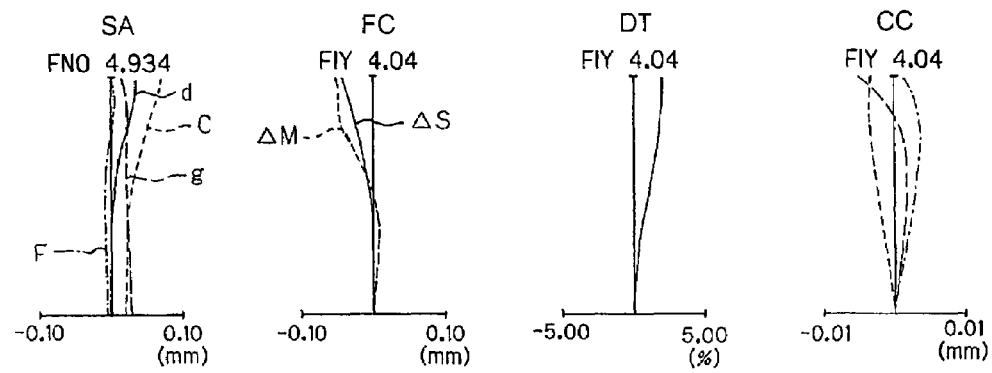
Figure 27A:
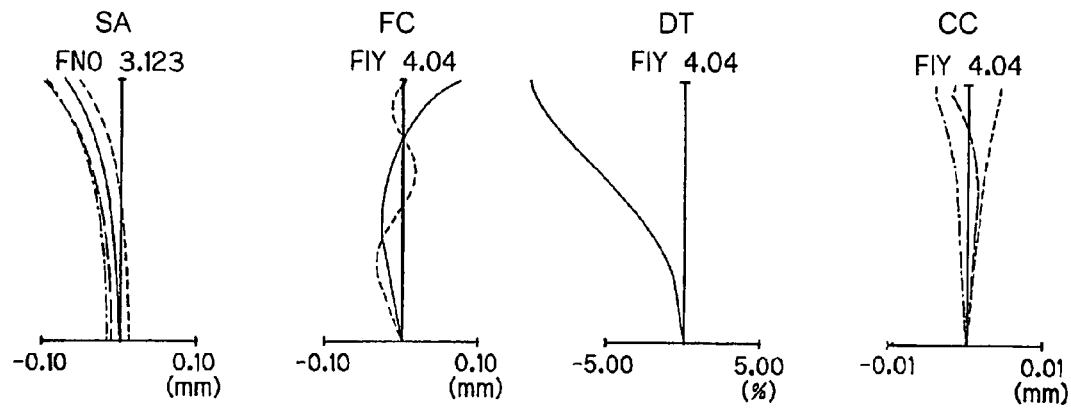
FIGS. 27A to 27C are aberration diagrams of Example 6 of the zoom lens system according to the present invention when focused at infinity, showing a spherical aberration (SA), an astigmatism (FC), a distortion (DT) and a chromatic aberration of magnification (CC)
Figure 27B:
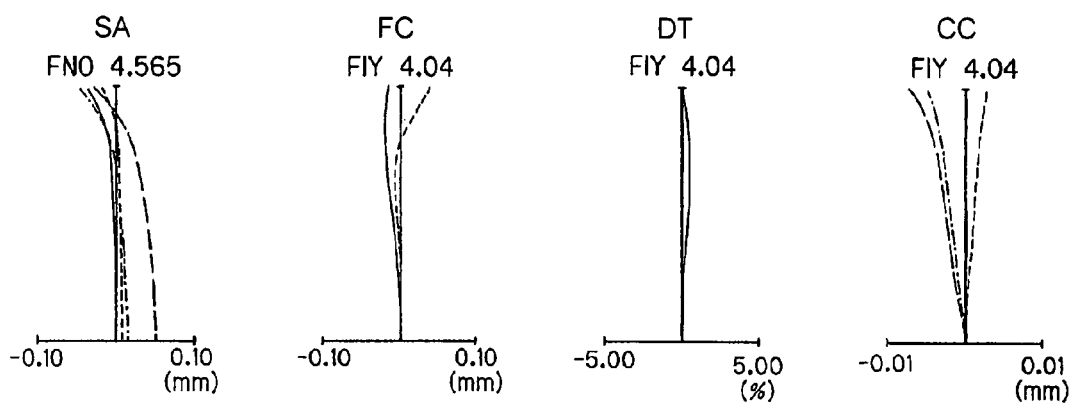
Figure 27C:
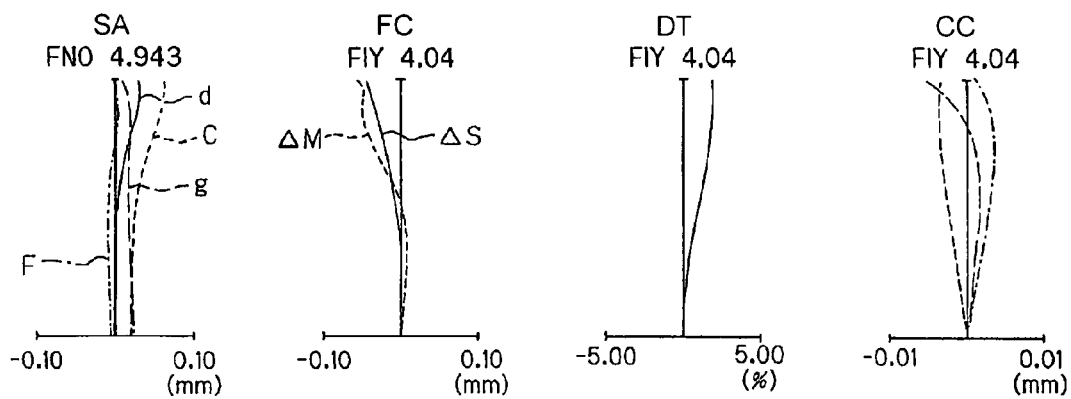
Figure 28A:
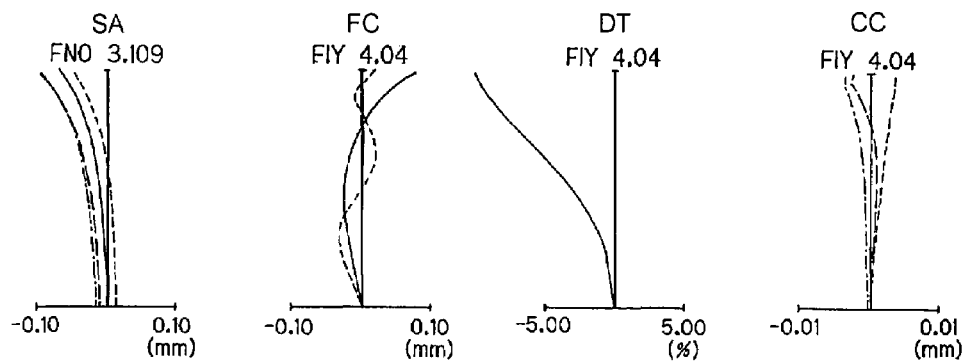
FIGS. 28A to 28C are aberration diagrams of Example 7 of the zoom lens system according to the present invention when focused at infinity, showing a spherical aberration (SA), an astigmatism (FC), a distortion (DT) and a chromatic aberration of magnification (CC)
Figure 28B:
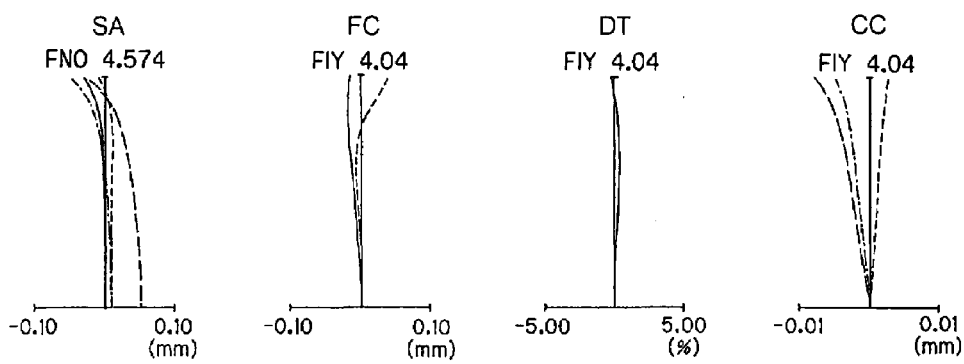
Figure 28C:
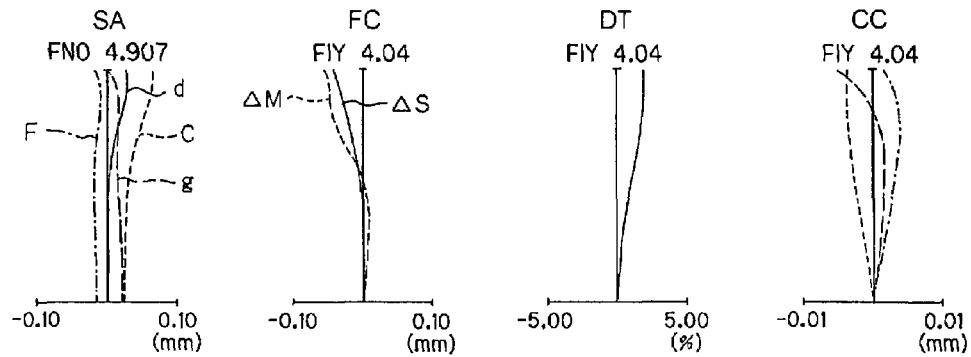
Figure 29A:
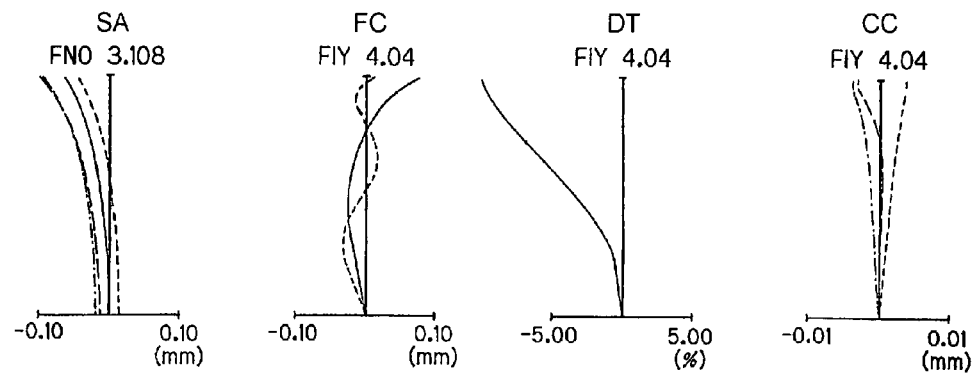
FIGS. 29A to 29C are aberration diagrams of Example 8 of the zoom lens system according to the present invention when focused at infinity, showing a spherical aberration (SA), an astigmatism (FC), a distortion (DT) and a chromatic aberration of magnification (CC)
Figure 29B:
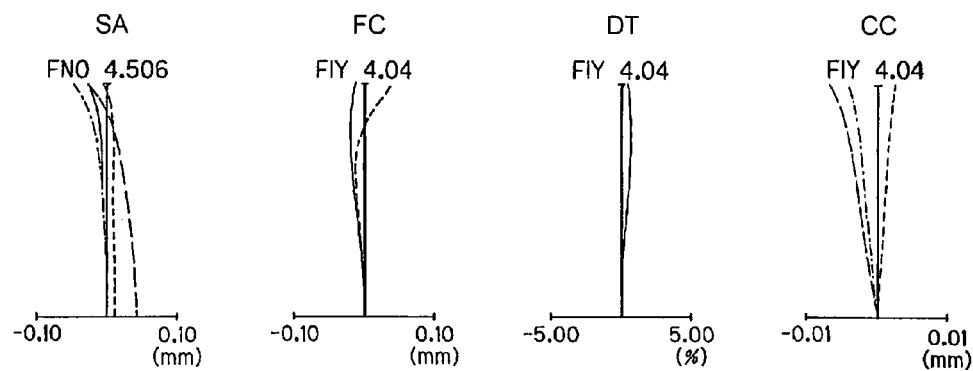
Figure 29C:
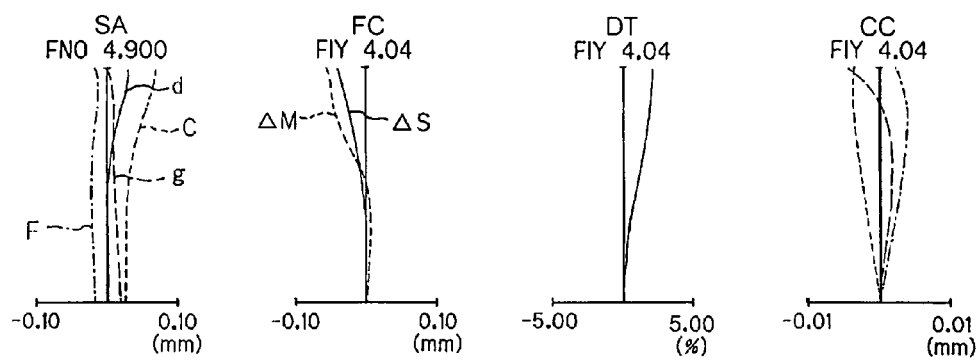
Figure 30A:
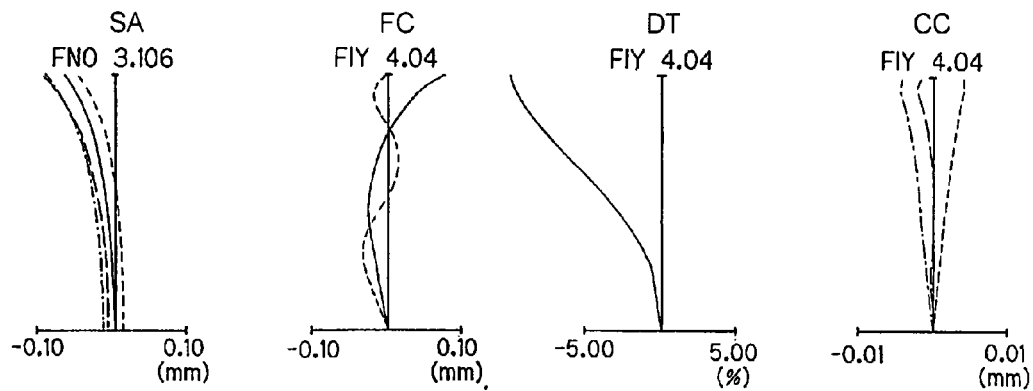
FIGS. 30A to 30C are aberration diagrams of Example 9 of the zoom lens system according to the present invention when focused at infinity, showing a spherical aberration (SA), an astigmatism (FC), a distortion (DT) and a chromatic aberration of magnification (CC)
Figure 30B:
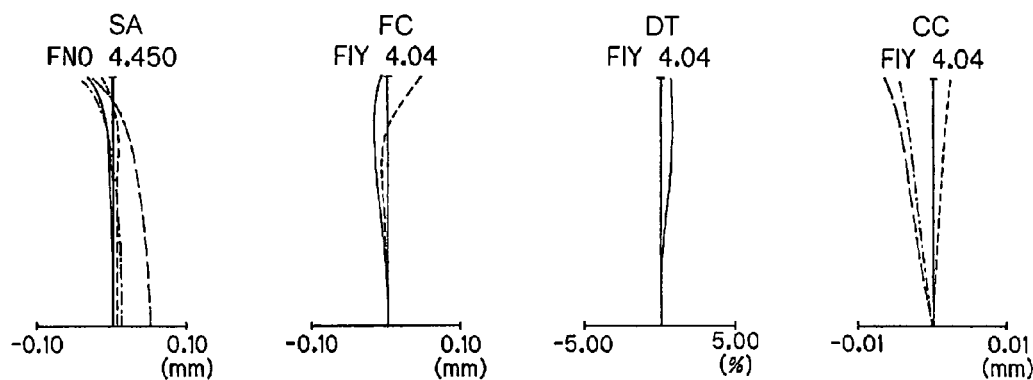
Figure 30C:
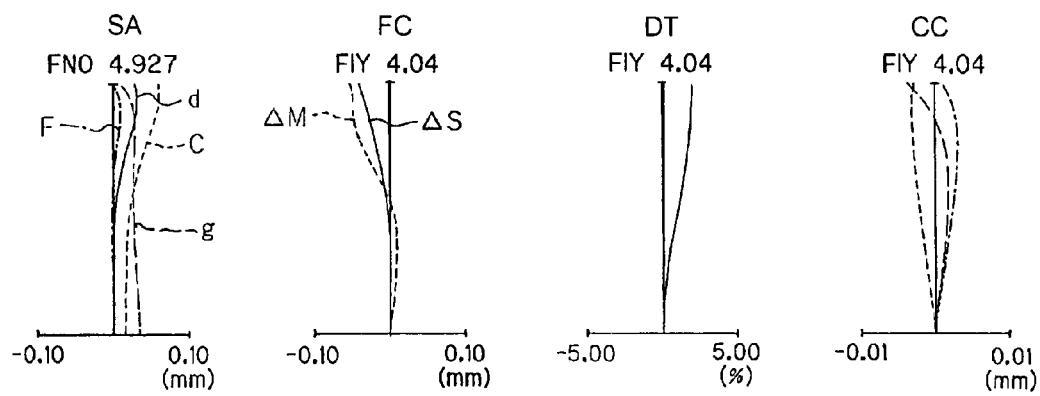
Figure 31A:
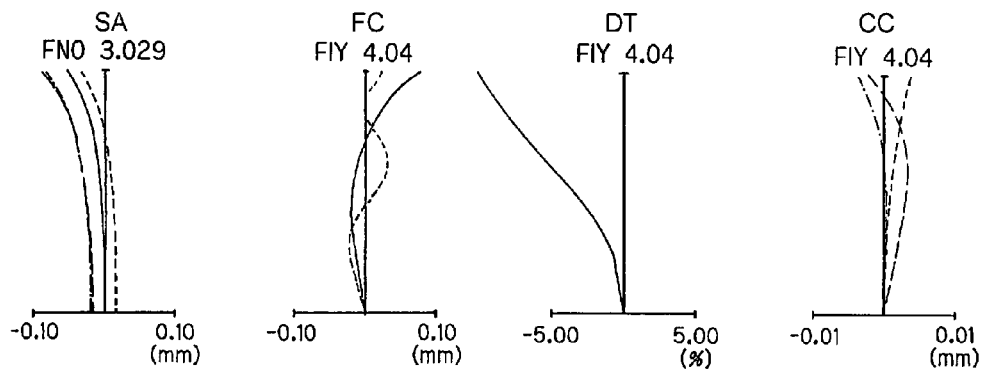
FIGS. 31A to 31C are aberration diagrams of Example 10 of the zoom lens system according to the present invention when focused at infinity, showing a spherical aberration (SA), an astigmatism (FC), a distortion (DT) and a chromatic aberration of magnification (CC)
Figure 31B:
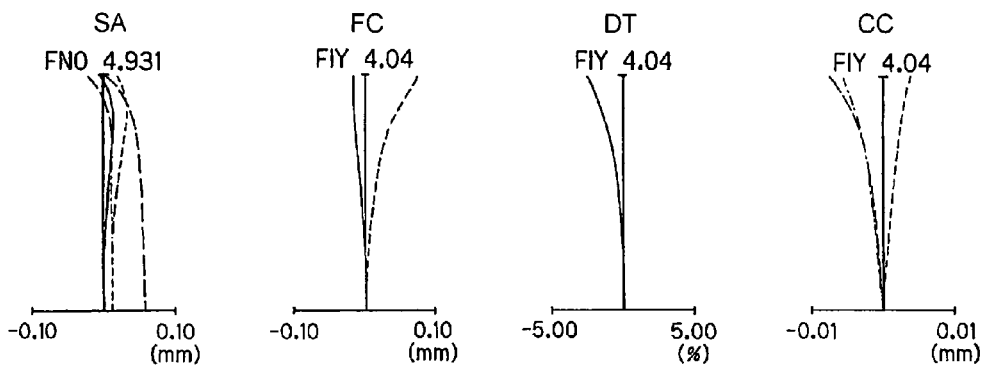
Figure 31C:
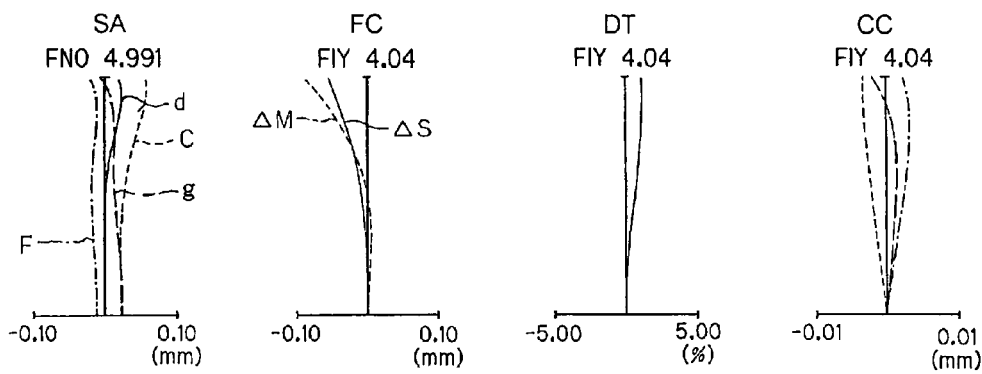
Figure 32A:
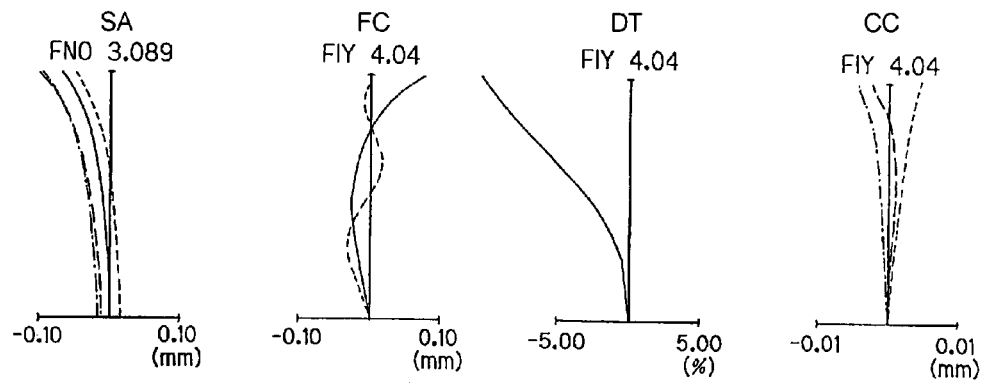
FIGS. 32A to 32C are aberration diagrams of Example 11 of the zoom lens system according to the present invention when focused at infinity, showing a spherical aberration (SA), an astigmatism (FC), a distortion (DT) and a chromatic aberration of magnification (CC)
Figure 32B:
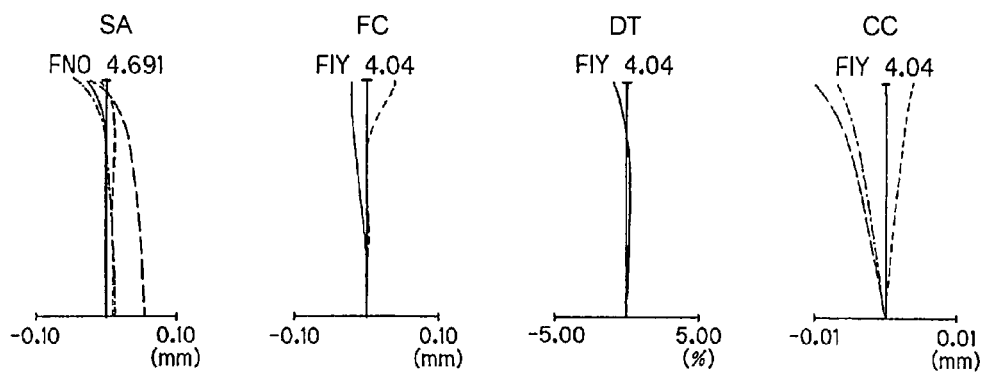
Figure 32C:
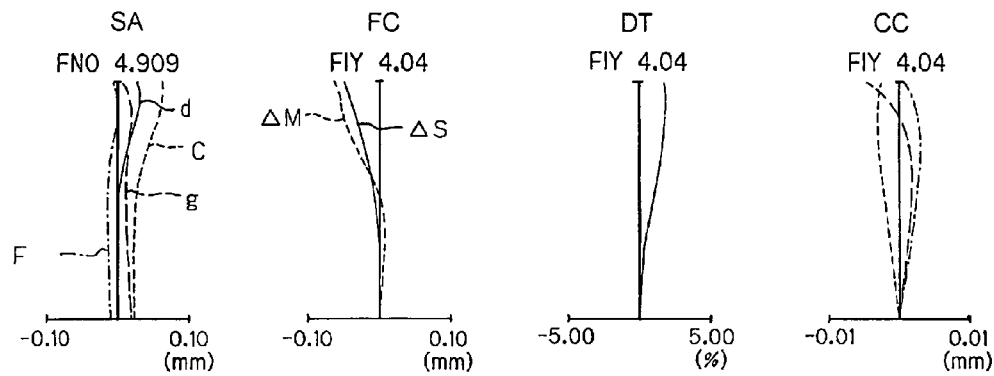
Figure 33A:
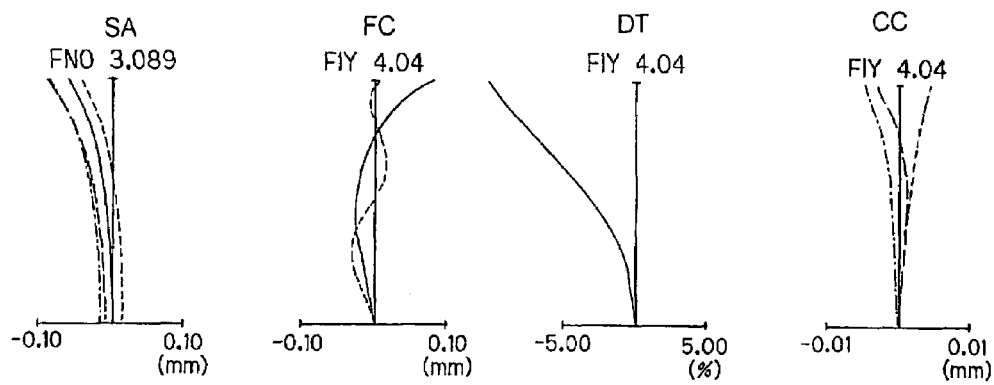
FIGS. 33A to 33C are aberration diagrams of Example 12 of the zoom lens system according to the present invention when focused at infinity, showing a spherical aberration (SA), an astigmatism (FC), a distortion (DT) and a chromatic aberration of magnification (CC)
Figure 33B:
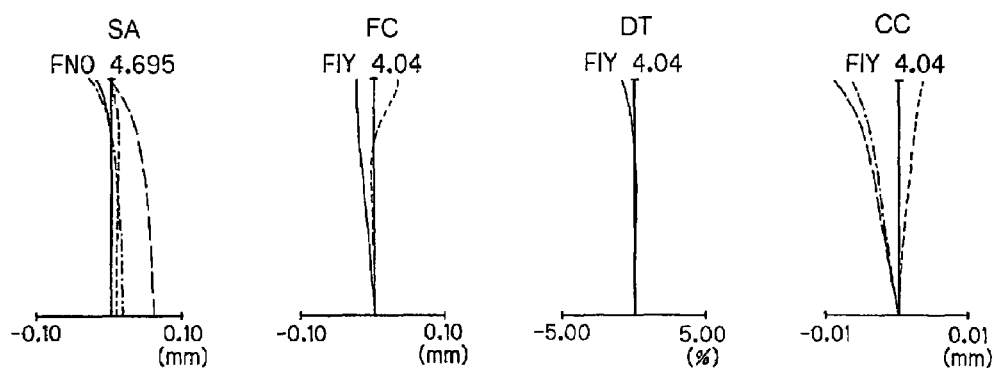
Figure 33C:
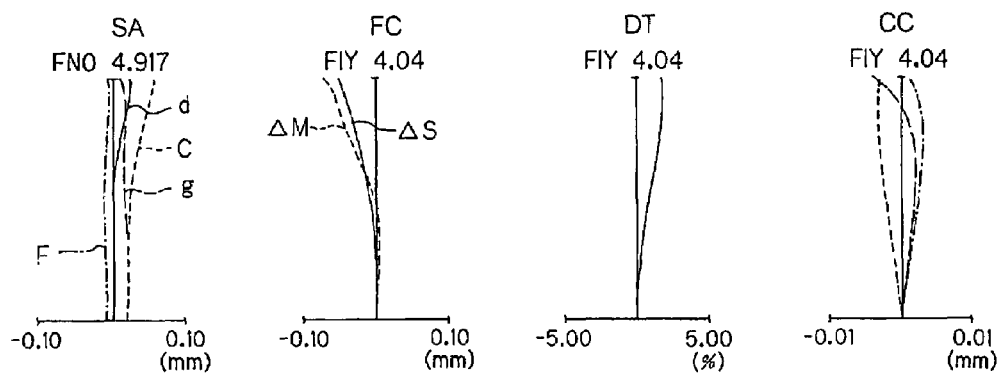
Figure 34A:
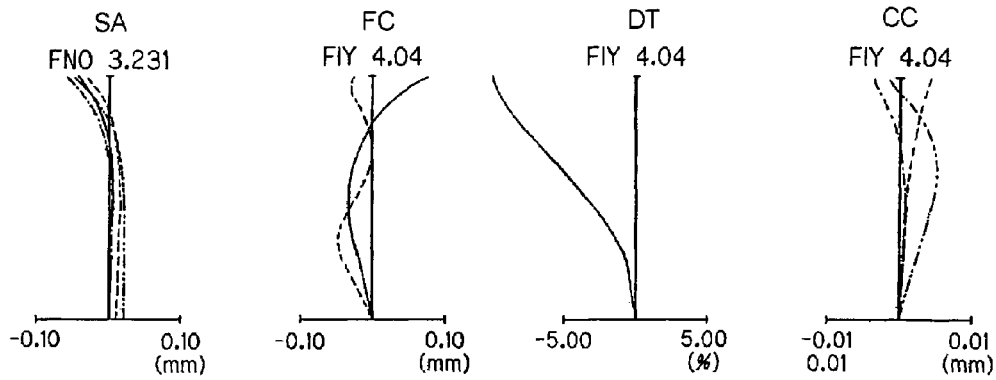
FIGS. 34A to 34C are aberration diagrams of Example 13 of the zoom lens system according to the present invention when focused at infinity, showing a spherical aberration (SA), an astigmatism (FC), a distortion (DT) and a chromatic aberration of magnification (CC)
Figure 34B:
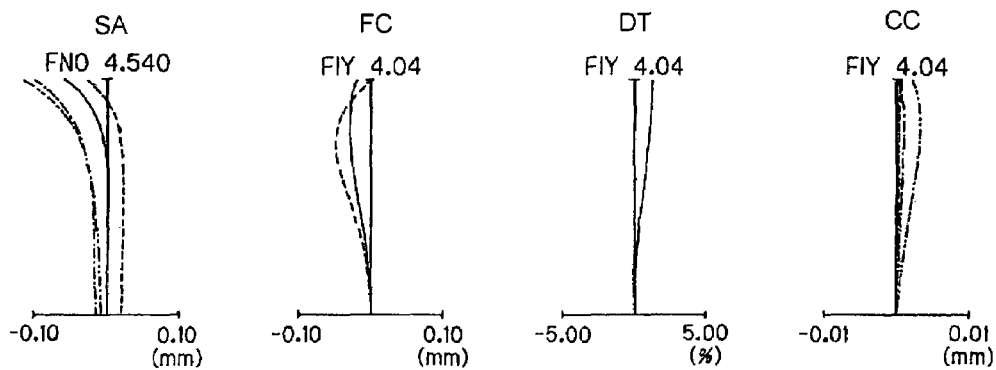
Figure 34C:
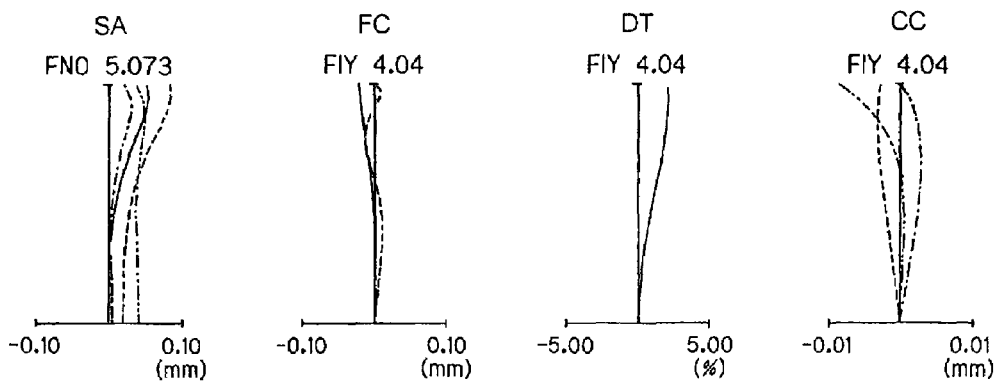
Figure 35A:
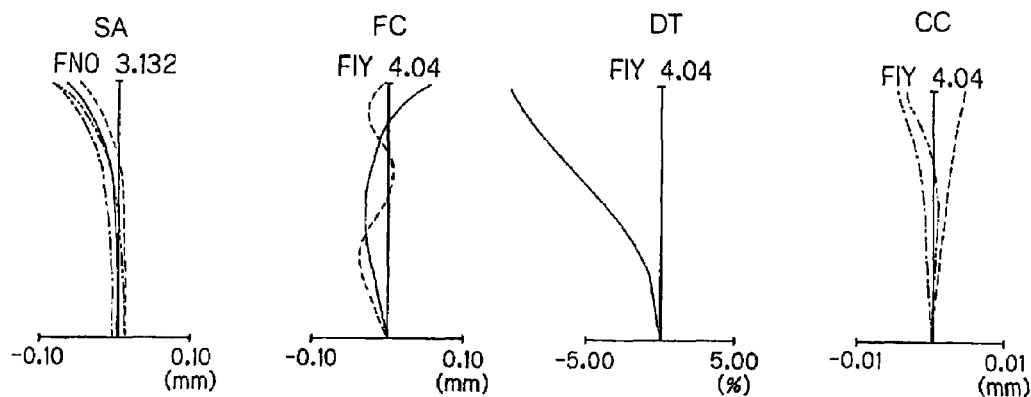
FIGS. 35A to 35C are aberration diagrams of Example 14 of the zoom lens system according to the present invention when focused at infinity, showing a spherical aberration (SA), an astigmatism (FC), a distortion (DT) and a chromatic aberration of magnification (CC)
Figure 35B:
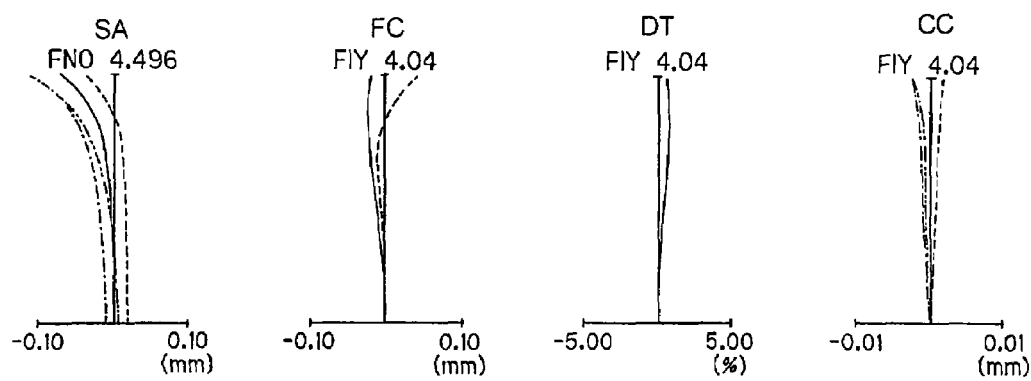
Figure 35C:
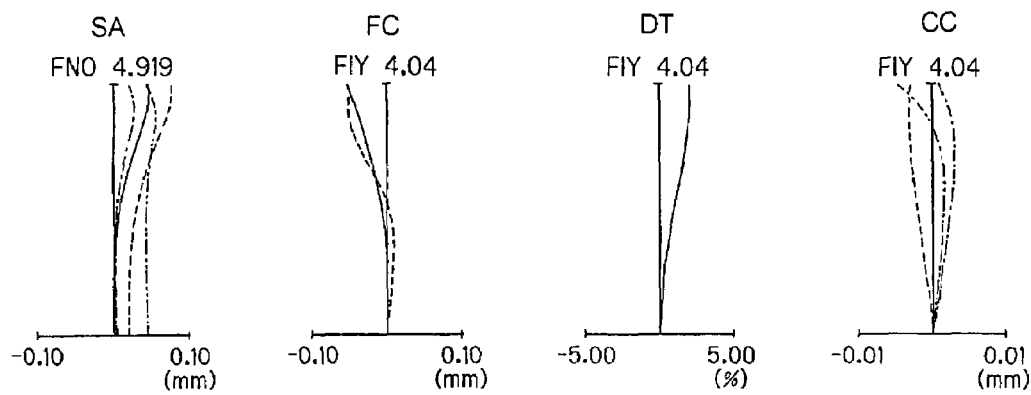
Figure 36A:
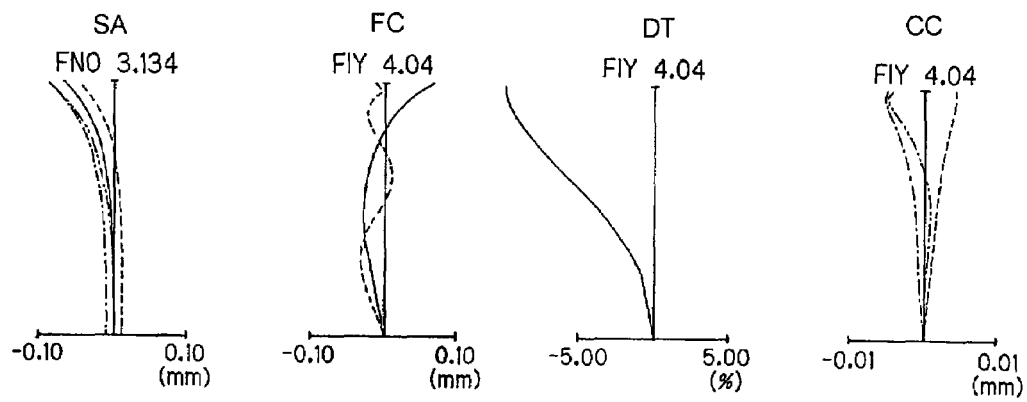
FIGS. 36A to 36C are aberration diagrams of Example 15 of the zoom lens system according to the present invention when focused at infinity, showing a spherical aberration (SA), an astigmatism (FC), a distortion (DT) and a chromatic aberration of magnification (CC)
Figure 36B:
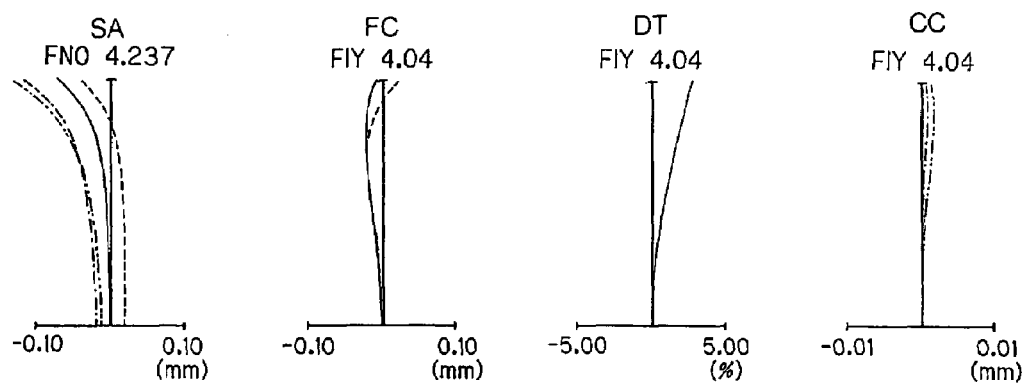
Figure 36C:
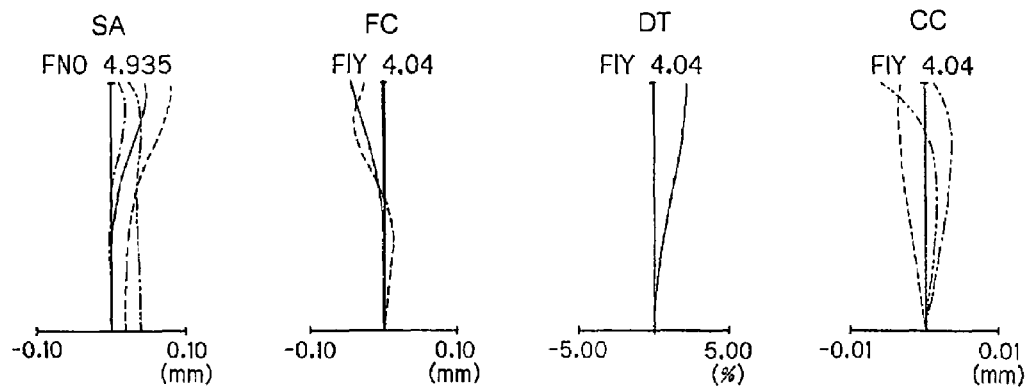
Figure 37A:
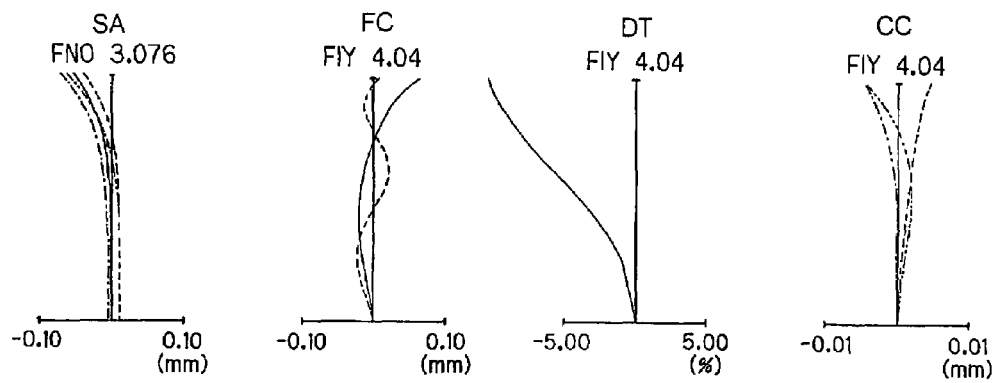
FIGS. 37A to 37C are aberration diagrams of Example 16 of the zoom lens system according to the present invention when focused at infinity, showing a spherical aberration (SA), an astigmatism (FC), a distortion (DT) and a chromatic aberration of magnification (CC)
Figure 37B:
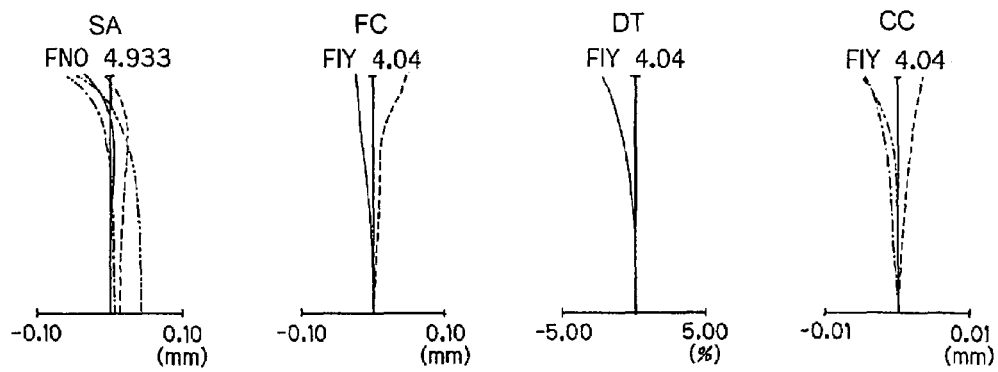
Figure 37C:
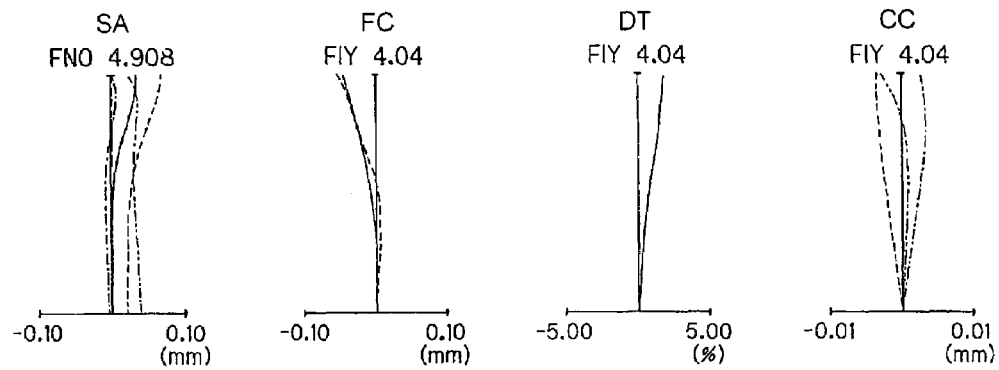
Figure 38A:
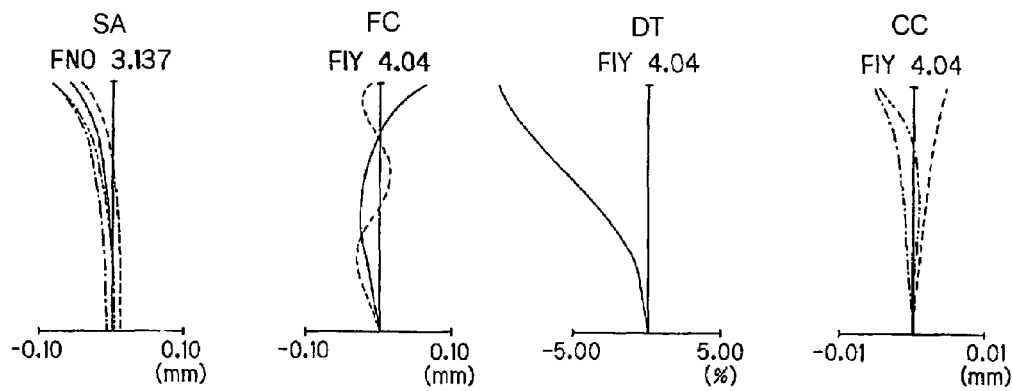
FIGS. 38A to 38C are aberration diagrams of Example 17 of the zoom lens system according to the present invention when focused at infinity, showing a spherical aberration (SA), an astigmatism (FC), a distortion (DT) and a chromatic aberration of magnification (CC)
Figure 38B:
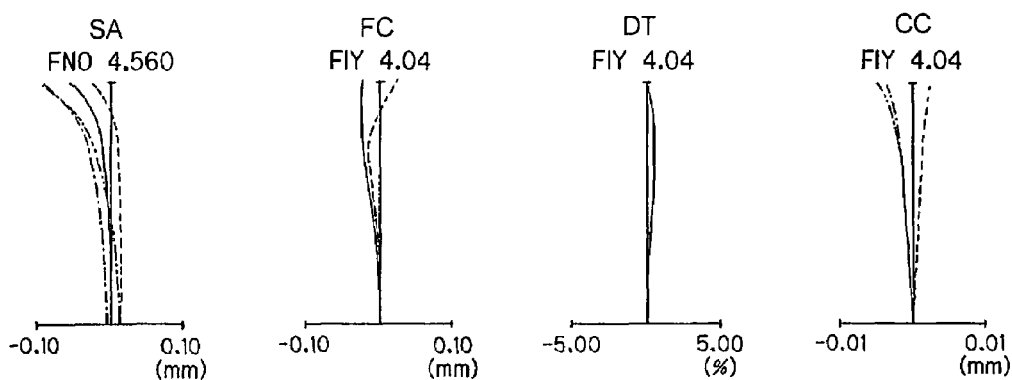
Figure 38C:
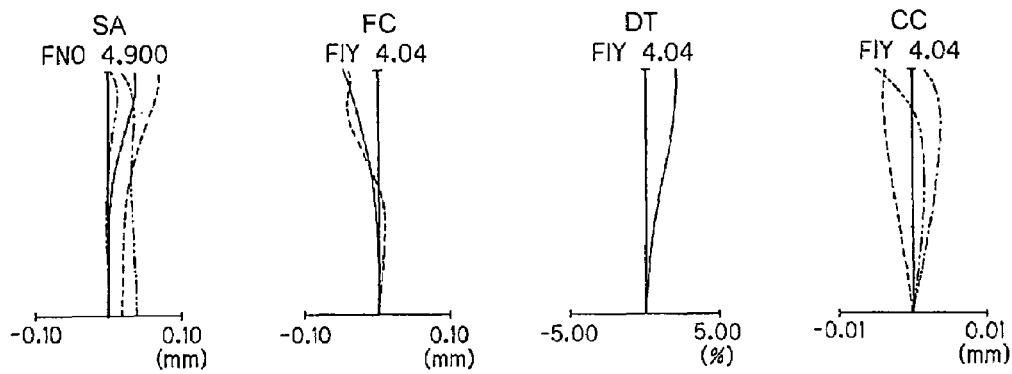
Figure 39A:
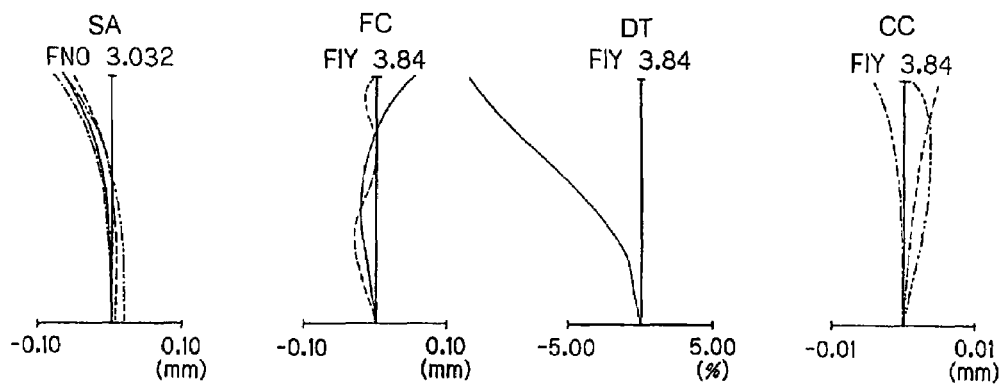
FIGS. 39A to 39C are aberration diagrams of Example 18 of the zoom lens system according to the present invention when focused at infinity, showing a spherical aberration (SA), an astigmatism (FC), a distortion (DT) and a chromatic aberration of magnification (CC)
Figure 39B:
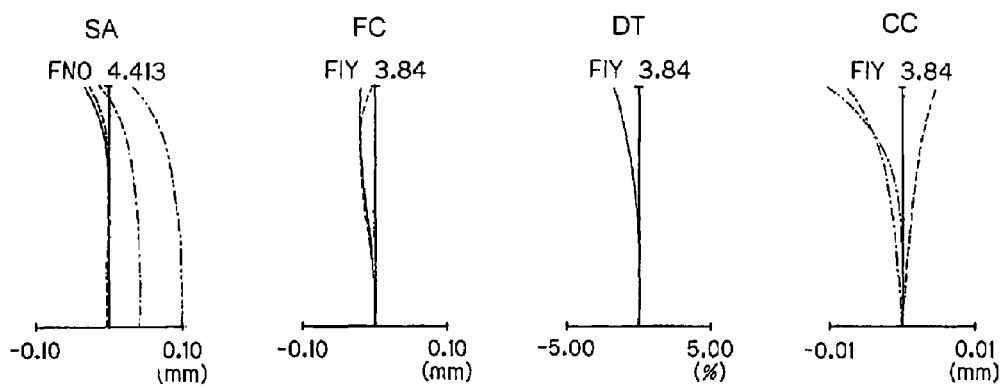
Figure 39C:
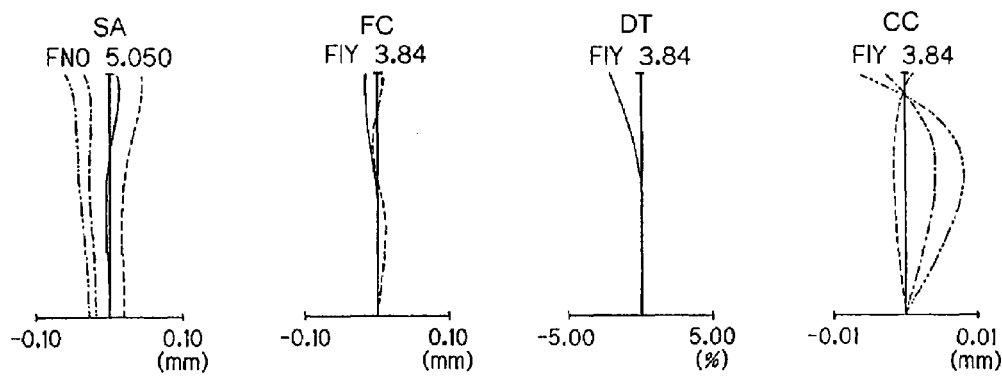
Figure 40A:
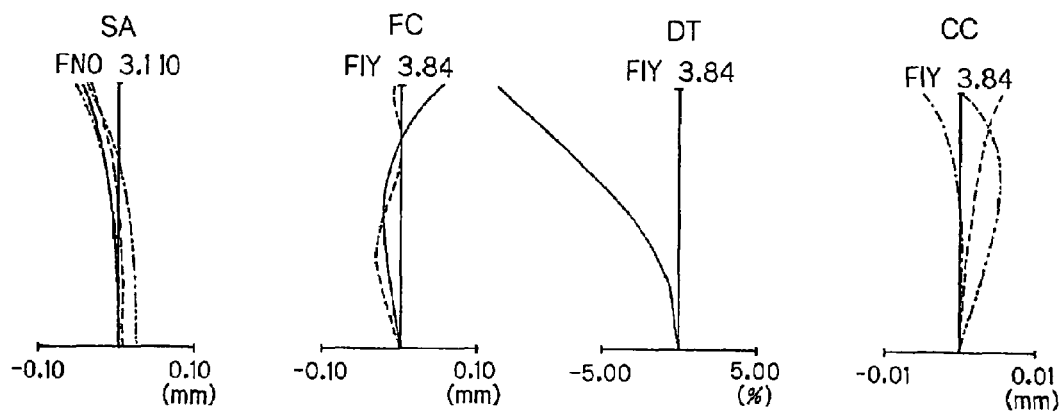
FIGS. 40A to 40C are aberration diagrams of Example 19 of the zoom lens system according to the present invention when focused at infinity, showing a spherical aberration (SA), an astigmatism (FC), a distortion (DT) and a chromatic aberration of magnification (CC)
Figure 40B:
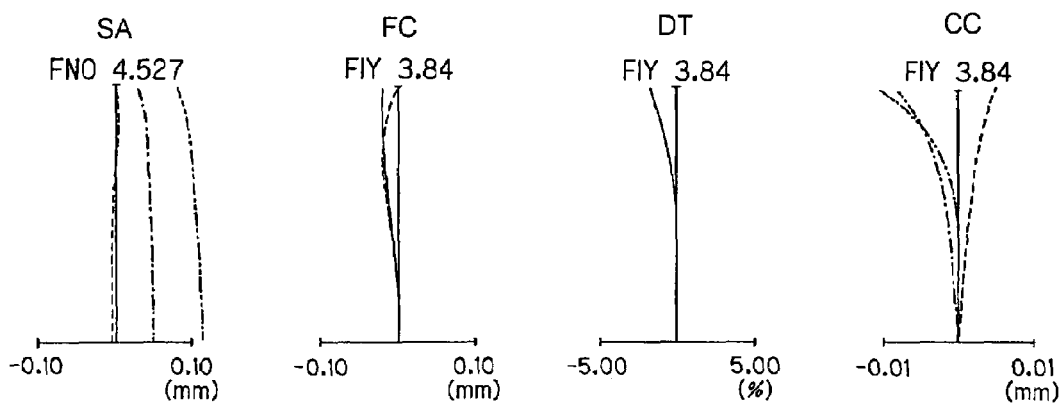
Figure 40C:
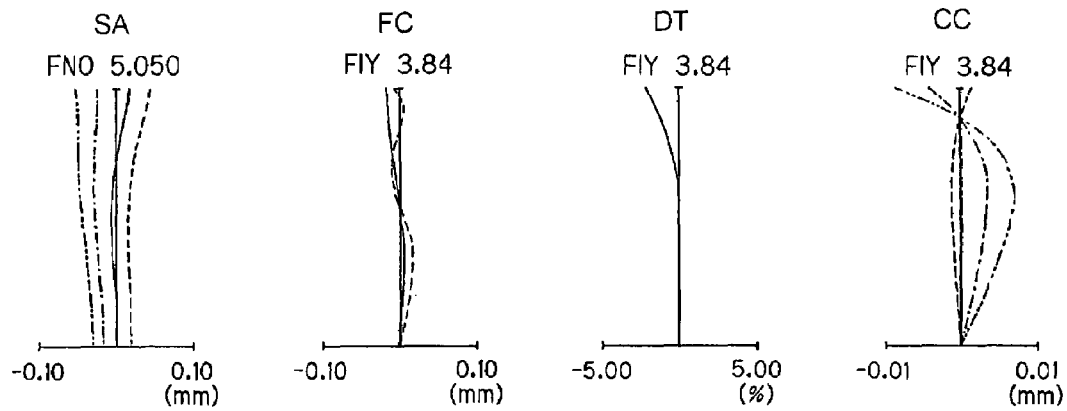
Figure 41A:
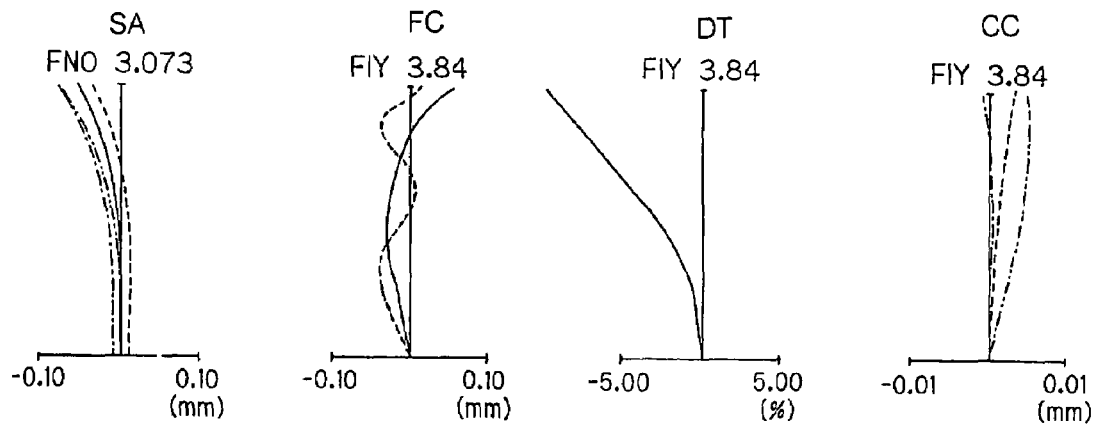
FIGS. 41A to 41C are aberration diagrams of Example 20 of the zoom lens system according to the present invention when focused at infinity, showing a spherical aberration (SA), an astigmatism (FC), a distortion (DT) and a chromatic aberration of magnification (CC)
Figure 41B:
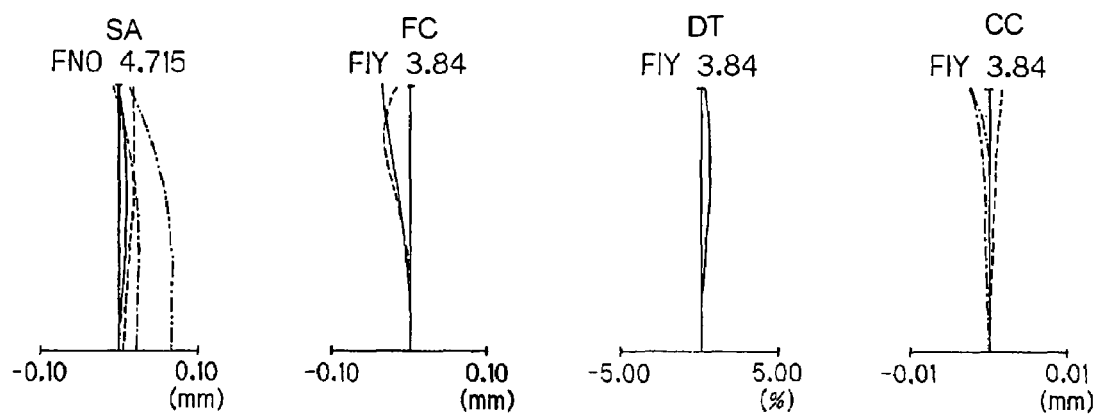
Figure 41C:
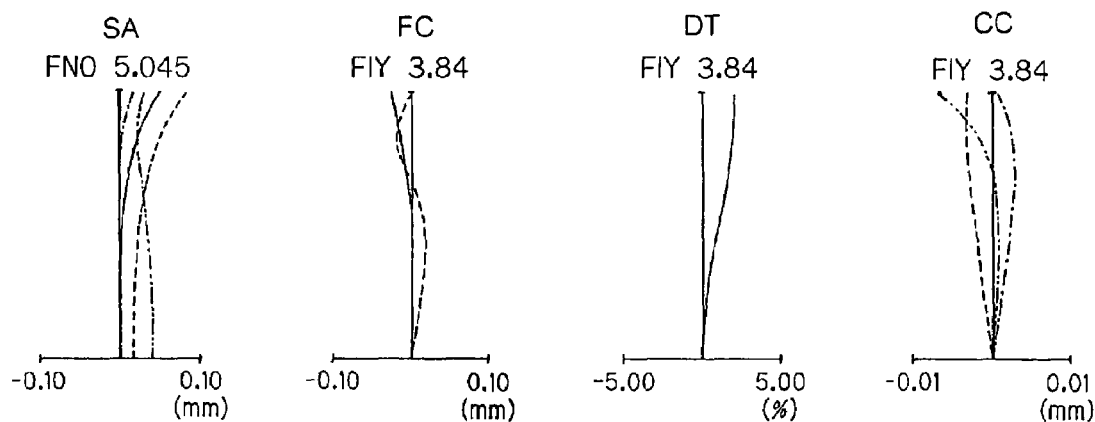
Figure 42A:
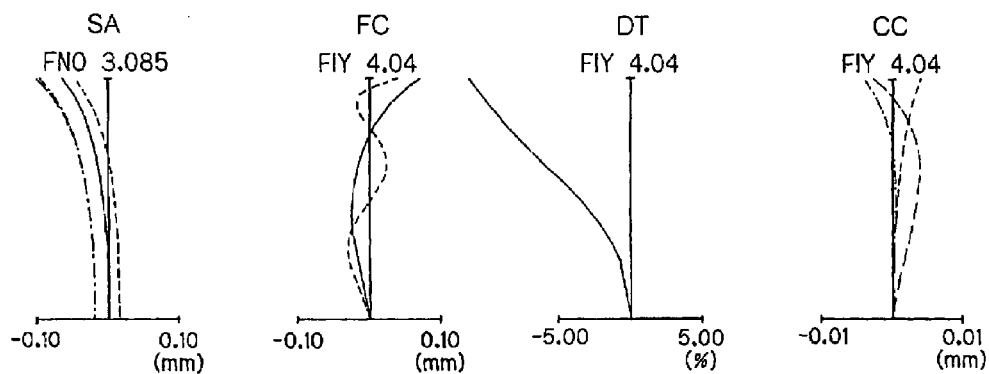
FIGS. 42A to 42C are aberration diagrams of Example 21 of the zoom lens system according to the present invention when focused at infinity, showing a spherical aberration (SA), an astigmatism (FC), a distortion (DT) and a chromatic aberration of magnification (CC)
Figure 42B:
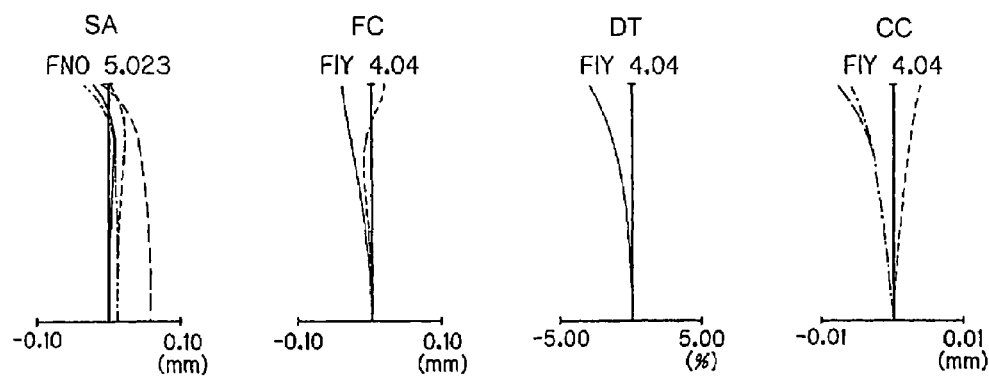
Figure 42C:
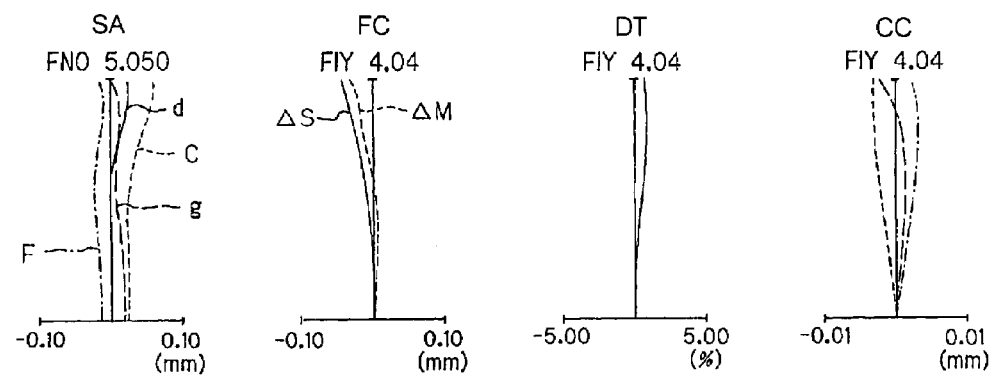

FIGS. 22 to 42 are aberration diagrams of Examples 1 to 21 when focused at infinity, in which FIGS. 22A, 23A, 24A, . . . show aberrations in the wide-angle end, FIGS. 22B, 23B, 24B, . . . show the aberrations in the intermediate position, and FIGS. 22C, 23C, 24C, . . . show the aberrations in the telephoto end. In these drawings, SA denotes a spherical aberration, FC denotes an astigmatism, DT denotes a distortion and CC denotes a chromatic aberration of magnification. "FIY" is a maximum image height.

Next, values of the conditions of the examples will be described.

TABLE 1-1

| | Example | | | | | | |
|---|---|---|---|---|---|---|---|
| | 1 | 2 | 3 | 4 | 5 | 6 | 7 |
| (1A) | −0.794 | −0.789 | −0.798 | −0.788 | −0.804 | −0.823 | −0.822 |
| (2A) | 0.815 | 0.813 | 0.813 | 0.769 | 0.756 | 0.788 | 0.806 |
| (3A) | 0.017 | 0.056 | −0.019 | 0.030 | 0.008 | 0.032 | 0.044 |
| (4A) | 2.0017 | 1.94595 | 2.0017 | 1.92286 | 1.92286 | 1.94595 | 2.10226 |
| (5A) | 20.6 | 18.0 | 20.6 | 18.9 | 18.9 | 18.0 | 17.1 |
| (6A) | 1.070 | 1.270 | 0.930 | 1.132 | 1.037 | 1.142 | 1.240 |
| (7A) | 1.8830 | 1.8348 | 1.8830 | 1.8348 | 1.8348 | 1.8830 | 1.8830 |
| (8A) | 40.8 | 42.7 | 40.8 | 42.7 | 42.7 | 40.8 | 40.8 |
| (9A) | 1.8160 | 1.8348 | 1.8348 | 1.8348 | 1.8348 | 1.8830 | 1.8830 |
| (10A) | 46.6 | 42.7 | 42.7 | 42.7 | 42.7 | 40.8 | 40.8 |
| (11A) | −1.505 | −1.976 | −1.370 | −1.738 | −1.545 | −2.038 | −1.967 |
| (12A) | 2.001 | 2.553 | 1.885 | 2.416 | 2.341 | 2.334 | 2.477 |
| (13A) | 0.029 | 0.030 | 0.027 | 0.052 | 0.054 | 0.036 | 0.028 |
| (13B) | −0.007 | −0.008 | −0.006 | −0.004 | −0.001 | −0.008 | −0.008 |
| (14A) | −0.025 | −0.021 | −0.025 | −0.025 | −0.025 | −0.019 | −0.019 |
| (15A) | 0.008 | 0.005 | 0.005 | 0.009 | 0.006 | 0.006 | 0.006 |
| (16A) | 0.310 | 0.311 | 0.312 | 0.311 | 0.314 | 0.309 | 0.309 |
| (17A) | 1.383 | 1.383 | 1.380 | 1.385 | 1.385 | 1.367 | 1.367 |
| (18A) | 0.370 | 0.372 | 0.371 | 0.371 | 0.371 | 0.371 | 0.370 |
| (19A) | 0.636 | 0.646 | 0.641 | 0.640 | 0.643 | 0.645 | 0.640 |
| (20A) | 0.759 | 0.759 | 0.759 | 0.759 | 0.759 | 0.759 | 0.759 |
| (21A) | 4.800 | 4.800 | 4.800 | 4.799 | 4.800 | 4.801 | 4.800 |
| (1B) | 0.128 | 0.131 | 0.129 | 0.165 | 0.173 | 0.144 | 0.130 |
| (2B) | −0.973 | −0.916 | −1.030 | −0.954 | −0.986 | −0.949 | −0.931 |
| (3B) | 0.142 | 0.144 | 0.142 | 0.168 | 0.171 | 0.153 | 0.142 |

TABLE 1-2

| | Example | | | | | | |
|---|---|---|---|---|---|---|---|
| | 8 | 9 | 10 | 11 | 12 | 13 | 14 |
| (1A) | −0.807 | −0.773 | −0.787 | −0.809 | −0.819 | −0.794 | −0.836 |
| (2A) | 0.826 | 0.778 | 0.980 | 0.859 | 0.833 | 0.760 | 0.835 |
| (3A) | 0.032 | 0.043 | −0.070 | 0.015 | 0.013 | 0.000 | 0.073 |
| (4A) | 2.10226 | 1.92286 | 2.10226 | 2.0017 | 2.0017 | 1.94595 | 2.0017 |
| (5A) | 17.1 | 18.9 | 17.1 | 20.6 | 20.6 | 17.98 | 20.64 |
| (6A) | 1.178 | 1.175 | 0.647 | 1.057 | 1.052 | 1.000 | 1.303 |
| (7A) | 1.8830 | 1.8061 | 1.8830 | 1.8830 | 1.8830 | 1.8061 | 1.8830 |
| (8A) | 40.8 | | 40.8 | 40.8 | 40.8 | 40.92 | 40.76 |
| (9A) | 1.8830 | 1.8061 | 1.8830 | 1.8160 | 1.8160 | 1.8061 | 1.816 |
| (10A) | 40.8 | 40.9 | 40.8 | 46.6 | 46.6 | 40.92 | 46.62 |

TABLE 1-2-continued

| | Example | | | | | | |
|---|---|---|---|---|---|---|---|
| | 8 | 9 | 10 | 11 | 12 | 13 | 14 |
| (11A) | −1.545 | −1.491 | −1.195 | −1.775 | −1.621 | −1.193 | −1.806 |
| (12A) | 2.548 | 2.215 | 2.307 | 1.953 | 1.936 | 2.195 | 2.038 |
| (13A) | 0.035 | 0.053 | 0.027 | 0.013 | 0.020 | 0.047 | 0.033 |
| (13B) | 0.001 | −0.001 | −0.001 | −0.013 | −0.020 | −0.010 | −0.008 |
| (14A) | −0.022 | −0.028 | −0.022 | −0.026 | −0.019 | −0.021 | −0.022 |
| (15A) | 0.006 | 0.008 | 0.000 | 0.006 | 0.006 | 0.008 | 0.006 |
| (16A) | 0.309 | 0.312 | 0.312 | 0.306 | 0.307 | 0.305 | 0.296 |
| (17A) | 1.371 | 1.386 | 1.501 | 1.393 | 1.396 | 1.394 | 1.376 |
| (18A) | 0.370 | 0.372 | 0.356 | 0.366 | 0.366 | 0.264 | 0.270 |
| (19A) | 0.637 | 0.642 | 0.657 | 0.631 | 0.632 | — | — |
| (20A) | 0.759 | 0.759 | 0.759 | 0.759 | 0.759 | 0.759 | 0.759 |
| (21A) | 4.799 | 4.799 | 4.798 | 4.800 | 4.800 | 4.800 | 4.800 |
| (1B) | 0.118 | 0.162 | 0.013 | 0.094 | 0.111 | 0.172 | 0.108 |
| (2B) | −0.950 | −0.936 | −1.116 | −0.977 | −0.978 | −1.000 | −0.884 |
| (3B) | 0.134 | 0.166 | 0.100 | 0.117 | 0.134 | 0.174 | 0.130 |

TABLE 1-3

| | Example | | | | | | |
|---|---|---|---|---|---|---|---|
| | 15 | 16 | 17 | 18 | 19 | 20 | 21 |
| (1A) | −0.836 | −0.836 | −0.836 | −0.836 | −0.836 | −0.836 | −0.777 |
| (2A) | 0.835 | 0.835 | 0.835 | 0.835 | 0.835 | 0.835 | 1.017 |
| (3A) | 0.073 | 0.073 | 0.073 | 0.073 | 0.073 | 0.073 | −0.040 |
| (4A) | 1.92286 | 2.10226 | 1.94595 | 1.94595 | 1.94595 | 1.94595 | 2.10226 |
| (5A) | 18.90 | 17.10 | 17.98 | 17.98 | 17.98 | 17.98 | 17.1 |
| (6A) | 1.081 | 1.165 | 1.336 | 0.277 | 0.151 | 0.345 | 0.799 |
| (7A) | 1.83481 | 1.883 | 1.83481 | 1.883 | 1.883 | 1.8061 | 1.8830 |
| (8A) | 42.71 | 40.76 | 42.71 | 40.76 | 40.76 | 40.92 | 40.8 |
| (9A) | 1.83481 | 1.883 | 1.83481 | 1.8830 | 1.8830 | 1.8061 | 1.8830 |
| (10A) | 42.71 | 40.76 | 42.71 | 40.76 | 40.76 | 40.92 | 40.8 |
| (11A) | −1.625 | −1.210 | −2.009 | −1.045 | −0.999 | −0.773 | −1.172 |
| (12A) | 2.400 | 2.458 | 2.657 | 1.874 | 1.831 | 2.140 | 2.271 |
| (13A) | 0.061 | 0.050 | 0.031 | 0.025 | 0.051 | 0.034 | 0.003 |
| (13B) | −0.004 | 0.008 | −0.008 | −0.010 | −0.051 | −0.034 | 0.003 |
| (14A) | −0.022 | −0.018 | −0.020 | −0.022 | −0.017 | −0.025 | −0.020 |
| (15A) | 0.006 | 0.000 | 0.005 | — | — | 0.010 | 0.007 |
| (16A) | 0.306 | 0.297 | 0.302 | 0.313 | 0.303 | 0.314 | 0.311 |
| (17A) | 1.376 | 1.467 | 1.370 | 1.476 | 1.414 | 1.382 | 1.484 |
| (18A) | 0.265 | 0.277 | 0.269 | 0.349 | 0.351 | 0.370 | 0.354 |
| (19A) | — | — | — | 0.687 | 0.671 | 0.644 | 0.655 |
| (20A) | 0.758 | 0.759 | 0.759 | 0.759 | 0.760 | 0.759 | 0.759 |
| (21A) | 4.797 | 4.800 | 4.800 | 4.802 | 4.804 | 4.798 | 4.799 |
| (1B) | 0.185 | 0.012 | 0.115 | 0.084 | 0.067 | 0.192 | |
| (2B) | −0.971 | −0.951 | −0.901 | −1.413 | −1.498 | −1.281 | |
| (3B) | 0.179 | 0.100 | 0.138 | 0.089 | 0.068 | 0.186 | |

In each example, to cut unnecessary light such as ghost or flare, in addition to the aperture stop S, a flare stop may be arranged. The flare stop may be arranged at any one of a position on the object side of the first lens unit G1, a position between the first lens unit G1 and the second lens unit G2, a position between the second lens unit G2 and the third lens unit G3, a position between the third lens unit G3 and the fourth lens unit G4, a position between the fourth lens unit G4 and an image surface I. When the zoom lens system is provided with a fifth lens unit, the flare stop may be arranged at a position between the fourth lens unit G4 and the fifth lens unit G5 and a position between the fifth lens unit G5 and the image surface I. A frame member may be constituted so as to cut a flare ray, or another member may be constituted so as to cut a flare ray. The flare stop may be directly printed, coated or attached as a seal to an element in the optical system. A shape of the flare stop may be any shape such as a circular shape, an elliptic shape, a rectangular shape, a polygonal shape or a shape of a range surrounded with a function curve. Not only a harmful light flux but also a light flux such as a coma flare at the peripheral portion in the image surface may be cut.

Furthermore, each lens may be provided with an anti-reflection coating to reduce the ghost or the flare. A multi-layered anti-reflection coating is preferable because the coating can effectively reduce the ghost or the flare. An infrared ray cutting coating may be applied to the lens surface, the cover glass or the like.

In addition, to prevent the generations of the ghost and the flare, an air contact surface of the lens is generally provided with an anti-reflection coating. On the other hand, an adhesive material of a cementing surface of the cemented lens has a refractive index which is sufficiently higher than that of air. Therefore, a reflectance of the cementing surface is originally substantially equal to or less than that of a single-layer coating in many cases, and the cementing surface is little provided with the anti-reflection coating.

However, when the cementing surface is positively provided with the anti-reflection coating, the ghost and the flare can further be reduced, and a more satisfactory image can be obtained. Especially, in recent years, a vitreous material having a high refractive index becomes to be widely used. Since the material has a high aberration correcting effect, the material is frequently used in the camera optical system. However, when the vitreous material having a high refractive index is used as the cemented lens, reflection on the cementing surface cannot be ignored. In such a case, it is especially effective that the cementing surface is provided with the anti-reflection coating.

An effective method of using a coating on a cementing surface is disclosed in Japanese Patent Application Laid-Open Nos. 2-27,301, 2001-324,676 and 2005-92,115, U.S. Pat. No. 7,116,482 and the like. In these documents, a coating disposed on a cementing surface of a cemented lens of the first lens unit of a positive-lead type zoom lens system is described. The cemented lens surface of the first lens unit of the present invention which has a positive refractive power may be constituted as disclosed in these documents. The material for use in the coating may appropriately be selected from $Ta_2O_5$, $TiO_2$, $Nb_2O_5$, $ZrO_2$, $HfO_2$, $CeO_2$, $SnO_2$, $In_2O_3$, $ZnO$, $Y_2O_3$ and the like as a comparatively high refractive index materials, and $MgF_2$, $SiO_2$, $Al_2O_3$ and the like as a comparatively small refractive index materials in accordance with the refractive index of the lens constituting a substrate and the refractive index of the adhesive material. The film thicknesses of these materials may be set so as to satisfy phase conditions.

The coating on the cementing surface may be a multilayered coating in the same manner as in the coating on the air contact surface of the lens. When the coating materials and film thicknesses of two or more layers are appropriately combined, the reflectance can further be reduced, and a spectral characteristic, an angular characteristic and the like of the reflectance can be controlled. The lens cementing surface other than that of the first lens unit may be provided with an anti-reflection coating based on a similar idea.

Moreover, it is preferable that focusing is performed by moving the fourth lens unit G4 or the fifth lens unit G5. When the fourth lens unit G4 or the fifth lens unit G5 performs the focusing, an only small load is applied to driving system such as a motor, because the lenses have a small weight. Furthermore, during the focusing, the total length of the zoom lens system does not change. The driving motor can be arranged in a lens barrel. Therefore, the lens barrel can advantageously be miniaturized. As described above, the focusing by moving the fourth lens unit G4 or the focusing by moving the fifth lens unit G5 is preferable, but the focusing may be performed by moving the first lens unit G1, the second lens unit G2 or the third lens unit G3, or by moving a plurality of lens units. The whole lens system may be moved to perform the focusing, or a part of the lenses of the lens unit may be moved to perform the focusing.

Furthermore, the shading of the brightness of the peripheral portion of the image may be reduced by shifting micro lenses disposed on a CCD image sensor. For example, design of the micro lenses disposed on the CCD image sensor may be changed in accordance with the incidence angle of the ray at each image height. A drop of the brightness of the peripheral portion of the image may be corrected by image processing.

In addition, the distortion may be generated intentionally in the optical system, and the image is electrically processed after the photographing to correct the distortion. This image processing is referred to digital correction of the distortion of the image, and a basic concept of the correction will be described.

Figure 44:
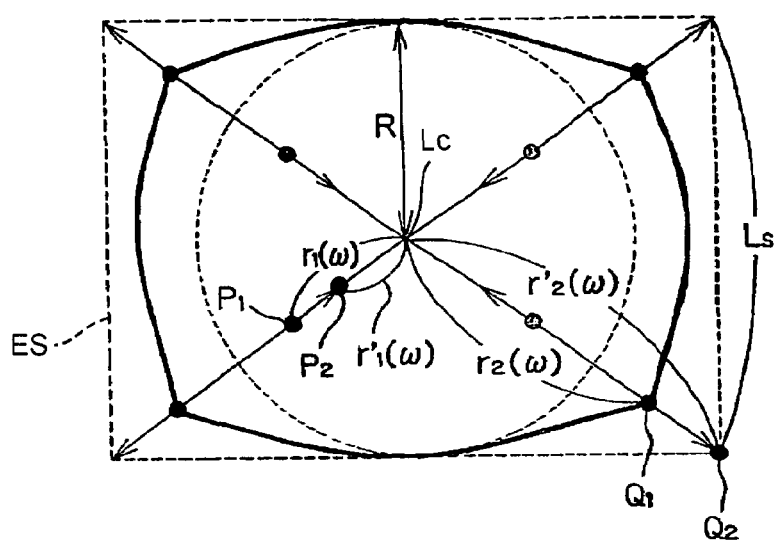
FIG. 44 is a diagram showing a basic concept in a case where a distortion of an image is electrically corrected.
Figure 45:
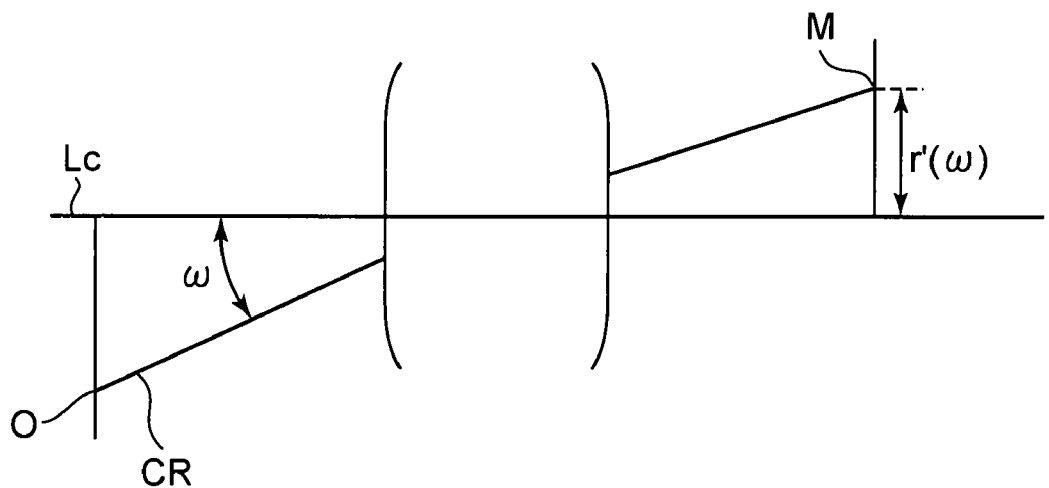
FIG. 45 is a diagram showing meaning of a half angle of an object.

As shown in FIG. 44, a circle which comes in contact with long sides of an effective image pickup surface ES having a center at an intersection between an optical axis Lc and the image pickup surface and which has a radius R (an image height R) is considered. Magnifications at points along the circumference of this circle are fixed, and the circumferential points are regarded as references for the correction. Other circumferential points along an arbitrary radius $r(\omega)$ (the image height $r(\omega)$) are moved in a substantially radial direction, and are concentrically moved so as to provide a radius $r'(\omega)$. In consequence, the distortion of the optical image is corrected. For example, in FIG. 44, a point $P_1$ positioned inwardly from the circle having the radius R along a circumference of an arbitrary radius $r_1(\omega)$ is moved inwardly toward the center of the circle and moved to a point $P_2$ along a circumference of the radius $r_1'(\omega)$. A point $Q_1$ positioned on a circumference of a radius $r_2(\omega)$ outside the circle having the radius R is moved away from the center of the circle and moved to a point Q2 on a circumference of a radius $r_2'(\omega)$. Here, the radius $r'(\omega)$ can be represented as follows:

$$r'(\omega) = \alpha \cdot f \tan \omega \ (0 \leq \alpha \leq 1),$$

in which $\omega$ is a half angle of an object view, and f is a focal length of an image forming optical system (a zoom lens in the present invention). Here, as shown in FIG. 45, the half angle of the object view is an angle of a chief ray CR to the optical axis Lc from an object point O corresponding to an image point M formed at a position of a height $r'(so)$ from the center of the image pickup surface.

Here, assuming that an ideal image height corresponding to a point on the circumference of the radius R (the image height R) is Y, the following equation results:

$$\alpha = R/Y = R/(f \tan \theta).$$

Ideally, the optical system is rotationally symmetric with respect to the optical axis. Therefore, the distortion is also rotationally symmetrically generated with respect to the optical axis. In a case where the optically generated distortion is electrically corrected, if the distortion can be corrected using symmetry with respect to an optical axis as described above, the correction is advantageous in respect of a data amount and a calculation amount.

However, when the optical image is detected by an electronic image pickup device, the image is not represented by a continuous amount owing to sampling of pixels of the image pickup device. Therefore, the circle of the radius R virtually drawn on the optical image is not a strictly correct circle, if the pixels are not radially arranged on the image pickup surface of the electronic image pickup device. That is, to correct a shape of an image given as an aggregate of data obtained from discrete coordinate points (the pixels of the electronic image pickup device), the circle having the magnification fixed as described above does not actually exist. Therefore, it is preferable to use a method in which a moved coordinate $(X_i', Y_j')$ is determined for each pixel (coordinate $(X_i, Y_j)$). It is to be noted that when a plurality of pixels move to a position of one coordinate $(X_i', Y_j')$, an average value of values of the pixels is obtained as data of the pixels at positions of the coordinate $(X_i', Y_j')$. Moreover, data of a position to which any point does not move is prepared by interpolation using data of several surrounding pixels having data generated by the movements of the pixels.

Especially, in an electronic image pickup apparatus equipped with a zoom lens system, such a method is effective for the correction in a case where the point of the optical image in which the magnification should be fixed does not exists on the circumference around the optical axis, and the circle of the radius R drawn on the optical image is asymmetric owing to manufacturing errors and the like of the optical system and the electronic image pickup device.

In the electronic image pickup apparatus in which such correction is performed, to calculate a correction amount r'(ω)−r(ω), data indicating a relation between the half angle ω of the object view and the image height r, or data indicating a relation between the actual image height r and an ideal image height r' and α may be recorded in a recording medium incorporated in the electronic image pickup apparatus.

It is to be noted that the radius R may satisfy the following condition so that a light quantity does not excessively fall short at opposite ends of the image in a short-side direction, after the distortion of the image has been corrected.

$$0 \leq R \leq 0.6 L_S,$$

in which $L_S$ is a length of the short side of the effective image pickup surface.

The radius R preferably satisfies the following condition.

$$0.3 L_S \leq R \leq 0.6 L_S.$$

Furthermore, it is most advantageous that the radius R is substantially equal to the radius of the circle which comes in contact with the long sides of the effective image pickup surface.

It is to be noted that in a case where the magnification is fixed in the vicinity of the radius R=0, that is, in the vicinity of the optical axis to perform the correction, a region extended in a radial direction increases. Therefore, the constitution is slightly disadvantageous in respect of the number of the pixels, but it is possible to secure an effect that the zoom lens system can be miniaturized even when the angle of view is enlarged.

It is to be noted that the correction of the distortion of one image has been described above. However, in the zoom lens system, when the focal length changes, the state of the distortion included in the image changes with the change of the focal length. Therefore, it is preferable that a focal length zone between a maximum value (the telephoto end) and a minimum value (the wide-angle end) of the focal length in which the distortion needs to be corrected is divided into several focal length zones to correct the distortion. For example, a correction amount is set so as to obtain a correction result which substantially satisfies r'(ω)=α·f·tan θ in the vicinity of a telephoto end (a position where the focal length is maximum in each zone) of each divided focal length zone, and the distortion of the image can be corrected in the corresponding zone by use of this correction amount. However, in this case, a certain degree of barrel type distortion remains in the resultant image in each divided focal length zone in a wide-angle end (a position in which the focal length is minimized in each zone). To avoid this, if the number of the focal length zones is increased, an amount of the data to be recorded for the correction in the recording medium increases. To solve the problem, one or several coefficients are calculated beforehand which correspond to one or several focal lengths excluding the telephoto end and the wide-angle end of each divided focal length zone. This coefficient may be determined based on simulation or measurement using an actual image pickup apparatus. Moreover, the correction amount is calculated so as to obtain the correction result which substantially satisfies the following condition in each divided focal length zone in the vicinity of the telephoto end:

$$r'(\omega) = \alpha \cdot f \cdot \tan \omega.$$

This correction amount may be multiplied by the coefficient for each focal length to determine the correction amount of the image obtained in that focal length state.

In a case where any distortion is not seen in an image obtained when focused at infinity, the following is established:

$$f = y/\tan \omega,$$

in which y is a height (an image height) of the image point from the optical axis, f is a focal length of the image forming system (the zoom lens system in the present invention), and ω is a half angle of an object view.

In a case where the image forming system has the barrel type distortion, the following results:

$$f > y/\tan \omega.$$

That is, assuming that the focal length f and the image height y of the image forming system are constant, a value of ω increases.

Next, an embodiment of an electronic image pickup apparatus to which the zoom lens system of the present invention is applied will be described.

Figure 46:
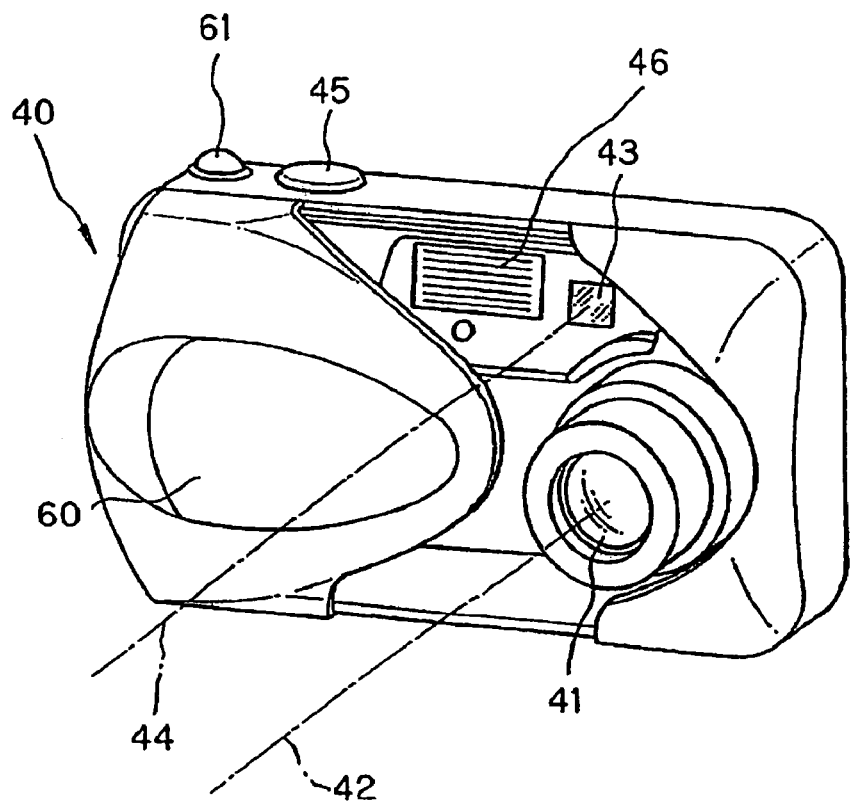
FIG. 46 is a front perspective view showing an appearance of an example of a digital camera according to the present invention.
Figure 47:
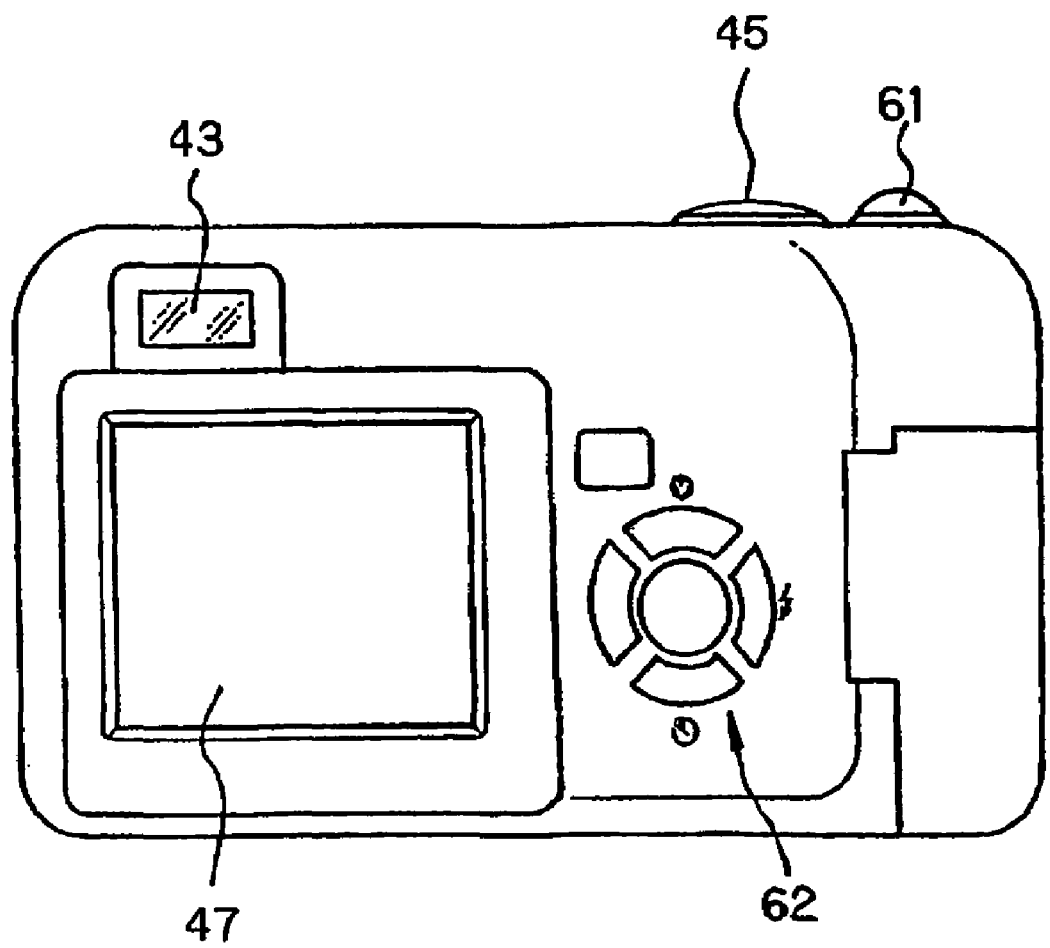
FIG. 47 is a back view of the digital camera of FIG. 46.
Figure 48:
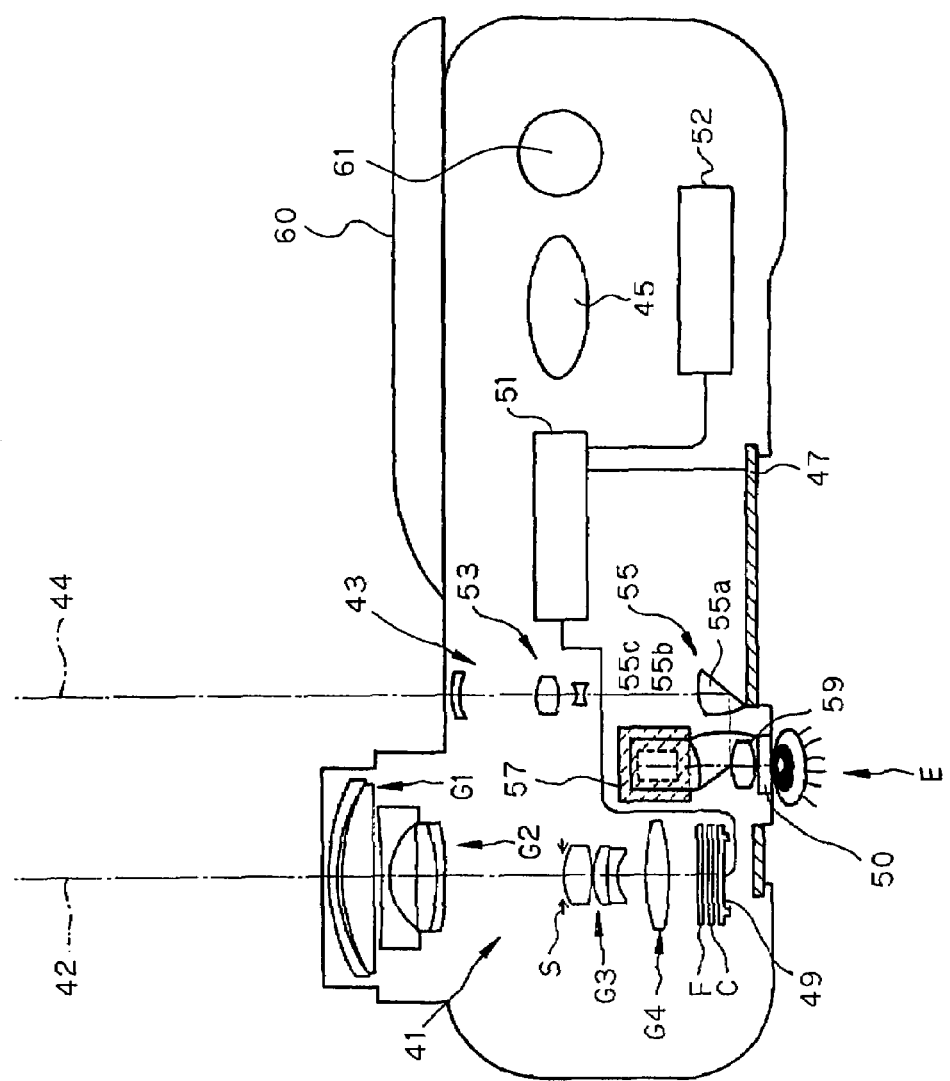
FIG. 48 is a schematic diagram showing an inner constitution of the digital camera of FIG. 46.

FIGS. 46 to 49 are conceptual diagrams showing a constitution of a digital camera in which the zoom lens system of the present invention is incorporated as a photographing optical system. FIG. 46 is a front perspective view showing an appearance of a digital camera, FIG. 47 is a back view of the digital camera, and FIG. 48 is a schematic sectional view showing an internal constitution of the digital camera. FIGS. 46 and 48 show a non-collapsed state of the photographing optical system. A digital camera 40 includes a photographing optical system 41 positioned along an optical path 42 for photographing, a finder optical system 43 positioned along an optical path 44 for a finder, a shutter release button 45, a flash lamp 46, a liquid crystal display monitor 47, a focal length change button 61, a setting change switch 62 and the like. In a case where the photographing optical system 41 is collapsed, when a cover 60 is slid, the photographing optical system 41, the finder optical system 43 and the flash lamp 46 are covered with the cover 60. Moreover, when the cover 60 is opened to bring the camera 40 into a photographing state, the photographing optical system 41 is brought into the non-collapsed state shown in FIG. 48. When the shutter release button 45 disposed at an upper portion of the camera 40 is pressed, the photographing is performed through the photographing optical system 41 in response to the pressed button. In this example, the zoom lens system shown in FIG. 1A is used, but the zoom lens system according to any example may be used. An image of an object to be photographed by the photographing optical system 41 is formed on an image pickup surface (a photoelectric conversion surface) of a CCD image sensor 49 via a low pass filter F and a cover glass C provided with a wavelength band restrictive coating. The object image received by the CCD image sensor 49 is displayed as an electronic image in the liquid crystal display monitor 47 provided at a back surface of the camera via processing means 51. The processing means 51 is connected to recording means 52, and the photographed electronic image can be recorded. This recording means 52 may be integrated with the processing means 51, or the means may separately be arranged. As the recording means, a memory or a hard disk drive (HDD) incorporated in the digital camera may be used, or an HDD detachably attached to the digital camera, a memory card, a DVD or the like may be used.

Furthermore, an objective optical system 53 for the finder is disposed along the optical path 44 for the finder. The objective optical system 53 for the finder is a zoom optical system constituted of a plurality of lens units (three lens units in the drawing) and an image erecting prism system 55 including prisms 55a, 55b and 55c. The system is constituted so that a focal length changes in conjunction with a zoom lens of the photographing optical system 41. The object image formed by the objective optical system 53 for the finder is formed on a view field frame 57 of the image erecting prism system 55. On an emission side of this image erecting prism system 55, an eyepiece optical system 59 is disposed which guides an erected image into an observer's eyeball E. A cover member 50 is disposed on an emission side of the eyepiece optical system 59.

Figure 49:
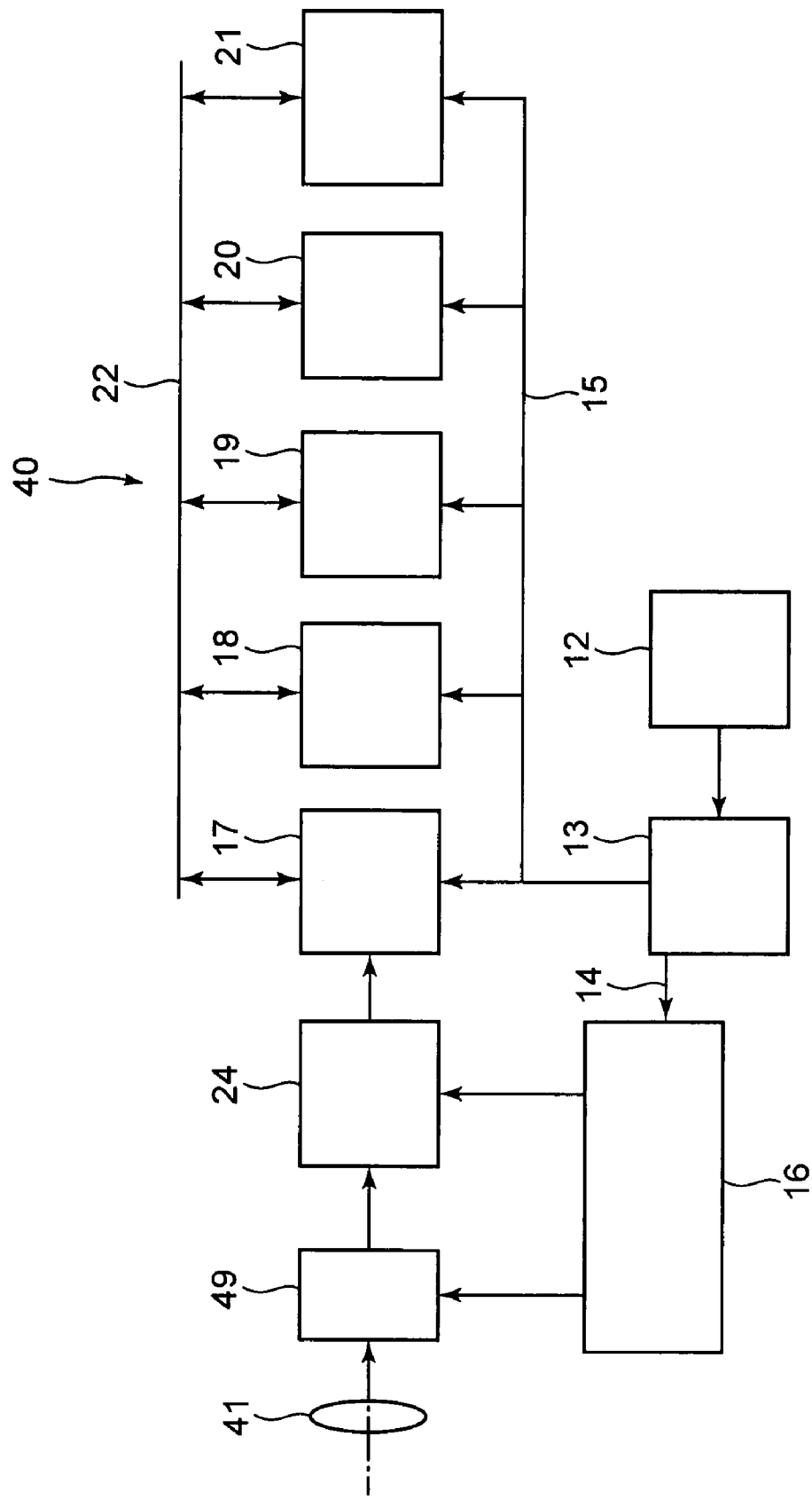
FIG. 49 is a block diagram showing a main part of an inner circuit of the digital camera shown in FIG. 46.

FIG. 49 is a block diagram of a main part of an internal circuit of the digital camera 40. It is to be noted that in the following description, the processing means 51 includes, for example, a correlated double sampling (CDS)/analog digital conversion (ADC) section 24, a temporary storage memory 17, an image processing section 18 and the like, and the storage means 52 includes a storage medium section 19 and the like.

As shown in FIG. 49, the digital camera 40 includes an operating section 12, a control section 13 connected to this operating section 12, and an image pickup driving circuit 16, the temporary storage memory 17, the image processing section 18, the storage medium section 19, a display section 20, a setting information storage memory section 21 and the like which are connected to a control signal output port of the control section 13 via buses 14 and 15.

The temporary storage memory 17, the image processing section 18, the storage medium section 19, the display section 20 and the setting information storage memory section 21 are constituted so that they can input or output data with respect to one another via a bus 22. The image pickup driving circuit 16 is connected to a CCD image sensor 49 and the CDS/ADC section 24.

The operating section 12 includes various input buttons and switches such as the shutter release button, the camera setting change switch and a focal length change button, and transmits, to the control section, event information input from the outside (a camera user) via these input buttons and switches. The control section 13 is, for example, a central processing unit as a circuit in which a program memory (not shown) is incorporated and which controls the whole digital camera 40 in response to an instruction command input from the camera user via the operating section 12 in accordance with a program stored in the program memory.

The CCD image sensor 49 receives the object image formed via the photographing optical system 41. The CCD image sensor 49 is an image pickup device which is driven and controlled by the image pickup driving circuit 16 and which converts, into an electric signal, a light quantity of the object image for each pixel to output the signal to the CDS/ADC section 24.

The CDS/ADC section 24 is a circuit which amplifies the electric signal output from the CCD image sensor 49 and which subjects the signal to analog/digital conversion. The CDS/ADC section 24 outputs, to the temporary storage memory 17, video bare data (hereinafter referred to as the raw data) simply subjected to the amplification and digital conversion.

The temporary storage memory 17 is a buffer including, for example, an SDRAM and the like, and is a memory device in which the raw data output from the CDS/ADC section 24 is temporarily stored. The image processing section 18 is a circuit which reads the raw data stored in the temporary storage memory 17 or the storage medium section 19 to subject the data to various electric image processing including distortion correction based on an image quality parameter designated by the control section 13.

The storage medium section 19 is a control circuit of, for example, a device to which a card or stick type recording medium including a flash memory and the like is detachably attached and in which the raw data transferred from the temporary storage memory 17 and image data subjected to image processing by the image processing section 18 are recorded and retained in the card or stick type flash memory.

The display section 20 includes the liquid crystal display monitor 47 and a circuit to display an image, an operation menu and the like in the liquid crystal display monitor 47.

The setting information storage memory section 21 includes an ROM section in which various image quality parameters are stored beforehand, an RAM section to store the image quality parameter selected from the image quality parameters read from the ROM section by an input operation of the operating section 12, and a circuit which controls input/output with respect to these memories.

The digital camera 40 constituted in this manner has a large angle of view of the photographing optical system 41 in the wide-angle end, is small-sized, has a high zoom ratio and has an image forming performance stabilized in the whole zoom region. A quick focusing operation can be performed in the wide-angle end and the telephoto end.

The present invention may be applied to not only a so-called compact digital camera that photographs a general subject as described above but also a monitor camera which requires a large angle of view and a lens interchangeable camera.

The above examples of the zoom lens system contribute to simultaneous realization of the miniaturization of the camera, the wide angle and the increase of the zoom ratio, and can satisfy a user's demand that a photographing region be enlarged without impairing portability of the camera. More specifically, the system is suitable for the thinning of the collapsed lens barrel, has a large half angle of view of about 390, and secures a high zoom ratio of about five. A quality of the image formed by the zoom lens system is kept to be satisfactory, and the system is suitable for combined use with an electronic image pickup device such as the CCD image sensor or CMOS type image sensor.

The invention being thus described, it will be obvious that the same may be varied in many ways. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A zoom lens system comprising, in order from an object side:

a first lens unit having a positive refractive power;

a second lens unit having a negative refractive power; and a third lens unit having a positive refractive power, during zooming from a wide-angle end to a telephoto end, a space between the first lens unit and the second lens unit and a space between the second lens unit and the third lens unit being changed, the space between the first lens unit and the second lens unit being enlarged in the telephoto end as compared with the wide-angle end, the space between the second lens unit and the third lens unit being narrowed in the telephoto end as compared with the wide-angle end, the zoom lens system further comprising:

an aperture stop disposed at a constant relative position with respect to the third lens unit during the zooming, the first lens unit comprising a positive lens, the total number of the lenses of the first lens unit being two or less, the second lens unit comprising, in order from the object side, an object-side negative lens whose concave surface faces an image side, a positive lens and an image-side negative lens, the total number of the lenses of the second lens unit being three, the object-side negative lens and the positive lens of the second lens unit being arranged with an air space on an optical axis therebetween, the following condition being satisfied:

$$-1.70 < R_{2nlr}/f_2 < -0.70 \quad (1A)$$

in which $R_{2nlr}$ is a paraxial radius of curvature of an image-side surface of the object-side negative lens of the second lens unit, and $f_2$ is a focal length of the second lens unit.

2. The zoom lens system according to claim 1, wherein the following conditions are satisfied:

$$0 < SF_{2nl} < 1.25 \quad (2A); \text{ and}$$

$$-0.32 < f_2/R_{2pf} < 0.5 \quad (3A),$$

in which $SF_{2nl}$ is defined as $SF_{2nl} = (R_{2nlf} + R_{2nlr})/(R_{2nlf} - R_{2nlr})$, $R_{2nlf}$ is a paraxial radius of curvature of an object-side surface of the object-side negative lens of the second lens unit, $R_{2nlr}$ is a paraxial radius of curvature of the image-side surface of the object-side negative lens of the second lens unit, and $R_{2pf}$ is a paraxial radius of curvature of an object-side surface of the positive lens of the second lens unit.

3. A zoom lens system comprising, in order from an object side:

a first lens unit having a positive refractive power;

a second lens unit having a negative refractive power; and a third lens unit having a positive refractive power, during zooming from a wide-angle end to a telephoto end, a space between the first lens unit and the second lens unit and a space between the second lens unit and the third lens unit being changed, the space between the first lens unit and the second lens unit being enlarged in the telephoto end as compared with the wide-angle end, the space between the second lens unit and the third lens unit being narrowed in the telephoto end as compared with the wide-angle end, the first lens unit comprising a positive lens, the total number of the lenses of the first lens unit being two or less, the second lens unit comprising, in order from the object side, an object-side negative lens having a double-concave shape, a positive lens and an image-side negative lens, the total number of the lenses of the second lens unit being three, an image-side surface of the positive lens being a convex surface which faces an image side, an absolute value of a paraxial radius of curvature of the image-side surface of the positive lens being smaller than that of the paraxial radius of curvature of an object-side surface of the positive lens, the object-side negative lens and the positive lens of the second lens unit being arranged with an air space on an optical axis therebetween, the following conditions being satisfied:

$$0 < f_2/R_{2nlf} < 0.4 \quad (1B); \text{ and}$$

$$-1.6 < SF_{2air} < -0.5 \quad (2B),$$

in which $R_{2nlf}$ is a paraxial radius of curvature of an object-side surface of the object-side negative lens of the second lens unit, $f_2$ is a focal length of the second lens unit, $SF_{2air}$ is defined as $SF_{2air} = (R_{2nlr} + R_{2plf})/(R_{2nlr} - R_{2plf})$, $R_{2nlr}$ is a paraxial radius of curvature of an image-side surface of the object-side negative lens of the second lens unit, and $R_{2plf}$ is a paraxial radius of curvature of the object-side surface of the positive lens of the second lens unit.

4. The zoom lens system according to claim 3, wherein the following condition is satisfied:

$$0.00 < (1/R_{2nlf} - 1/R_{lr}) \cdot f_2 < 0.04 \quad (3B),$$

in which $R_{2nlf}$ is a paraxial radius of curvature of the object-side surface of the object-side negative lens of the second lens unit, and $R_{lr}$ is a paraxial radius of curvature of the image-side surface of the lens of the first lens unit closest to the image side.

5. The zoom lens system according to claim 1 or 3, wherein the number of the lenses on the image side from the third lens unit of the zoom lens system is three or less.

6. The zoom lens system according to claim 1 or 3, which is constituted as a four-unit zoom lens system including a fourth lens unit having a positive refractive power.

7. The zoom lens system according to claim 1 or 3, which is constituted as a four-unit zoom lens system including a fourth lens unit having only one positive lens.

8. The zoom lens system according to claim 5, which is constituted as a five-unit zoom lens system including a fourth lens unit having a negative refractive power, and a fifth lens unit having a positive refractive power.

9. The zoom lens system according to claim 1 or 3, wherein the following conditions are satisfied:

$$1.84 < n_{d2p} < 2.20 \quad (4A); \text{ and}$$

$$13.0 < v_{d2p} < 30.0 \quad (5A),$$

in which $n_{d2p}$ is a refractive index of the positive lens of the second lens unit for the d-line, and $v_{d2p}$ is the Abbe number of the positive lens of the second lens unit.

10. The zoom lens system according to claim 1 or 3, wherein the following condition is satisfied:

$$0.45 < SF_{2p} < 1.80 \quad (6A),$$

in which $SF_{2p}$ is defined as $SF_{2p} = (R_{2pf} + R_{2pr})/(R_{2pf} - R_{2pr})$, $R_{2pf}$ is a paraxial radius of curvature of an object-side surface of the positive lens of the second lens unit, and $R_{2pr}$ is a paraxial radius of curvature of an image-side surface of the positive lens of the second lens unit.

11. The zoom lens system according to claim 1 or 3, wherein the following conditions are satisfied:

$$1.78 < n_{d2nl} < 2.20 \quad (7A); \text{ and}$$

$$35 < v_{d2nl} < 50 \quad (8A),$$

in which $n_{d2nl}$ is a refractive index of the object-side negative lens of the second lens unit for the d-line, and $v_{d2nl}$ is the Abbe number of the object-side negative lens of the second lens unit.

12. The zoom lens system according to claim 1 or 3, wherein the following conditions are satisfied:

$$1.78 < n_{d2n2} < 2.00 \quad (9A); \text{ and}$$

$$35 < v_{d2n2} < 50 \quad (10A),$$

in which $n_{d2n2}$ is a refractive index of the image-side negative lens of the second lens unit for the d-line, and $v_{d2n2}$ is the Abbe number of the image-side negative lens of the second lens unit.

13. The zoom lens system according to claim 1 or 3, wherein the following condition is satisfied:

$$-3.0 < SF_{2n2} < -0.6 \quad (11A),$$

in which $SF_{2n2}$ is defined as $SF_{2n2} = (R_{2n2f} + R_{2n2r})/(R_{2n2f} - R_{2n2r})$, $R_{2n2f}$ is a paraxial radius of curvature of an object-side surface of the image-side negative lens of the second lens unit, and $R_{2n2r}$ is a paraxial radius of curvature of an image-side surface of the image-side negative lens of the second lens unit.

14. The zoom lens system according to claim 1 or 3, wherein the following condition is satisfied:

$$-3.0 < f_{2p}/f_2 < -1.0 \quad (12A),$$

in which $f_{2p}$ is a focal length of the positive lens of the second lens unit.

15. The zoom lens system according to claim 1 or 3, wherein at least one lens surface of the object-side negative lens of the second lens unit is an aspherical surface, and the following conditions are satisfied:

$$0.002 < (ASP_{2nlf} + |ASP_{2nlr}|)/f_w < 0.10 \quad (13A); \text{ and}$$

$$-0.06 < (ASP_{2nlr} - ASP_{2nlf})/f_w < 0.06 \quad (13B),$$

in which $ASP_{2nlf}$ is an aspherical displacement of an object-side lens surface of the object-side negative lens of the second lens unit, $ASP_{2nlr}$ is an aspherical displacement of the image-side lens surface of the object-side negative lens of the second lens unit, and $f_w$ is a focal length of the zoom lens system in the wide-angle end.

16. The zoom lens system according to claim 15, wherein an object-side surface of the object-side negative lens of the second lens unit is an aspherical surface, a refractive power of a portion of which increases as a distance from the optical axis to the portion increases.

17. The zoom lens system according to claim 16, wherein the object-side negative lens of the second lens unit is a double-concave negative lens, the object-side surface of the double-concave negative lens is an aspherical surface having a negative refractive power, the negative refractive power of a portion of which decreases as a distance from the optical axis to the portion increases, and the image-side surface of the double-concave negative lens is an aspherical surface having a negative refractive power, the negative refractive power of a portion of which increases as a distance from the optical axis to the portion increases.

18. The zoom lens system according to claim 1 or 3, wherein an image-side lens surface of the image-side negative lens of the second lens unit is an aspherical surface, and the following condition is satisfied:

$$-0.09 < (ASP_{2n2r} - ASP_{2n2f})/f_w < 0.003 \quad (14A),$$

in which $ASP_{2n2f}$ is an aspherical displacement of an object-side lens surface of the image-side negative lens of the second lens unit, $ASP_{2n2r}$ is an aspherical displacement of an image-side lens surface of the image-side negative lens of the second lens unit, and $f_w$ is a focal length of the zoom lens system in the wide-angle end.

19. The zoom lens system according to claim 18, wherein the image-side negative lens of the second lens unit is a negative meniscus lens whose convex surface faces the image side, and an image-side surface of the negative meniscus lens is an aspherical surface having a positive refractive power, the positive refractive power of a portion of which increases as a distance from the optical axis to the portion increases.

20. The zoom lens system according to claim 1 or 3, wherein the positive lens and the image-side negative lens of the second lens unit are single lenses, respectively.

21. The zoom lens system according to claim 1 or 3, wherein the positive lens and the image-side negative lens of the second lens unit are cemented.

22. The zoom lens system according to claim 1 or 3, wherein the first lens unit comprises the positive lens and a negative lens.

23. The zoom lens system according to claim 22, wherein the first lens unit includes, in order from the object side, the negative lens and the positive lens, and the total number of the lenses of the first lens unit is two.

24. The zoom lens system according to claim 23, wherein the negative lens and the positive lens of the first lens unit are single lenses, respectively.

25. The zoom lens system according to claim 24, wherein a space between the negative lens and the positive lens of the first lens unit satisfies the following condition:

$$0.0 \leq L_{1np}/L_1 < 0.2 \quad (15A),$$

in which $L_{1np}$ is an axial space between the negative lens and the positive lens of the first lens unit, and $L_1$ is a total axial thickness of the first lens unit.

26. The zoom lens system according to claim 23, wherein the negative lens and the positive lens of the first lens unit are cemented.

27. The zoom lens system according to claim 1 or 3, wherein the lens included in the first lens unit is the only positive lens.

28. The zoom lens system according to claim 1 or 3, wherein the total number of the lenses of the third lens unit is three or less.

29. The zoom lens system according to claim 28, wherein the third lens unit includes, in order from the object side, a positive lens, a positive lens and a negative lens.

30. The zoom lens system according to claim 1 or 3, wherein the following condition is satisfied:

$$0.20 < |f_2/f_t| < 0.325 \quad (16A),$$

in which $f_t$ is a focal length of the zoom lens system in the telephoto end.

31. The zoom lens system according to claim 1 or 3, wherein the following condition is satisfied:

$$0.7 < f_1/f_t < 1.8 \quad (17A),$$

in which $f_1$ is a focal length of the first lens unit, and $f_t$ is a focal length of the zoom lens system in the telephoto end.

32. The zoom lens system according to claim 1 or 3, wherein the following condition is satisfied:

$$0.25 < f_3/f_t < 0.50 \quad (18A),$$

in which $f_3$ is a focal length of the third lens unit, and $f_t$ is a focal length of the zoom lens system in the telephoto end.

33. The zoom lens system according to claim 6, wherein the following condition is satisfied:

$$0.40 < f_4/f_t < 1.0 \quad (19A),$$

in which $f_4$ is a focal length of the fourth lens unit, and $f_t$ is a focal length of the zoom lens system in the telephoto end.

34. The zoom lens system according to claim 6, wherein during the zooming from the wide-angle end to the telephoto end, the first lens unit, the second lens unit, the third lens unit and the fourth lens unit move so that the space between the first lens unit and the second lens unit is enlarged, the space between the second lens unit and the third lens unit is narrowed and a space between the third lens unit and the fourth lens unit is enlarged.

35. The zoom lens system according to claim 34, wherein during the zooming from the wide-angle end to the telephoto end, the first lens unit moves so as to be positioned closer to the object side in the telephoto end than in the wide-angle end, the second lens unit moves, the third lens unit moves toward the only object side, and the fourth lens unit moves.

36. The zoom lens system according to claim 1 or 3, wherein the following condition is satisfied:

$$3.8 < f_t/f_w < 15.0 \quad (21A),$$

in which $f_w$ is a focal length of the zoom lens system in the wide-angle end, and $f_t$ is a focal length of the zoom lens system in the telephoto end.

37. An electronic image pickup apparatus comprising:
the zoom lens system according to claim 1 or 3; and
an electronic image pickup device which is disposed on an image side of the zoom lens system and which converts an optical image formed by the zoom lens system into an electric signal.

38. The electronic image pickup apparatus according to claim 37, wherein the following condition is satisfied:

$$0.70 < I_m/f_w < 1.00 \quad (20A),$$

in which $I_m$ is a maximum image height, and $f_w$ is a focal length of the zoom lens system in a wide-angle end.

* * * * *